US011668497B2

(12) United States Patent
Yu et al.

(10) Patent No.: US 11,668,497 B2
(45) Date of Patent: Jun. 6, 2023

(54) SYSTEMS AND METHODS FOR RADIATIVE COOLING AND HEATING

(71) Applicant: THE TRUSTEES OF COLUMBIA UNIVERSITY IN THE CITY OF NEW YORK, New York, NY (US)

(72) Inventors: Nanfang Yu, Fort Lee, NJ (US); Jyotirmoy Mandal, New York, NY (US); Adam Overvig, New York, NY (US); Norman Nan Shi, San Jose, CA (US); Meng Tian, Fort Lee, NJ (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 0 days.

(21) Appl. No.: 17/699,789

(22) Filed: Mar. 21, 2022

(65) Prior Publication Data
US 2022/0252309 A1  Aug. 11, 2022

Related U.S. Application Data

(60) Division of application No. 16/451,807, filed on Jun. 25, 2019, now Pat. No. 11,306,949, which is a
(Continued)

(51) Int. Cl.
*F28F 7/00* (2006.01)
*F25B 23/00* (2006.01)
(Continued)

(52) U.S. Cl.
CPC ............ *F25B 23/003* (2013.01); *B32B 27/18* (2013.01); *B32B 27/283* (2013.01); *B32B 33/00* (2013.01);
(Continued)

(58) Field of Classification Search
CPC ....... B32B 27/18; B32B 27/283; B32B 33/00; B32B 2305/18; B32B 2305/30;
(Continued)

(56) References Cited

U.S. PATENT DOCUMENTS

| 4,284,689 A | 8/1981 | Craighead et al. |
| 4,586,350 A | 5/1986 | Berdahl |

(Continued)

FOREIGN PATENT DOCUMENTS

| CN | 102408806 A | 4/2012 |
| WO | WO 2016/205717 A1 | 12/2016 |

OTHER PUBLICATIONS

U.S. Appl. No. 16/451,807 (US 2020/0025425), filed Jun. 25, 2019 (Jan. 23, 2020).
(Continued)

*Primary Examiner* — Davis D Hwu
(74) *Attorney, Agent, or Firm* — Baker Botts L.L.P.

(57) ABSTRACT

Systems and methods for radiative cooling and heating are provided. For example, systems for radiative cooling can include a top layer including one or more polymers, where the top layer has high emissivity in at least a portion of the thermal spectrum and an electromagnetic extinction coefficient of approximately zero, absorptivity of approximately zero, and high transmittance in at least a portion of the solar spectrum, and further include a reflective layer including one or more metals, where the reflective layer has high reflectivity in at least a portion of the solar spectrum.

4 Claims, 46 Drawing Sheets

Related U.S. Application Data division of application No. 15/845,820, filed on Dec. 18, 2017, now Pat. No. 10,386,097, which is a continuation-in-part of application No. PCT/US2016/038190, filed on Jun. 17, 2016.

(60) Provisional application No. 62/181,674, filed on Jun. 18, 2015.

(51) Int. Cl.

| | |
|---|---|
| *F24S 70/225* | (2018.01) |
| *F24S 70/30* | (2018.01) |
| *F24S 70/60* | (2018.01) |
| *B32B 27/18* | (2006.01) |
| *B32B 27/28* | (2006.01) |
| *B32B 33/00* | (2006.01) |
| *F24S 10/40* | (2018.01) |

(52) U.S. Cl.
CPC .............. *F24S 70/225* (2018.05); *F24S 70/30* (2018.05); *F24S 70/60* (2018.05); *B32B 2305/18* (2013.01); *B32B 2305/30* (2013.01); *B32B 2307/30* (2013.01); *B32B 2307/416* (2013.01); *B32B 2311/24* (2013.01); *B32B 2333/12* (2013.01); *B32B 2383/00* (2013.01); *B32B 2386/00* (2013.01); *F24S 10/40* (2018.05); *F28F 2245/06* (2013.01); *Y02E 10/44* (2013.01)

(58) Field of Classification Search
CPC .......... B32B 2307/30; B32B 2307/416; B32B 2311/24; B32B 2333/12; B32B 2383/00; B32B 2386/00; F24S 70/225; F24S 70/60; F24S 10/40; F25B 23/003; Y02E 10/44; F28F 2244/06
USPC ........................................................ 165/185
See application file for complete search history.

(56) References Cited

U.S. PATENT DOCUMENTS

| | | | |
|---|---|---|---|
| 5,332,888 A | 7/1994 | Tausch et al. | |
| 5,405,680 A | 4/1995 | Chang et al. | |
| 5,952,081 A | 9/1999 | Lorenz | |
| 6,451,414 B1 | 9/2002 | Wheatley et al. | |
| 7,503,971 B2 | 3/2009 | Wojtysiak | |
| 9,394,623 B2 | 7/2016 | Grimes et al. | |
| 9,923,111 B2 | 3/2018 | Fan et al. | |
| 10,386,097 B2 * | 8/2019 | Yu ........................... | B32B 27/18 |
| 11,306,949 B2 * | 4/2022 | Yu ........................... | F24S 70/60 |
| 2004/0211460 A1 | 10/2004 | Simburger et al. | |
| 2012/0251801 A1 * | 10/2012 | Moore .................... | B32B 27/20 |
| | | | 156/60 |
| 2012/0275017 A1 | 11/2012 | McCarthy | |
| 2013/0340990 A1 | 12/2013 | Smolyaninov et al. | |
| 2014/0131023 A1 | 5/2014 | Raman et al. | |
| 2015/0107582 A1 | 4/2015 | Jin et al. | |
| 2015/0131146 A1 | 5/2015 | Fan et al. | |
| 2015/0132550 A1 | 5/2015 | Kohno et al. | |
| 2017/0248381 A1 | 8/2017 | Yang | |

OTHER PUBLICATIONS

U.S. Appl. No. 15/845,820 (U.S. Pat. No. 10,386,097), filed Dec. 18, 2017 (Aug. 20, 2019).
U.S. Appl. No. 16/451,807, Mar. 16, 2022 Issue Fee Payment.
U.S. Appl. No. 16/451,807, Jan. 3, 2022 Notice of Allowance.
U.S. Appl. No. 16/451,807, Dec. 16, 2021 Request for Continued Examination (RCE).
U.S. Appl. No. 16/451,807, Dec. 16, 2021 Response to Final Office Action.
U.S. Appl. No. 16/451,807, Jul. 23, 2021 Final Office Action.
U.S. Appl. No. 16/451,807, Jul. 12, 2021 Response to Non-Final Office Action.
U.S. Appl. No. 16/451,807, Jan. 12, 2021 Non-Final Office Action.
U.S. Appl. No. 16/451,807, Dec. 31, 2020 Response to Restriction Requirement.
U.S. Appl. No. 16/451,807, Nov. 3, 2020 Restriction Requirement.
U.S. Appl. No. 15/845,820, Jul. 19, 2019 Notice of Allowance.
U.S. Appl. No. 15/845,820, Jul. 16, 2019 Request for Continued Examination (RCE).
U.S. Appl. No. 15/845,820, Jun. 25, 2019 Issue Fee Payment.
U.S. Appl. No. 15/845,820, Mar. 27, 2019 Notice of Allowance.
U.S. Appl. No. 15/845,820, Feb. 21, 2019 Response to Non-Final Office Action.
U.S. Appl. No. 15/845,820, Jan. 30, 2019 Non-Final Office Action.
U.S. Appl. No. 15/845,820, Dec. 28, 2018 Response to Restriction Requirement.
U.S. Appl. No. 15/845,820, Oct. 29, 2018 Restriction Requirement.
U.S. Appl. No. 16/451,807, Jul. 12, 2021 Responce to Non-Final Office Action.
U.S. Appl. No. 15/845,820, Feb. 21, 2019 Responce to Non-Final Office Action.
International Search Report dated Sep. 8, 2016 in International Application No. PCT/U516/38190.
Li Ying, Master Thesis, Experimental study on radiation cooling of composite materials, Qingdao Technological University, Jun. 2009 (with English translation).
Office Action dated Jul. 7, 2020 in corresponding European Patent Application No. EP 16812562.
Orel et al., "Radiative Cooling Efficiency of White Pigmented Paints," Solar Energy 50(6):477-482 (1993).
Raman et al., "Passive radiative cooling below ambient air temperature under direct sunlight," Nature 515:540-544 (2014).
Rephaeli et al., "Ultrabroadband Photonic Structures to Achieve High-Performance Daytime Radiative Cooling," Nano Letters 13:1457-1461 (2013).
Supplementary Partial European Search Report dated Nov. 27, 2018 in Application No. EP 16812562.
Yu et al., "Optical Metasurfaces and Prospect of Their Applications Including Fiber Optics," Journal of Lightwave Technology, 33 (12):2344-2358 (2015).
Zinzi et al., "Cool and green roofs. An energy and comfort comparison between passive cooling and mitigation urban heat island techniques for residential buildings in the Mediterranean region," Energy and Buildings 55:66-76 (2012).

* cited by examiner

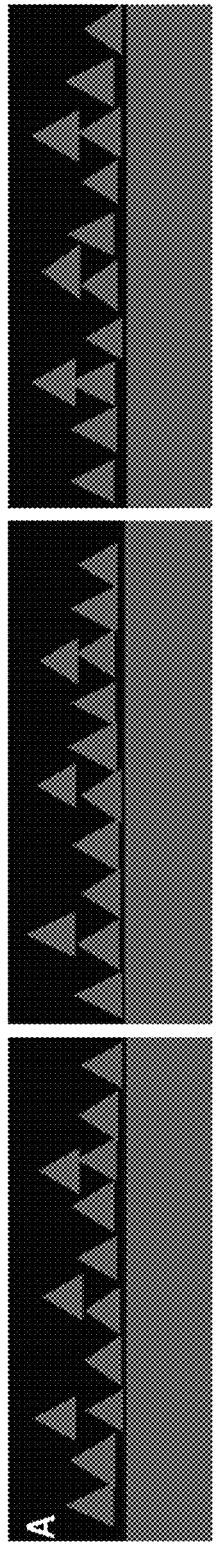
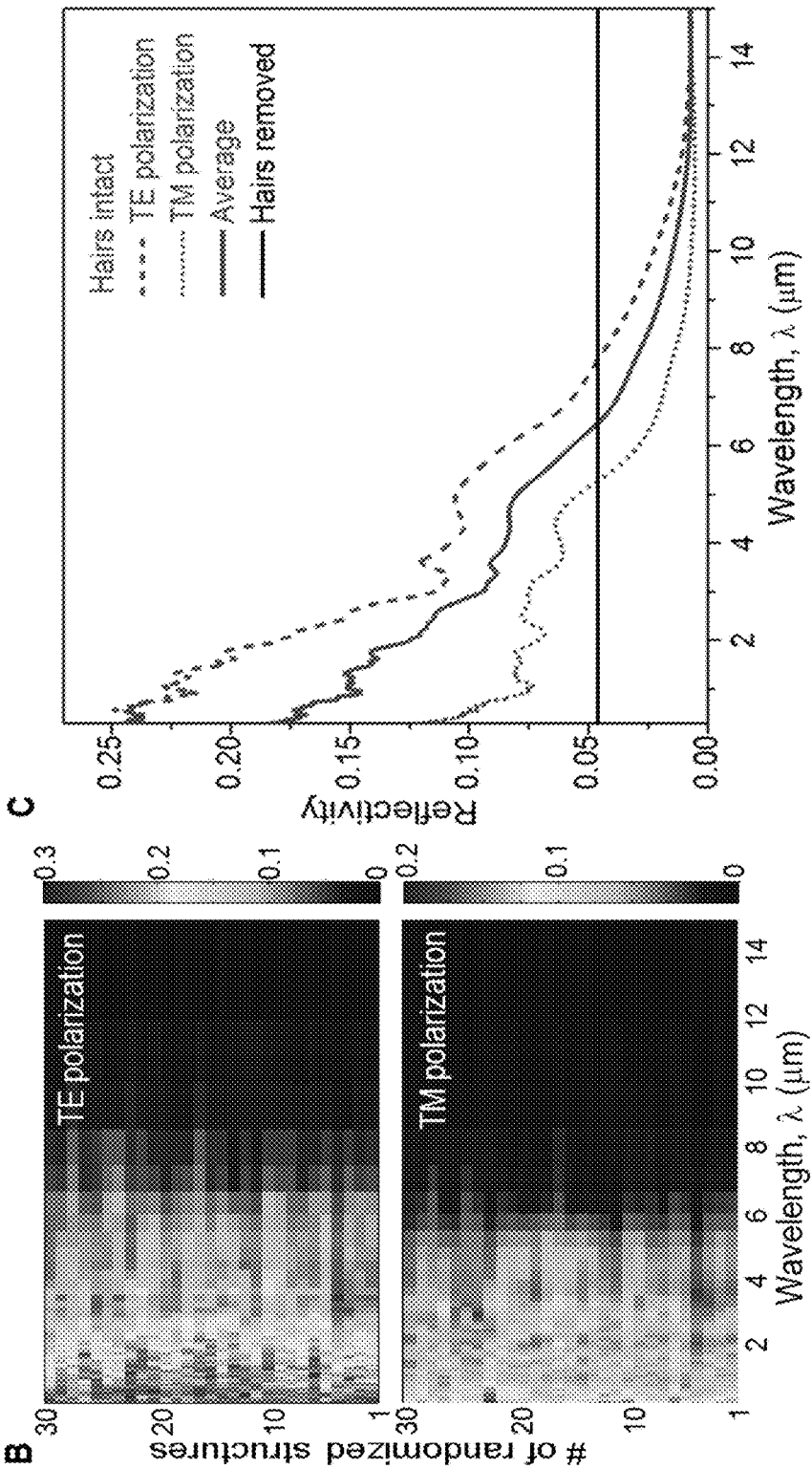
FIG. 23A
FIG. 23B
FIG. 23C

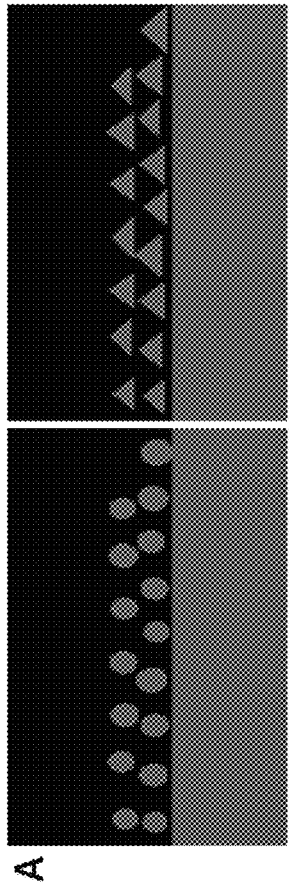
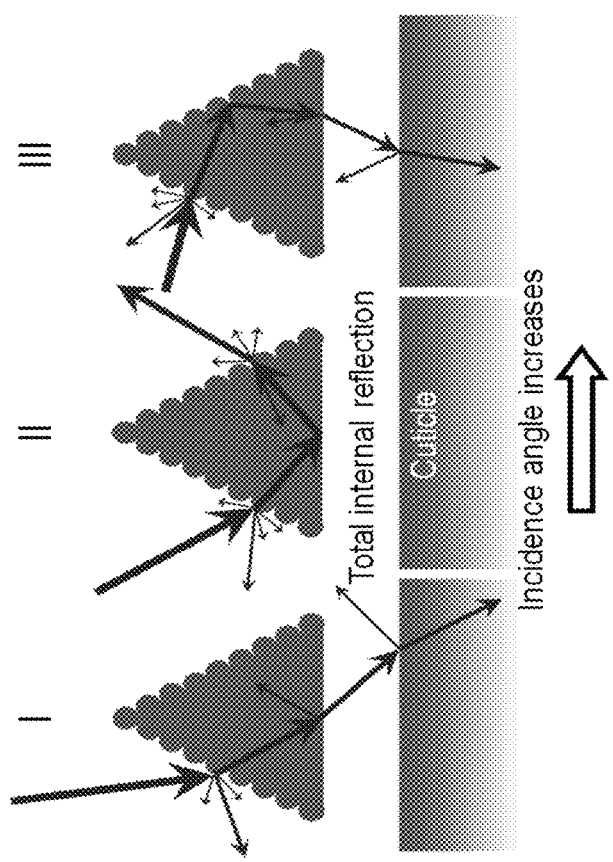
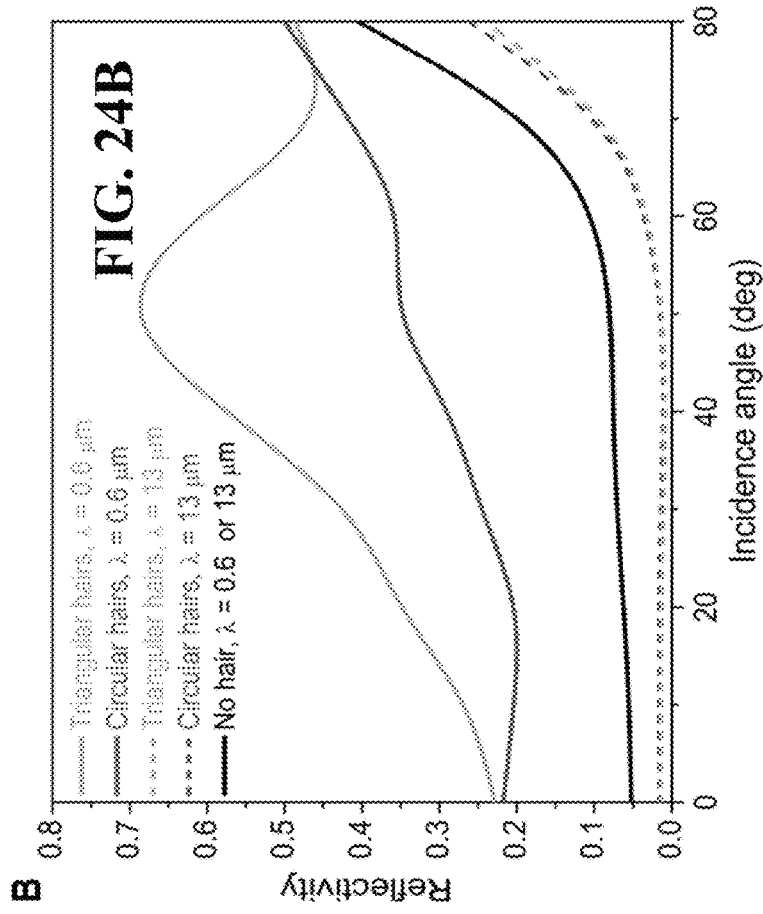
FIG. 24A
FIG. 24B
FIG. 24C

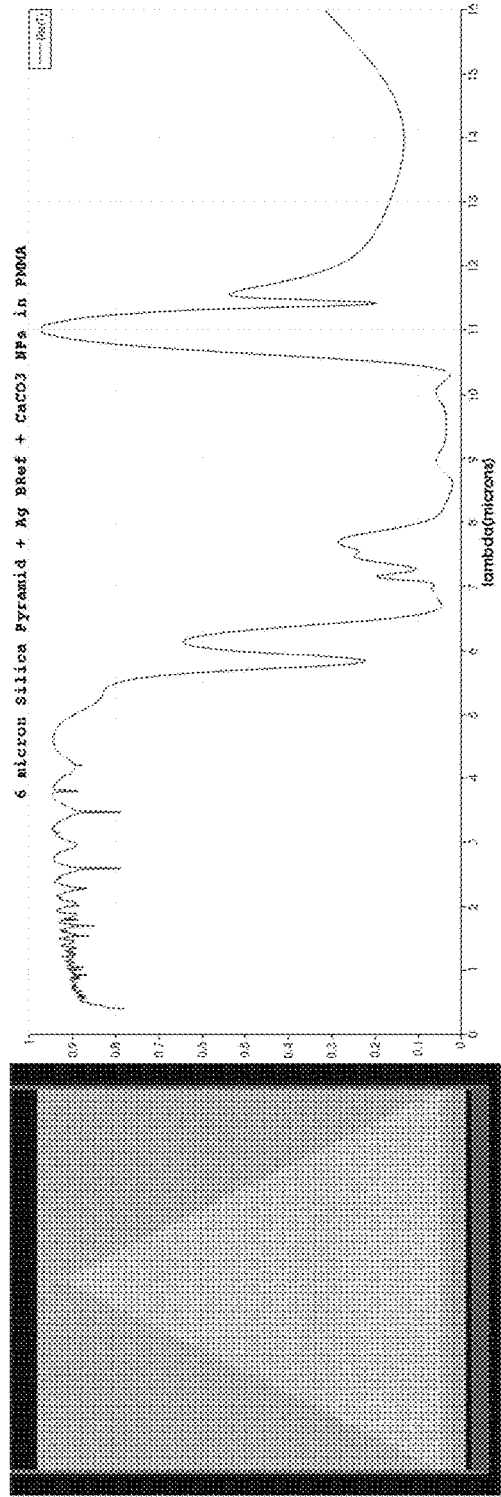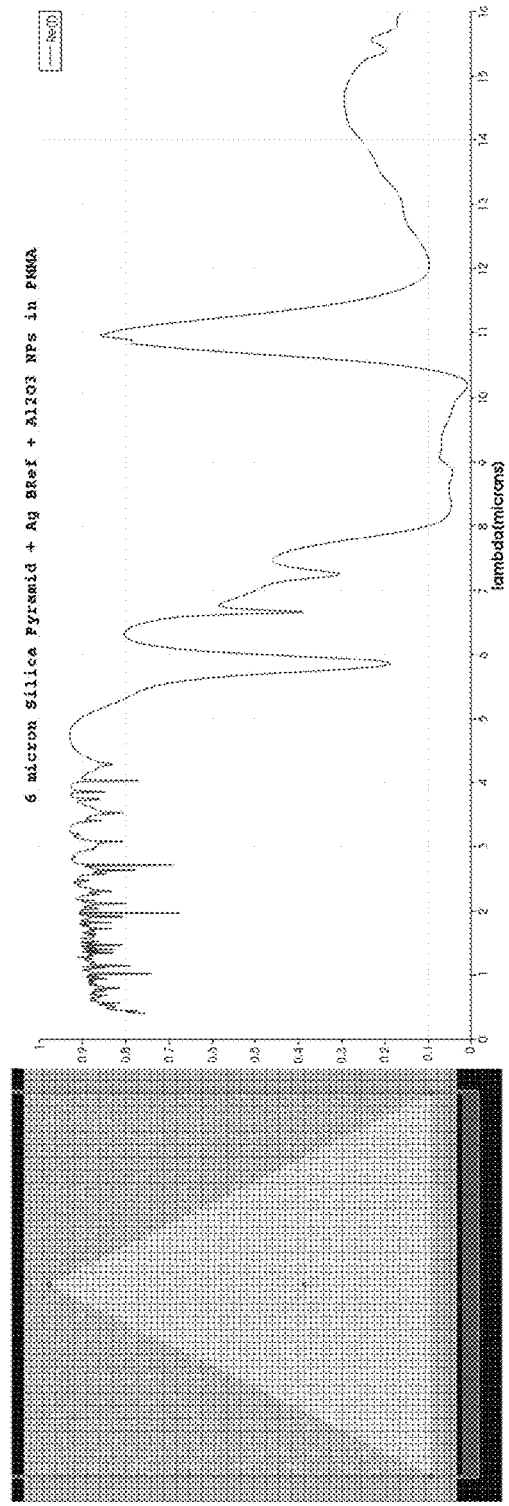
FIG. 28A
FIG. 28B

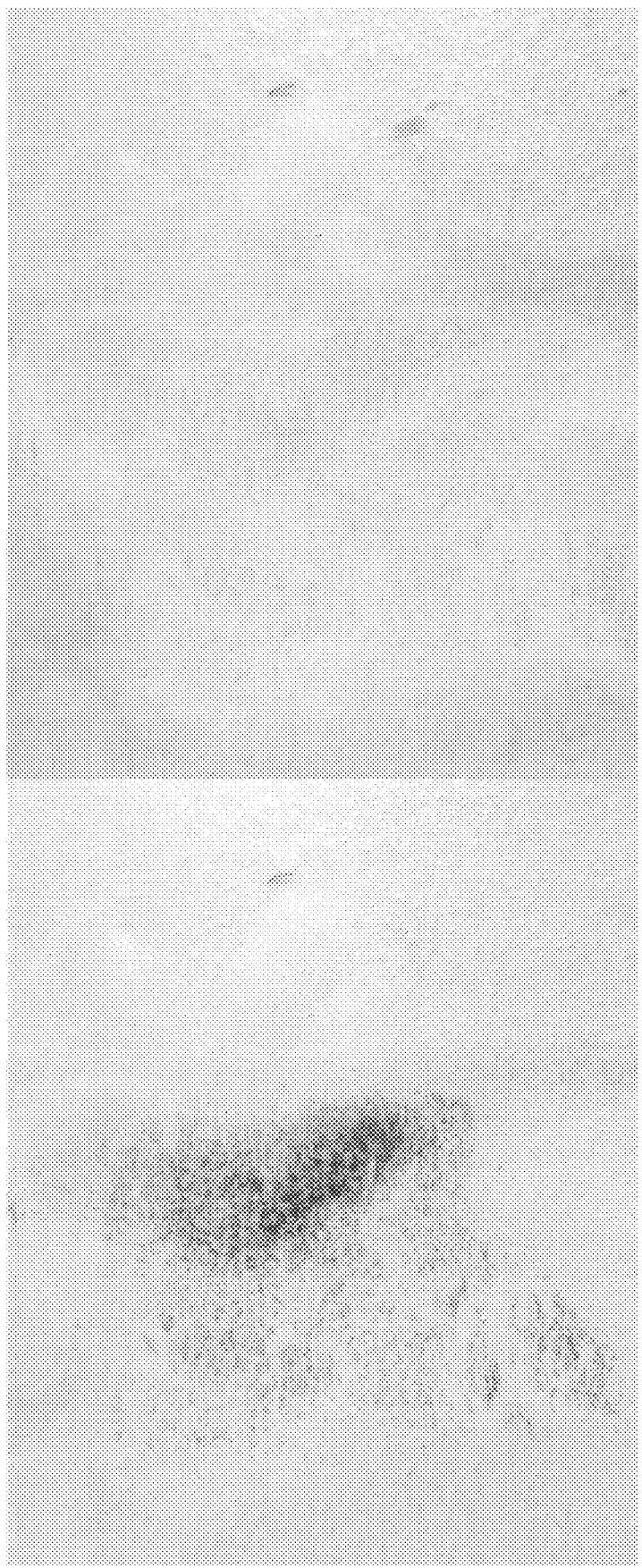

SYSTEMS AND METHODS FOR RADIATIVE COOLING AND HEATING

CROSS-REFERENCE TO RELATED APPLICATIONS

This application is a divisional application of U.S. patent application Ser. No. 16/451,807, filed Jun. 25, 2019, which is a divisional application of U.S. patent application Ser. No. 15/845,820, filed Dec. 18, 2017, now U.S. Pat. No. 10,386,097, which is a continuation-in-part application of International Application No. PCT/US2016/038190, filed Jun. 17, 2016, which claims priority to U.S. Provisional Application Ser. No. 62/181,674, filed Jun. 18, 2015, both of which are incorporated herein by reference in their entireties for all purposes.

STATEMENT REGARDING FEDERALLY-SPONSORED RESEARCH

This invention was made with government support from the National Science Foundation under Grant Nos. PHY-1411445 and ECCS-1307948, from the Department of Energy under Grant No. DE-AC02-98CH10886, and from the Air Force Office of Scientific Research under Grant No. MURI/FA9550-13-1-0389. The Government has certain rights in the invention.

BACKGROUND

The disclosed subject matter relates to systems and methods for radiative cooling and heating.

Surfaces can absorb and emit heat energy via electromagnetic radiation. The optical properties of a surface can depend in part on the geometry and materials of the surface. During radiative heat transfer, the temperature of a body can increase or decrease depending on the net electromagnetic radiation absorbed by the surface. For example, if the surface absorbs more radiation than is emitted, the temperature of the body can increase. On the other hand, if the surface emits more radiation, the temperature of the body can decrease.

Thermal radiation can be used in passive radiative cooling and heating, i.e., radiative cooling and heating that does not require energy input. Accordingly, passive radiative cooling and heating can be used to reduce the amount of energy required to cool or heat a body. Radiative cooling and heating can be used to reduce the energy cost associated with, for example, commercial and residential buildings, as well as vehicles.

Certain methods of passive radiative cooling use a surface coating that can be applied to buildings with increased reflectivity of incident solar radiation and increased emissivity in a limited spectral range corresponding to the infrared transmission window of the atmosphere. Other techniques can utilize complex multilayer structures that reflect solar radiation and emit thermal radiation for daytime radiative cooling.

However, there remains a need for improved techniques for radiative cooling and heating.

SUMMARY OF THE DISCLOSED SUBJECT MATTER

The disclosed subject matter provides systems and methods for radiative cooling and heating. As embodied herein, an example system for radiative cooling can include a top layer including one or more polymers, where the top layer has high emissivity in at least a portion of the thermal spectrum and an electromagnetic extinction coefficient of approximately zero, absorptivity of approximately zero, and high transmittance in at least a portion of the solar spectrum, and a reflective layer, disposed below the top layer, including one or more metals, where the reflective layer has high reflectivity in at least a portion of the solar spectrum, and.

In certain embodiments, the top layer can include two or more polymers, where the polymers have high emissivity in different portions of the thermal spectrum, and an electromagnetic extinction coefficient and high transmittance in at least a portion of the solar spectrum. The one or more polymers can be formulated in a mass ratio, and the mass ratio can be selected such that the top layer has a uniform and high emissivity in at least a portion of the thermal spectrum. The top layer can be formed into one or more regions with one or more arrays including one or more ridges and/or protrusions. The top layer can include one or more of poly(dimethyl siloxane), poly(vinylidene fluoride), poly(acrylic acid), and/or poly(methyl methacrylate).

In certain embodiments, the top layer can be used for passive radiative cooling in the absence of the reflective layer. In certain embodiments, the system can be used for daytime passive radiative cooling.

In certain embodiments, the reflective layer includes an upper layer including a metal and having a reflectivity of greater than about 0.8 and a first electromagnetic penetration depth in a first wavelength range within the solar spectrum and a second electromagnetic penetration depth in a second wavelength range within the solar spectrum, where the second electromagnetic penetration depth is greater than the first electromagnetic penetration depth. The reflective layer can further include a lower layer including a metal and having a lower reflectivity than the upper layer in the first wavelength range and a higher reflectivity than the upper layer in the second wavelength range. The first wavelength range can be different than the second wavelength range. The upper layer can have a thickness that is approximately greater than or equal to the first penetration depth and less than the second penetration depth.

In certain embodiments, the reflectivity of the reflective layer in the first wavelength range is greater than the reflectivity of the lower layer in the first wavelength range and a reflectivity of the reflective layer in the second wavelength range is greater than the reflectivity of the upper layer in the second wavelength range. The upper layer can include silver and/or the lower layer can include aluminum. The thickness of the upper layer can be from about 5 nm to about 50 nm.

In certain embodiments, the system can further include a protective layer, above the reflective layer, having a thickness of less than about 10 nm and including one or more of aluminum oxide and silicon dioxide. In certain embodiments, the system can be used as a standalone reflector to reflect radiation in at least a portion of the solar spectrum. In certain embodiments, the reflective layer can be deposited by electroplating, thermal vapor deposition, electron-beam deposition, or a sputtering technique.

In certain embodiments, the top layer can further include one or more types of nanoparticles, where each type of nanoparticles has higher emissivity in at least a portion of the thermal spectrum than the other types of nanoparticles, if present, and the one or more polymers, and where the nanoparticles have an electromagnetic extinction coefficient of approximately zero and absorptivity of approximately zero in the solar spectrum. The one or more polymers and the one or more types of nanoparticles can be formulated in a mass ratio where the mass ratio is selected such that the top layer has a uniform and high emissivity in at least a portion of the thermal spectrum. The one or more polymers and the one or more types of nanoparticles can have refractive indices within 10% of each other in at least a portion of the solar spectrum. The nanoparticles can include one or more of calcium carbonate, aluminum oxide, silicon dioxide, and silicon nitride. The nanoparticles can have a diameter of less than about 100 nm.

As embodied herein, another exemplary system for radiative cooling in accordance with the disclosed subject matter includes a top layer including one or more polymers and one or more additives, where the one or more polymers have high emissivity in at least a portion of the thermal spectrum and the one or more additives have reflectivity of greater than about 0.3 in at least a portion of the solar spectrum.

In certain embodiments, each of the one or more additives has a different refractive index than other additives, if present, and the one or more polymers in at least a portion of the solar spectrum. The one or more additives can include one or more of titanium dioxide, silicon nitride, zinc oxide, aluminum oxide, silicon dioxide and air voids. The one or more polymers can include one or more of poly(dimethyl siloxane), poly(vinylidene fluoride), and poly(methyl methacrylate). The size of the one or more additives can be selected to increase back-scattering of incident solar radiation and increase reflectivity in the solar spectrum. The one or more polymers and the one or more additives can be formulated in a mass ratio, where the mass ratio is selected such that the system has high emissivity in at least a portion of the thermal spectrum and a uniform reflectivity of greater than about 0.5 in at least a portion of the solar spectrum.

In certain embodiments, the system includes two or more polymers, where each polymer has high emissivity in a different portion of the thermal spectrum than the other polymers and an electromagnetic extinction coefficient of approximately zero and high transmittance in at least a portion of the solar spectrum. The system can include one or more regions with one or more arrays including one or more ridges or protrusions. The system can have a thickness of from about 5 µm to about 500 µm. In certain embodiments, the top layer further includes fibers and/or textiles.

As embodied herein, another exemplary system for radiative cooling in accordance with the disclosed subject matter includes a top layer including one or more structured polymers, where the top layer has high emissivity in at least a portion of the thermal spectrum, an electromagnetic extinction coefficient of approximately zero in at least a portion of the solar spectrum, and a reflectivity of greater than about 0.5 in at least a portion of the solar spectrum, and a contrast layer, disposed below the top layer, having a lower refractive index than a refractive index of the top layer in at least a portion of the solar spectrum.

In certain embodiments, the contrast layer includes one or more of calcium fluoride, magnesium fluoride, silicon dioxide, silicone, poly(dimethyl siloxane), and air void(s). The top layer can include one or more regions comprising one or more arrays including one or more ridges and/or protrusions.

In certain embodiments, the one or more polymers of the presently disclosed systems can be mechanically strong, have chemical binding or adhesive properties, be impermeable to water, and/or be resistant to corrosion. The systems can further include a cover layer, adjacent to the top layer.

In another aspect, the presently disclosed subject matter provides systems for radiative heating. Exemplary systems for radiative heating can include a top layer including one or more structured materials and having high absorptivity in at least a portion of the solar spectrum and emissivity of less than about 0.1 in at least a portion of the thermal spectrum, and an underlying layer having a lower refractive index than the refractive index of the top layer in at least a portion of the thermal spectrum.

In certain embodiments, the top layer can include silicon, gallium arsenide, and/or germanium. In certain embodiments, the underlying layer can include one or more of silicon dioxide, calcium fluoride, magnesium fluoride, poly (dimethyl siloxane), and/or air void(s). The top layer can include one or more regions comprising one or more arrays including one or more ridges and/or protrusions.

The presently disclosed systems can further include a substrate. The top layer can be applied to the substrate using at least one of physical or chemical vapor deposition, photolithography, electron-beam lithography, wet etching, reactive-ion etching, 3D printing, imprinting, spraying, dip-coating, or spin-coating, or by using an applicator. In certain embodiments, the top layer has a thickness of from about 5 µm to about 500 µm.

The presently disclosed subject matter further provides methods radiative cooling. An exemplary method can include providing a top layer including one or more polymers, and optionally further including one or more types of nanoparticles, wherein the top layer has high emissivity in at least a portion of the thermal spectrum, and an electromagnetic extinction coefficient of approximately zero, absorptivity of approximately zero, and high transmittance in at least a portion of the solar spectrum, and providing a reflective layer, disposed below the top layer, including one or more metals, wherein the reflective layer has high reflectivity in at least a portion of the solar spectrum.

Another exemplary method for radiative cooling can include providing a top layer including one or more polymers and one or more additives, wherein the one or more polymers have high emissivity in at least a portion of the thermal spectrum, and the one or more additives have an electromagnetic extinction coefficient of approximately zero in at least a portion of the solar spectrum and reflectivity of greater than about 0.3 in at least a portion of the solar spectrum.

Yet another exemplary method for radiative cooling can include providing a top layer including one or more structured polymers, wherein the top layer has high emissivity in at least a portion of the thermal spectrum, an electromagnetic extinction coefficient of approximately zero in at least a portion of the solar spectrum, and reflectivity of greater than about 0.5 in at least a portion of the solar spectrum, and providing a contrast layer, disposed below the top layer, having a lower refractive index than a refractive index of the top layer in at least a portion of the solar spectrum.

The presently disclosed subject matter further provides methods radiative heating. An exemplary method can include providing a top layer including one or more structured materials and having high absorptivity in at least a portion of the solar spectrum and emissivity of less than about 0.1 in at least a portion of the thermal spectrum, and providing an underlying layer having a lower refractive index than a refractive index of the top layer in at least a portion of the thermal spectrum.

BRIEF DESCRIPTION OF THE DRAWINGS

FIG. 12A provides a schematic illustration of heat transfer where the system is applied as a coating to a heat-generating object or structure. FIG. 12B provides a schematic illustration of heat transfer where the system is applied as a coating to a cool object or structure.

FIGS. 23A-23C provide simulations based on randomized array structures.

FIG. 23A illustrates three exemplary arrangements of the triangular ridges. FIG. 23B shows simulated reflectivity as a function of wavelength at normal incidence for 30 different random arrangements of the ridges. FIG. 23C provides reflectivity spectra averaged over the 30 simulations.

FIGS. 24A-24B provide simulations comparing triangular and circular ridges. FIG. 24A illustrates the arrays of ridges with circular and triangular cross-sections that were used in the simulations. FIG. 24B provides simulated reflectivity spectra for unpolarized incident light at λ=600 nm (i.e., visible radiation) and 13 μm (i.e., thermal radiation). It shows that in the solar spectrum (at a representative wavelength of λ=600 nm), the reflectivity of the triangular ridge array is uniformly and significantly higher than that of the circular ridge array across the entire range of incidence angles, and that in the thermal radiation spectrum (at a representative wavelength of λ=13 μm), triangular and circular ridge arrays have comparable values of reflectivity that are smaller than that of a bare substrate (i.e., emissivity is larger than that of a bare substrate).

FIG. 24C provides schematic diagrams showing the interaction between solar radiation and a triangular ridge at small (I), intermediate (II), and large (III) incidence angles. It shows that in the intermediate incidence angle range the solar reflection is enhanced due to total internal reflection of light at the bottom flat facet of the triangular ridge.

FIG. 26A is a schematic illustration of a system and FIG. 26B is a scanning electron microscope image of a fabricated system.

FIGS. 28A-28B show simulated reflection spectra of systems for radiative cooling with $CaCO_3$ nanoparticles (FIG. 28A) compared to $Al_2O_3$ nanoparticles (FIG. 28B).

FIGS. 40A-40B are photos of accumulated dusts on an exemplary system. Accumulated dusts (FIG. 40A) can be removed using damp tissue paper (FIG. 40B).

FIG. 44A shows the coating systems after 1 month from installation. FIG. 44B shows the coating systems after 8 months from installation.

DETAILED DESCRIPTION

Figure 1:
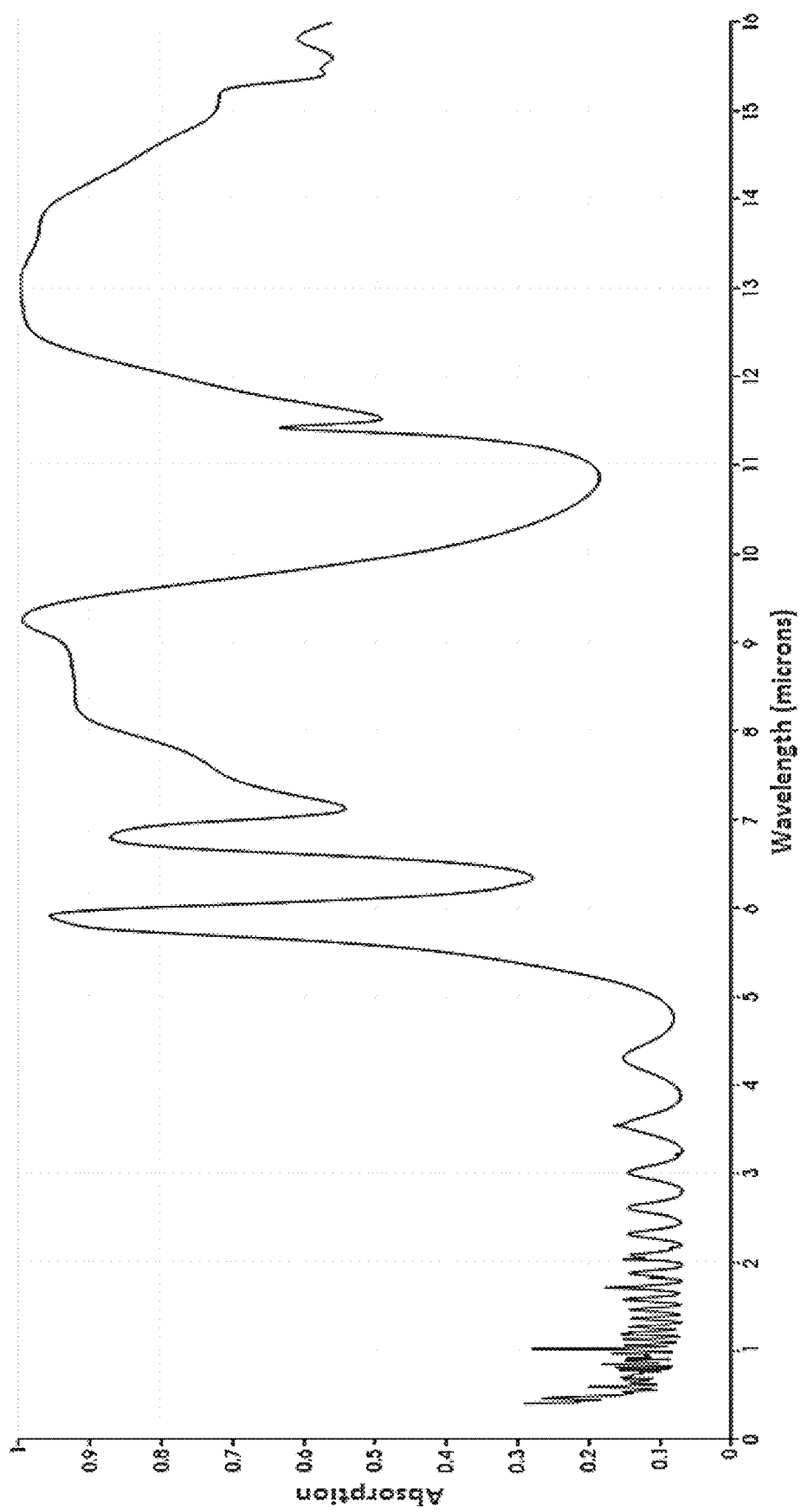
FIG. 1 depicts a simulated absorption spectrum of a system for radiative cooling in accordance with the disclosed subject matter.

The presently disclosed subject matter provides systems and methods for radiative cooling and heating.

In certain embodiments, the system has low absorptivity in the solar spectrum and high emissivity in the thermal spectrum. Alternatively, the system can have high absorptivity in the solar spectrum, with lower absorptivity in longer wavelengths (e.g., the thermal spectrum). In other embodiments, the system can have high reflectivity over a broad range of wavelengths, including the solar and thermal spectra.

Accordingly, the presently disclosed systems can be used in a variety of applications, for both radiative cooling and heating. The radiation properties (e.g., absorptivity, emissivity, reflectivity, and transmittance) of the systems will depend, in part, on the materials and geometry of the system. Accordingly, the materials and geometries can be selected based on a desired radiation profile for an intended application.

As used herein, the "solar spectrum" refers to the range of electromagnetic radiation wavelengths spanning the ultraviolet, visible, and near-infrared spectra, in which the sun's electromagnetic radiation reaches the Earth's surface after passing through the atmosphere. The solar spectrum thus includes electromagnetic radiation having wavelengths of from about 350 nm to about 2.5 µm. The phrases "solar radiation," "solar wavelengths" and "sunlight" can be used interchangeably with "solar spectrum."

The "thermal spectrum" refers to the range of electromagnetic radiation wavelengths spanning the mid-infrared spectrum. Objects at or within a few hundred degrees Celsius above the Earth's surface temperature emit radiation in the thermal spectrum. The thermal spectrum thus includes electromagnetic radiation having wavelengths of from about 2.5 µm to about 30 µm. The phrase "thermal radiation" can be used interchangeably with "thermal spectrum."

As used herein, the term "about" or "approximately" means within an acceptable error range for the particular value as determined by one of ordinary skill in the art, which will depend in part on how the value is measured or determined, i.e., the limitations of the measurement system. For example, "about" can mean a range of up to 20%, up to 10%, up to 5%, and or up to 1% of a given value.

"Absorptivity" or "absorbance," as used herein with respect to a material or a structure, is its effectiveness in absorbing energy in the form of electromagnetic radiation. A perfect blackbody absorber is defined to have an absorptivity of one. Absorptivity is a function of wavelength. As used herein, the phrase "high absorptivity," when used to describe the properties of a material or structure within a certain wavelength range, means that the material or structure has an absorptivity of greater than about 0.9 in that range.

"Emissivity" or "emittance," as used herein with respect to a material or a structure, is its effectiveness in emitting energy in the form of electromagnetic radiation. A perfect blackbody emitter is defined to have an emissivity of 1 and a perfect non-emitter is defined to have an emissivity of zero. Emissivity is a function of wavelength. As used herein, the phrase "high emissivity," when used to describe the properties of a material or structure within a certain wavelength range, means that the material or structure has an emissivity of greater than about 0.9 in that range. As used herein, the phrase "uniform emissivity," when used to describe the properties of a material or structure within a certain wavelength range, means that emissivity of the material or structure within that range varies by at most 10% of the highest emissivity in that range.

"Reflectivity" or "reflectance," as used herein with respect to a material or a structure, is the fraction of any incident electromagnetic radiation reflected off of the surface. A perfect reflector is defined to have a reflectivity of 1 (and an emissivity of zero), and a perfect absorber is defined to have a reflectivity of zero (and an emissivity of one). Reflectivity is a function of wavelength, as well as the angle of reflection with respect to the surface. As used herein, the phrase "high reflectivity," when used to describe the properties of a material or structure within a certain wavelength range, means that the material or structure has a reflectivity of greater than about 0.9 in that range. As used herein, the phrase "uniform reflectivity," when used to describe the properties of a material or structure within a certain wavelength range, means that reflectivity of the material or structure within that range varies by at most 10% of the highest reflectivity in that range.

"Transmittance," as used herein with respect to a material or a structure, is the fraction of any incident electromagnetic radiation transmitted through the material or the structure. An opaque material or structure is defined to have a transmittance of zero. As used herein, the phrase "high transmittance," when used to describe the properties of a material or structure within a certain wavelength range, means that the material or structure has a transmittance of greater than about 0.9 in that range.

According to Kirchhoff's law of thermal radiation, absorptivity equals emissivity. Moreover, for any given material or structure, the emissivity ($\epsilon$), transmittance ($\tau$), and reflectivity (R) are related by the equation: $\epsilon+\tau+R=1$. Thus, when the material is sufficiently opaque, a negligible amount of light is transmitted through it (i.e., $\tau$ is approximately zero), and the equation simplifies to $\epsilon+R=1$.

The infrared transmission window of the atmosphere, which is alternatively termed herein as the "atmospheric transmission window," is the range of wavelengths within the electromagnetic spectrum over which the atmosphere transmits more than 80% of the radiation travelling through its thickness from the surface of the Earth to outer space. The atmospheric transmission window thus includes electromagnetic radiation having wavelengths of from about 8 µm to about 13.5 µm.

As used herein, the phrase "passive radiative cooling," when used in connection with an object or structure refers to its loss of heat by an intrinsic emission of electromagnetic radiation, a process which itself requires no additional energy. For example, the heat loss can take place in the form of thermal radiation. "Daytime passive radiative cooling" refers to a net passive cooling of an object under the sun by a net loss of radiation. Daytime passive radiative cooling can result when the object has a high solar radiation reflectivity and a high thermal radiation emissivity.

Spectral complex refractive indices are based on the refractive index, $n(\lambda)$, and the extinction coefficient, $\kappa(\lambda)$, i.e., the spectral complex refractive index is $n(\lambda)+i\kappa(\lambda)$. The refractive index determines how much light of the wavelength ($\lambda$) is reflected off the interface between that material and another material, while the extinction coefficient determines how strongly the material absorbs or emits light at that wavelength.

"Mass ratio," as used herein, is defined as the ratio of masses of some or all of the constituents of a material or structure. The mass ratio is directly convertible to volume fraction, which refers to the ratio of volumes of the constituents, and the concentration of each constituent with respect to the volume of the material or structure.

"Electromagnetic penetration depth," or "penetration depth," of a material is the distance electromagnetic radiation can travel within the material before its intensity is reduced by a factor of e. The penetration depth is a function of the wavelength and the properties of the material.

As embodied herein, a system for passive radiative cooling can have low absorptivity in the solar spectrum and high emissivity in the thermal spectrum. For example, the system can have high emissivity in at least a portion of the infrared transmission window of the atmosphere, allowing outer space to act as a heat sink for emitted radiation, which can bypass the relatively warm atmosphere of the Earth. For the purpose of illustration, FIG. 1 provides an example absorption spectrum for such a system. As shown in FIG. 1, the system has low absorptivity in the solar spectrum, i.e., from about 350 nm to about 2.5 µm.

Figure 2:
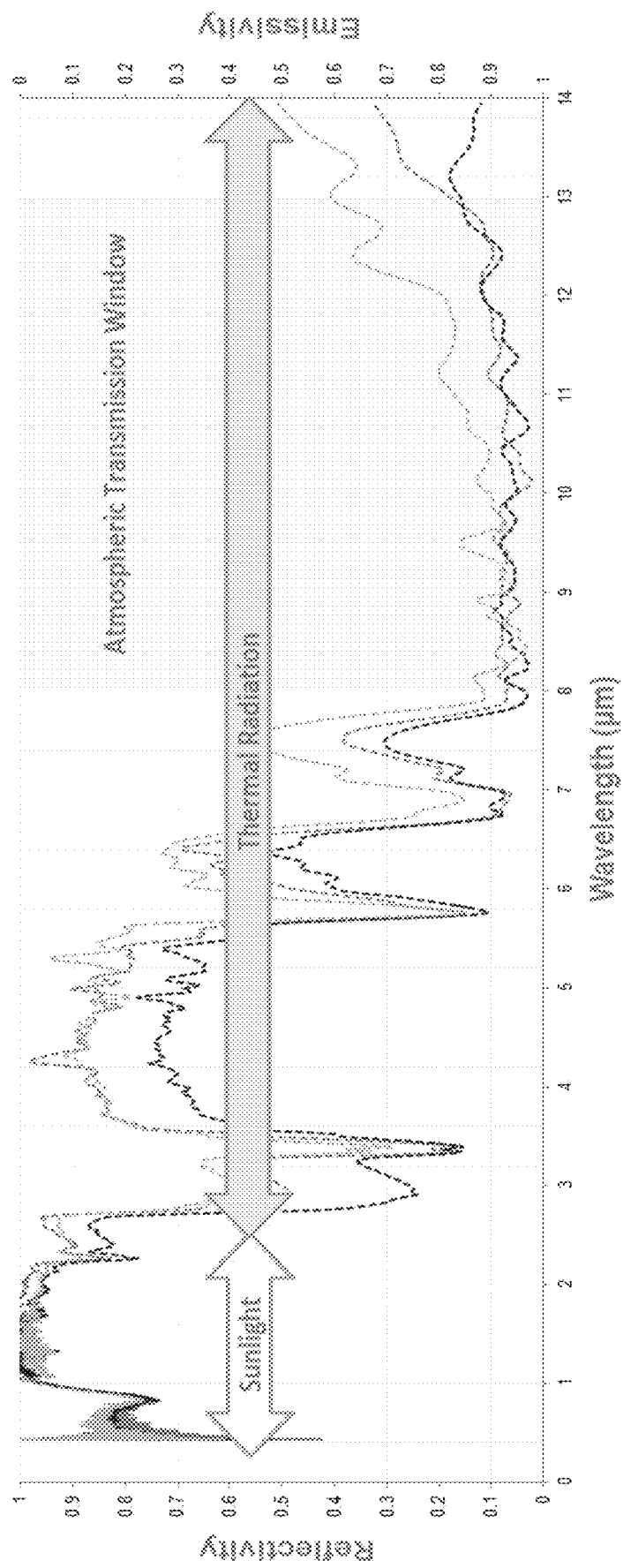
FIG. 2 depicts example reflectivity and emissivity (that is, 1-reflectivity) spectra of a system for radiative cooling in accordance with the disclosed subject matter.

In addition to the low absorptivity in the solar spectrum and high emissivity in the thermal spectrum, the system can have a high reflectivity in the solar spectrum. For example, such high reflectivity can result from the top layer and/or an underlying reflective layer of the system. Therefore, the system can efficiently dissipate heat as thermal radiation as well as reflect back any incident sunlight. Such systems can be used, e.g., for passive radiative cooling. For the purpose of illustration, FIG. 2 provides example reflectivity and emissivity spectra for three such systems. As shown in FIG. 2, the systems have relatively high reflectivity in the solar spectrum and lower reflectivity (i. e., relatively high emissivity) in the thermal spectrum, and particularly in the atmospheric transmission window.

Figure 3:
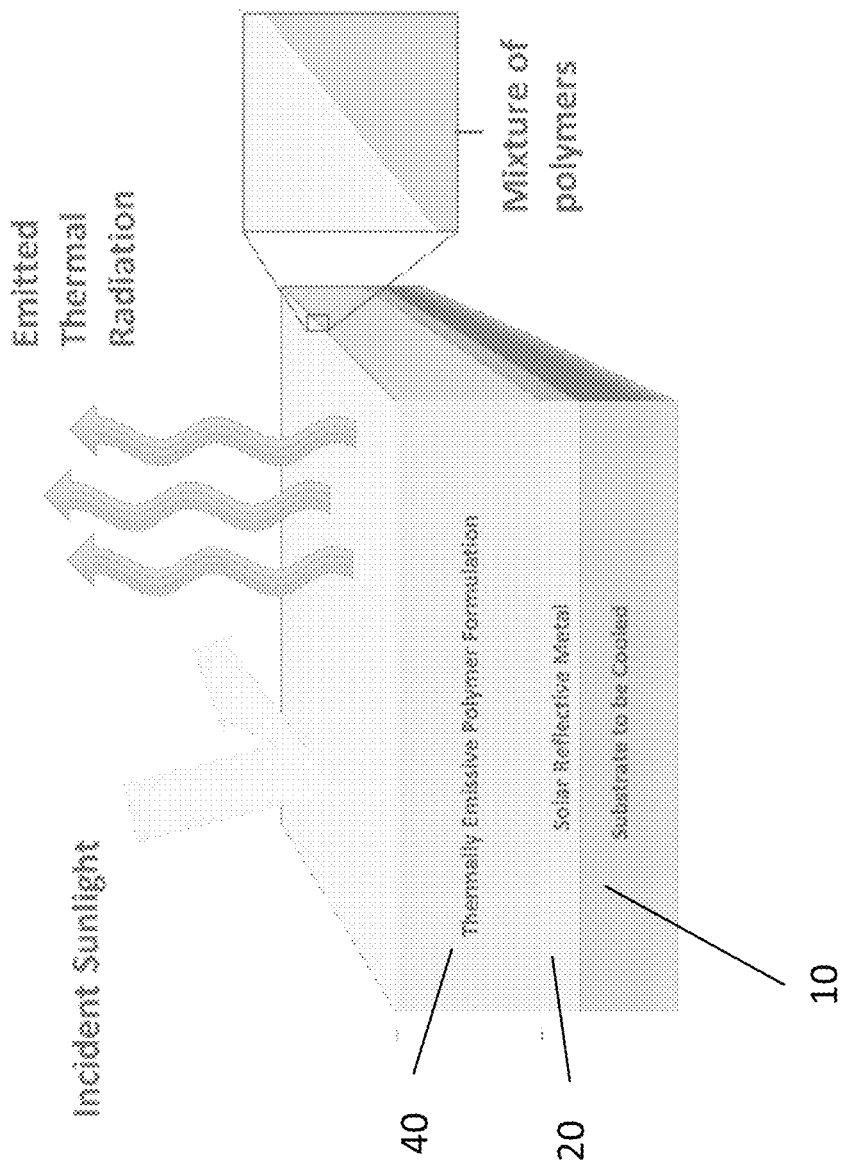
FIG. 3 provides a schematic illustration of a system for radiative cooling according to one exemplary embodiment of the disclosed subject matter.

For the purpose of illustration and not limitation, FIG. 3 is a schematic representation of a system according to a non-limiting embodiment of the disclosed subject matter. As shown in FIG. 3, the system 300 can include multiple layers in a stacked configuration.

As embodied herein, the system 300 can include a substrate 10. When present, the substrate 10 forms the base of the system, and can provide a platform for the other layers. The other layers of the system, not including the substrate, can collectively be called a "coating." The substrate can be an inert material.

In certain embodiments, the substrate can be the object or structure itself, that is, the additional layers of the system can be coated directly onto the object or structure to provide radiative cooling. In such embodiments, the substrate can be a smooth object to facilitate coating of the additional layers. The additional layers can be coated in multiple steps, or can be layered together and then applied to the substrate together.

In certain embodiments, the substrate can be a rigid material. By way of example, and not limitation, such materials include silicon dioxide and aluminum oxide. A rigid substrate can provide support for a rigid system, which can be layered onto a structure, for example, as a tile, e.g., to provide radiative cooling.

Alternatively, the substrate can be a flexible material. By way of example, and not limitation, such materials include poly(dimethyl siloxane) and poly(vinylidene fluoride). A flexible substrate can be used in a flexible system, which can, for example, be coated onto an irregularly-shaped structure.

As embodied herein, and with continued reference to FIG. 3, the system 300 can include a reflective layer 20 adjacent to the substrate 10, if present. The reflective layer can reflect incident electromagnetic radiation. For example, a reflective layer can make the system more suitable for daytime passive radiative cooling. The reflective layer can also facilitate heat transfer from substrate. In certain embodiments, the reflective layer reflects radiation in at least a portion of the solar spectrum. Thus, as embodied herein, the reflective layer can have high reflectivity in at least a portion of the solar spectrum.

For example, and not limitation, the reflective layer can include a single layer of a metal, such as silver or aluminum. As embodied herein, the reflective layer can also include two or more layers, each including one or more metals. For example, a smooth metal layer having low reflectivity at certain wavelengths can have its reflectivity enhanced by layering a thin film of a different metal, having a higher reflectivity and small electromagnetic penetration depth in those wavelengths, on top. As embodied herein, the thickness of the thin film can be comparable to, or greater than, its electromagnetic penetration depth at those wavelengths, such that minimal incident radiation in those wavelengths reaches the underlying metal layer.

Therefore, for example, the reflective layer can include an upper layer and a lower layer. The upper layer can have a reflectivity of greater than about 0.8 and a first electromagnetic penetration depth within a first wavelength range in at least a portion of the solar spectrum. For example, the first electromagnetic penetration depth of the upper layer can be approximately 10 nm. In a second wavelength range in at least a portion of the solar spectrum, the upper layer can have a second electromagnetic penetration depth that is greater than the first electromagnetic penetration depth. For example, the second electromagnetic penetration depth of the upper layer can be approximately 20 nm. A lower layer can have a lower reflectivity than the upper layer in the first wavelength range and a higher reflectivity than the upper layer in the second wavelength range.

The thickness of the upper layer can be approximately greater than or equal to the first electromagnetic penetration depth within the first wavelength range and approximately less than the second electromagnetic penetration depth within the second wavelength range. As such, radiation in the first wavelength range will generally interact only with the upper layer. Additionally, the reflectivity of the reflective layer as a whole can be greater than the reflectivity of the lower layer in the first wavelength range but greater than the reflectivity of the upper layer in the second wavelength range. In this manner, the overall reflectivity of the reflective layer in the first wavelength range will be approximately the same as the reflectivity of the upper layer in that range. Moreover, radiation in the second wavelength range will generally be reflected by both the upper layer and the lower layer and thus the overall reflectivity of the reflective layer in the second wavelength range will approach the reflectivity of the lower layer in that range.

In this manner, a two-layer reflective layer can have increased reflectivity across the combined first and second wavelength ranges as compared to either of the constituents of the upper layer or the lower layer independently. A person of ordinary skill in the art will appreciate that this concept can be extended to a reflective layer having three or more layers, and to wavelength ranges that lie outside the solar spectrum.

Figure 4:
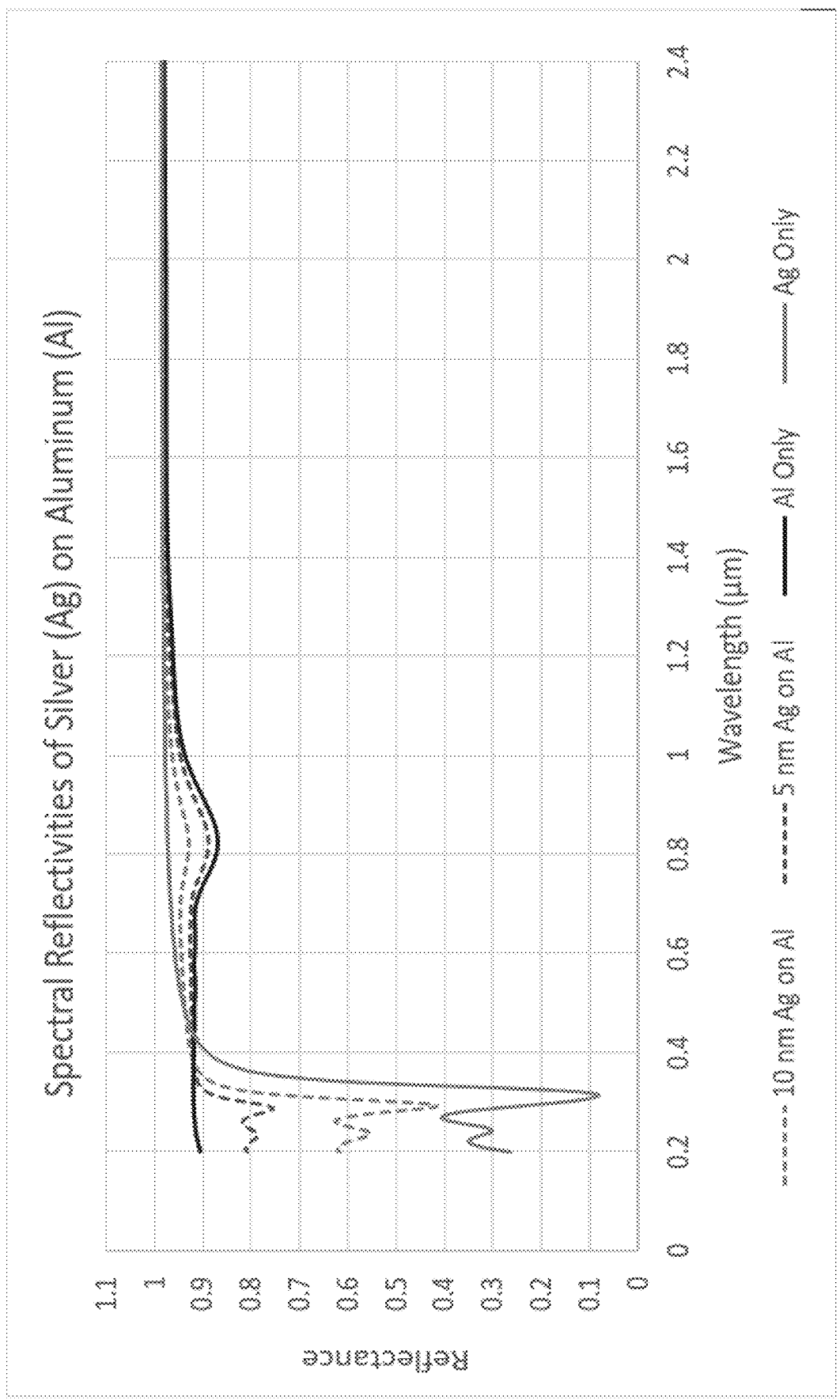
FIG. 4 depicts simulated reflection spectra of various metals that can be used in a reflective layer of a system for radiative cooling in accordance with the disclosed subject matter.

In particular embodiments, a two-layer reflective layer can have an upper layer including silver and a lower layer including aluminum. The upper layer, i.e., the silver, can have a thickness of from about 5 nm to about 50 nm. The lower layer can have a greater thickness than the upper layer, e.g., greater than about 200 nm. As illustrated in FIG. 4, this configuration was observed to have a reflectivity in the solar spectrum that is 2-3% greater (depending on the thickness of the upper layer) than the reflectivity of silver and aluminum taken independently.

In certain embodiments, the reflective layer can have an overall thickness of from about 50 nm to about 800 nm. The reflective layer can be formed separately and layered onto the substrate, or can be coated directly onto the substrate. For example, the reflective layer can be formed by electroplating, thermal vapor deposition, electron-beam deposition, a sputtering technique, or any other suitable technique, as known in the art. A person of ordinary skill will appreciate that the reflective layer can alternatively be formed and used as a standalone reflector.

As embodied herein, the system 300 can optionally further include a protective layer, which, if present, can be disposed between the reflective layer 20 and a top layer 40. The protective layer can protect the reflective layer 20, for example, during fabrication of the system and/or in the absence of the top layer 40. In certain embodiments, the protective layer 30 can have a thickness of less than about 10 nm. The protective layer can be formed of a material that does not significantly reduce the reflectivity of the reflective layer. By way of example, and not limitation, such materials include aluminum oxide and silicon dioxide. For example, the protective layer can be transparent in the first and/or second wavelength range.

As embodied herein, a top layer 40 can be disposed adjacent to the protective layer, or as shown in FIG. 3, adjacent to the reflective layer 20. The top layer 40 can have high emissivity in the thermal spectrum. Additionally or alternatively, the top layer 40 can have high transmittance and negligible absorptivity in the solar spectrum. The top layer 40 can have a thickness of from about 5 µm to about 500 µm.

The material of the top layer 40 can be chosen based on the desired radiation properties of the system 300, as well as the operating temperature and radiation source. Thus, the materials of the top layer 40 can depend on the intended use of the system 300. In certain embodiments, the top layer 40 can include one or more of poly(dimethyl siloxane), poly(vinylidene fluoride), poly(methyl methacrylate), poly(acrylic acid), and poly(vinyl acetate).

Figure 5:
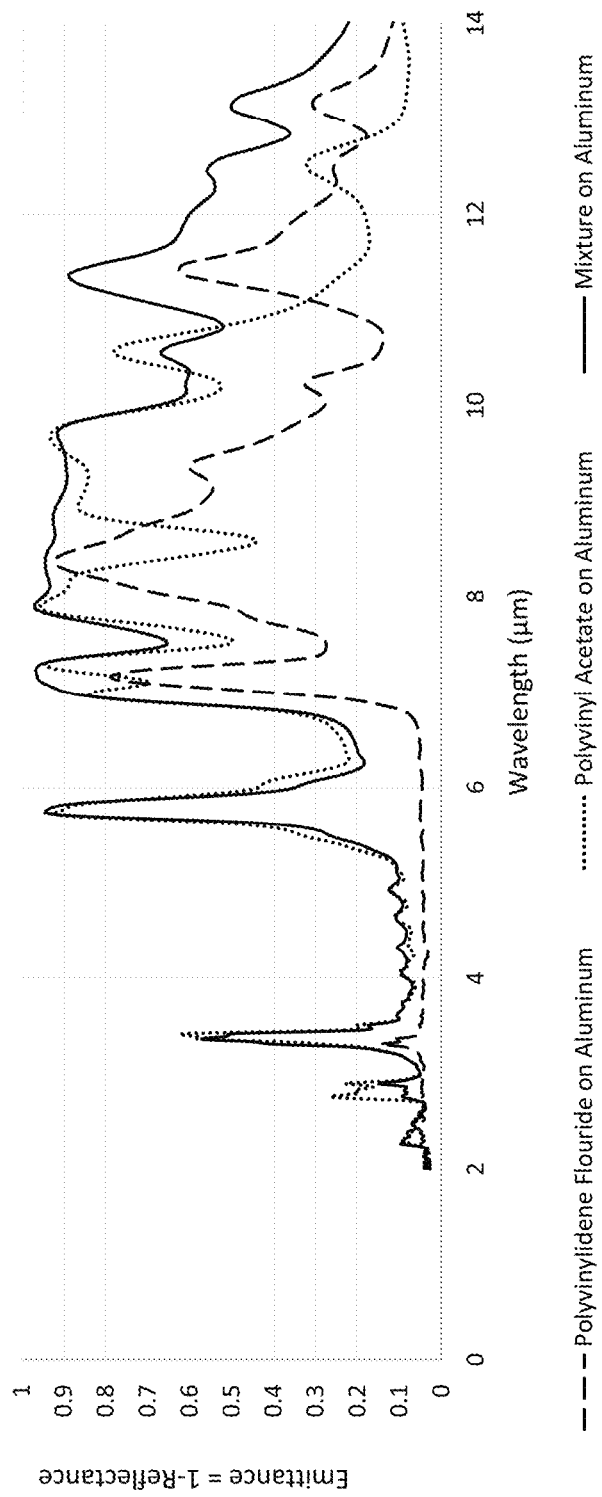
FIG. 5 depicts measured emissivity spectra of two different polymers, and the combination of those polymers, that can be used in a polymer layer of a system for radiative cooling in accordance with the disclosed subject matter.

A person of ordinary skill in the art will appreciate that each polymer has a variety of chemical bonds between its constituent atoms, each of which absorbs and emits certain wavelengths of electromagnetic radiation, for example, in the thermal spectrum. Each polymer, based on its chemical composition and atomic arrangement, has different numbers, arrangements and volumetric densities of these bonds, and consequently, a characteristic emissivity in the thermal spectrum. Many of these chemical bonds do not absorb wavelengths in the solar spectrum, and some polymers including, but not limited to, poly(vinylidene fluoride) and poly(methyl methacrylate), have significant emissivity in the thermal spectrum and essentially zero absorptivity in the solar spectrum. Therefore, a polymer can be identified or custom-synthesized with the suitable chemical and physical structure for the desired radiation characteristics. Alternatively, in certain embodiments, the top layer can include a combination of two or more polymers. Certain formulations of polymers can exhibit a combination of their characteristic emissivities in the thermal spectrum, while remaining essentially non-absorptive and transparent at wavelengths in the solar spectrum. For example, and not limitation, this principle is shown in FIG. 5, which illustrates the emissivities of a polymer formulation ("Mixture") and its constituent polymers, poly(vinylidene fluoride) and poly(vinyl acetate), on aluminum foil. The mixture shows emittance peaks where one or both of its constituents have peaks as well. For example, in FIG. 5, the mixture shows an emittance peak at about 7.8 µm, where poly(vinyl acetate) has a peak, at about 11.5 µm, where poly(vinylidene fluoride) has a peak, and at about 7 µm, where both have a peak.

As embodied herein, each of the polymers in a combination of two or more polymers can have a near-zero electromagnetic extinction coefficient, i.e., high transparency, in the solar spectrum such that the combination likewise has a near-zero electromagnetic extinction coefficient and high transparency. Additionally, each of the polymers can have a high electromagnetic extinction coefficient, i.e., emittance peak, within at least a portion of the thermal spectrum. For example, each polymer can have a high electromagnetic extinction coefficient in a different portion of the thermal spectrum.

A person of ordinary skill in the art will appreciate that the electromagnetic extinction coefficient is a component of the spectral complex refractive index of a material. In particular, the spectral complex refractive index is based on the refractive index, $n(\lambda)$, and the extinction coefficient, $\kappa(\lambda)$, i.e., the spectral complex refractive index is $n(\lambda) + i\kappa(\lambda)$. The refractive index determines how much light of the wavelength ($\lambda$) is reflected off the interface between that material and another material, while the extinction coefficient determines how strongly the material absorbs or emits light at that wavelength. As used herein, the phrase "high electromagnetic extinction coefficient," when used in connection with a material and a particular wavelength range means that the material has a higher electromagnetic extinction coefficient in that wavelength range as compared to its electromagnetic extinction coefficient in a different wavelength range.

Moreover, a person of ordinary skill in the art will appreciate that the emissivity of a polymer formulation in the thermal spectrum can depend on at least three factors: the spectral complex refractive indices of the constituent polymers, their miscibilities with each other, and their mass ratio. If each polymer has a high electromagnetic extinction coefficient in a different portion of the thermal spectrum, the overall emissivity of the top layer 40 will be a combination of the emissivities of all the constituent polymers. In this manner, the combination of polymers can have high emissivity in multiple portions of the thermal spectrum. The optical homogeneity of the formulation can depend on the miscibility of the polymers, which can be theoretically predicted or experimentally determined. For example, the more miscible the constituents are, the more spatially uniform the complex refractive index of the formulation will be. Additionally, the relative amounts (i.e., mass ratio) of the polymers can be chosen based on the relative values of their peak extinction coefficients. In this manner, a uniformly high emissivity can be ensured across much of the thermal spectrum without the overuse of any particular polymer type. For instance, a constituent polymer, which emits weakly but uniquely at a certain wavelength, can have a higher fractional mass in the formulation than that of another which absorbs more strongly at other wavelengths. Additionally, the miscibilities of the constituents and the mechanical integrity of the coating can themselves depend on the mass ratio, and can be a secondary determinant of the mass ratio in the formulation. Because of the variety of available polymers, a formulation with uniformly thermal emissivity across the thermal spectrum can be attained. Moreover, the relative amounts of the polymers can be chosen to fine tune the emissivity of the system in the thermal spectrum.

The top layer 40 can also include one or more polymers chosen based on mechanical and/or chemical binding strength, adhesion to metal surfaces, miscibility, corrosion resistance, and/or impermeability to water. As such, one or more polymers within the top layer 40 can be used to protect the metals of the reflective layer 20 from corrosion.

For thin top layers, i.e., those with thicknesses comparable to thermal radiation wavelengths, the thermal emissivity can also depend on the geometry of the top layer. In particular embodiments, the top layer has a thickness of from about 5 μm to about 20 μm. The thickness of the top layer can be chosen in order to entrap radiation having certain wavelengths within the thermal spectrum, thereby increasing the layer's emissivity at those wavelengths. Depending on its thickness and the complex spectral refractive indices of the polymer(s) and the underlying substrate, the top layer can trap and thereby increase the optical path length of specific wavelengths of the thermal spectrum. A longer optical path length permits light emitted within the top layer to garner more intensity as it moves within the layer, increasing the overall emissivity of the system. Modulating the dimensions of the top layer can enhance the overall emissivity, allowing the coating to be highly emissive even with a top layer having a small thickness.

Similarly, radiation in the thermal spectrum can be trapped by patterning the top layer with regions having a generally triangular cross-section. For example, as embodied herein, the top layer 40 can have a particular geometry to entrap radiation of a particular wavelength within the top layer. In certain embodiments, the top layer 40 can include arrays of one or more ridges and/or protrusions. For example, and with reference to the embodiment depicted in FIG. 6, the top layer 40 can include arrays formed of raised portions having a generally triangular cross-section. As used herein, the phrase "generally triangular" means that the shape includes three opposing faces that are not necessarily linear, and which are joined at vertices that can be angled or rounded. Such arrays on the top layer 40 can include ridges and/or protrusions, which can have the three-dimensional shape of a triangular prism, pyramid, or trapezoid. As embodied herein, the top layer 40 can include multiple such raised portions, which can be arranged in rows, grids, or another pattern to form said arrays. In certain embodiments, the peak-to-peak width of the raised portions can be from about 1 μm to about 15 μm and the peak-to-valley height can be from about 1 μm to about 15 μm. The geometry of the top layer 40 can be modulated to alter the thermal emissivity of the system.

In accordance with the disclosed subject matter, using a top layer having such triangular features can enhance the emissivity characteristics of the system in various wavelength ranges.

As embodied herein, the top layer 40 can be smoothly applied to the reflective layer 20, substrate 10, or another surface by physical or chemical vapor deposition, photolithography, electron-beam lithography, wet etching, reactive-ion etching, 3D printing, imprinting, spraying, dip-coating, spin-coating, or using an applicator, or by any other suitable technique, as known in the art.

The top layer described herein can have high emissivity in the thermal spectrum and practically zero absorptivity in the solar spectrum, and therefore can be suitable for passive radiative cooling applications requiring a high transmission of sunlight to an underlying substrate, such as windows and other glass-paneled building exteriors, as well as solar panels, and applications requiring the substrate color to be preserved, such as roof times and surfaces of laptops and other electronic equipment. Therefore, a person of ordinary skill in the art will appreciate that the top layer 40 can be used separately from the system, for example, without a reflective layer. However, if applied on a smooth metal surface with a high solar reflectance, e.g., a reflective layer, as in FIGS. 3 and 6, transmitted sunlight will be mostly reflected by the metal. The combined structure can have both a high emissivity in the thermal spectrum and a high reflectivity in the solar spectrum (i.e., greater than about 0.9 for both) as can be suitable for daytime passive radiative cooling.

Figure 7:
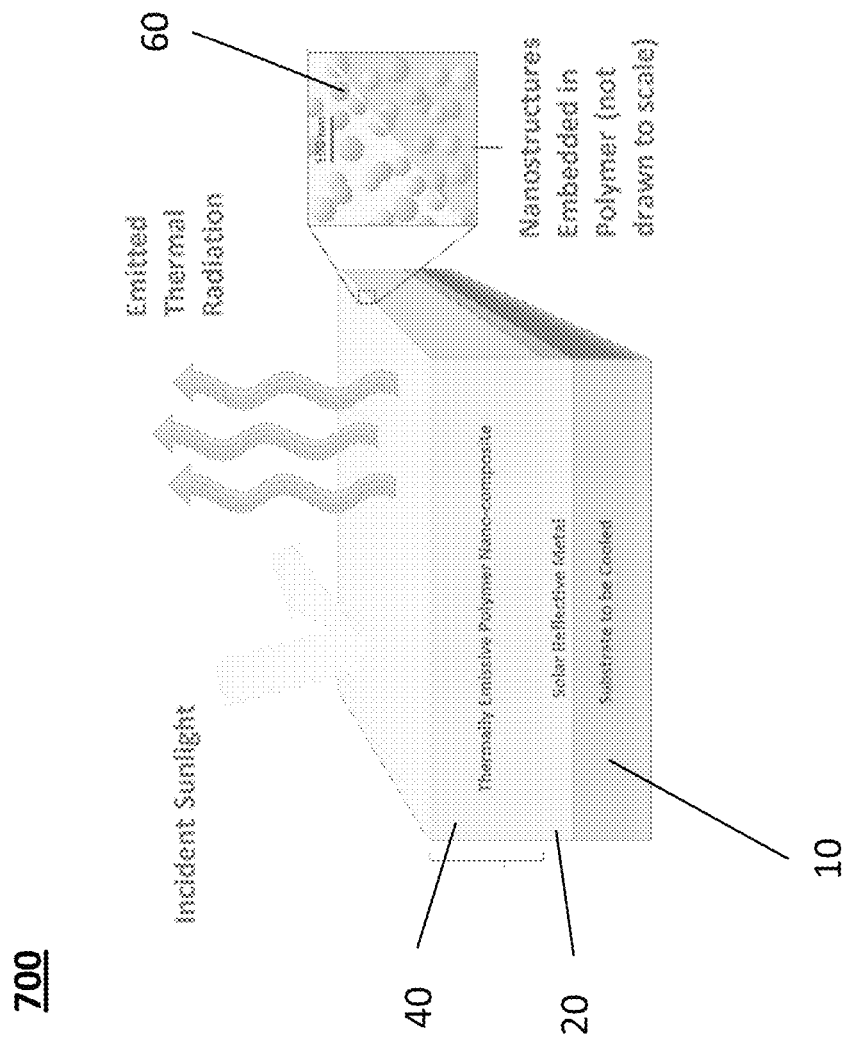
FIG. 7 provides a schematic illustration of a system for radiative cooling according to another exemplary embodiment of the disclosed subject matter including nanoparticles.

The top layer 40 can further include additional features. As embodied herein, and as illustrated in FIG. 7, the top layer 40 can optionally include nanoparticles 60. The terms "nanoparticles" and "nano-structures" are used interchangeably herein. For example, the nanoparticles 60 can include silicon nitride ($SiN_x$) (e.g., $Si_3N_4$), aluminum oxide ($Al_2O_3$), silicon dioxide ($SiO_2$), calcium carbonate ($CaCO_3$), and/or a combination thereof. The use of nanoparticles can increase emissivity in the thermal radiation range. In this manner, the use of nanoparticles can enhance emissivity of the top layer in the thermal spectrum, and the top layer can be thinner than an embodiment without nanoparticles while retaining similar performance. For example, a top layer with nanoparticles can have a thickness of from about 5 μm to about 10 μm.

Figure 8:
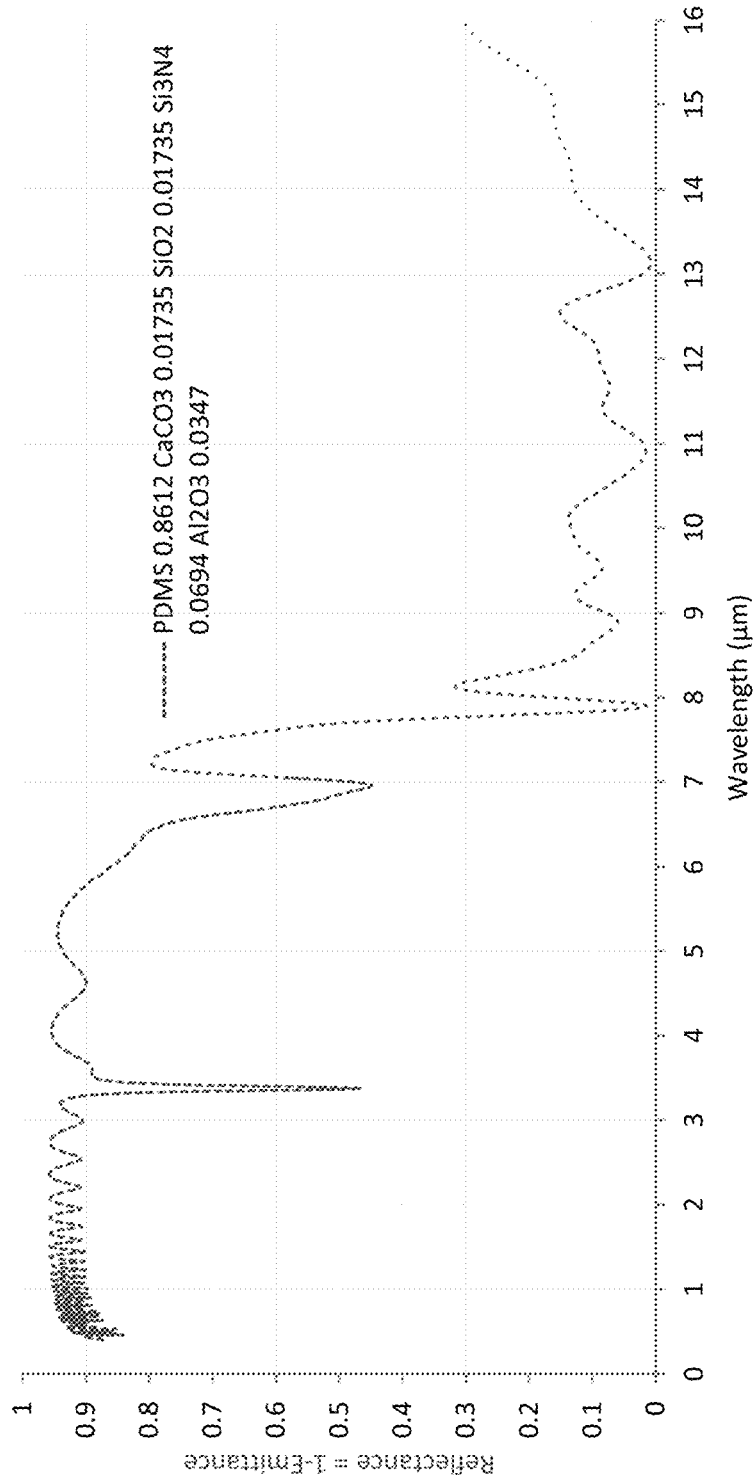
FIG. 8 depicts a simulated reflectivity and emissivity spectrum of an exemplary top layer including a polymer and multiple types of nanoparticles according to an exemplary embodiment of the disclosed subject matter.

For the purpose of illustration, and not limitation, FIG. 8 displays the simulated reflectivity of a 5 μm thick top layer containing poly(dimethyl siloxane) and $CaCO_3$, $SiO_2$, $Si_3N_4$, and $Al_2O_3$ nanoparticles in a volume ratio of 0.8612: 0.01735:0.01735:0.0694:0.0347. As shown in FIG. 8, a system with nanoparticles 60 and a reflective layer 20 can have relatively high reflectivity in the solar spectrum and lower reflectivity (i.e., relatively high emissivity) in the thermal spectrum, and particularly in the atmospheric transmission window as can be suitable for daytime passive radiative cooling.

Figure 9:
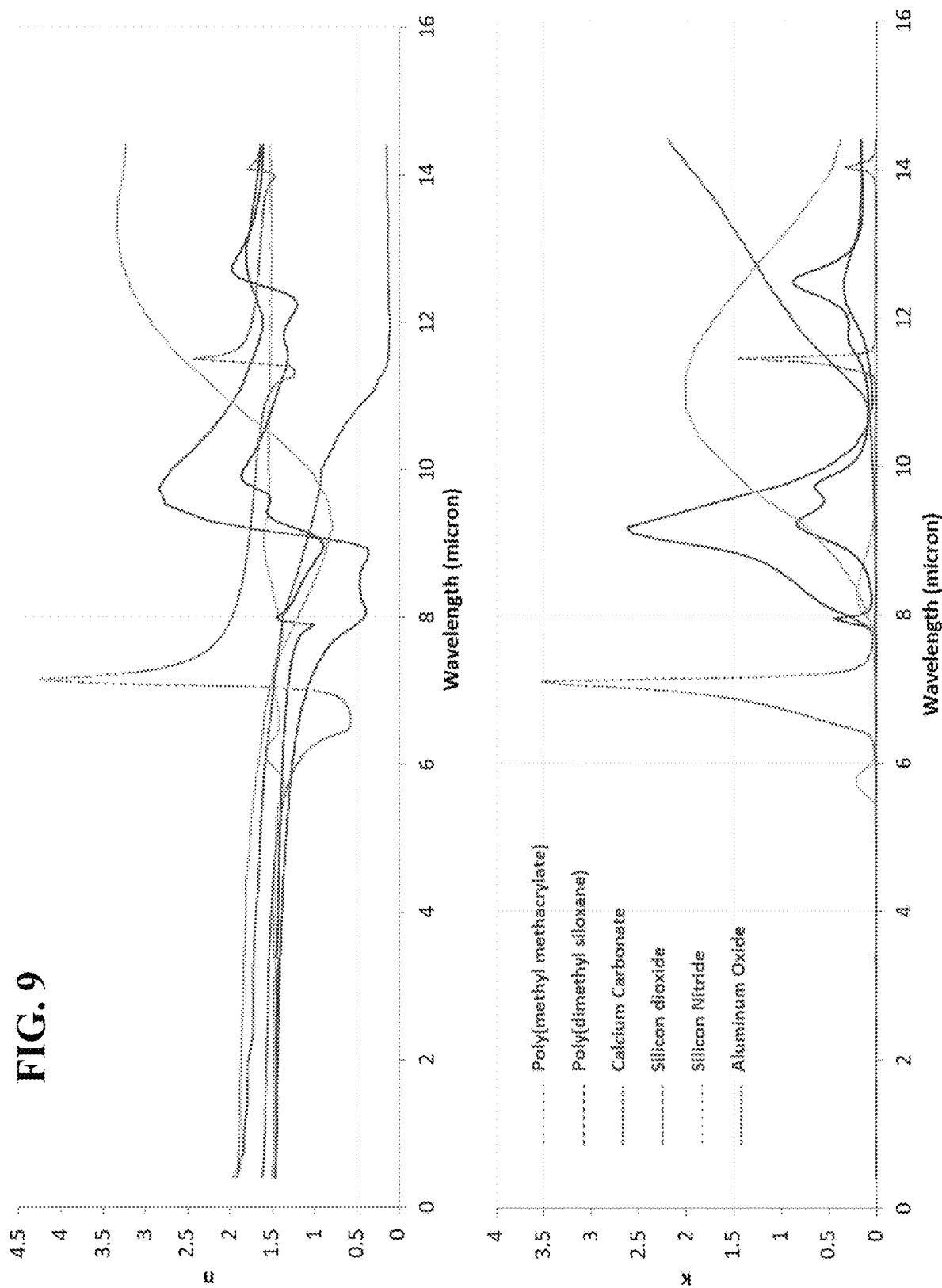
FIG. 9 depicts the refractive index, n, and the extinction coefficient, κ, for several organic polymers as compared to several inorganic nanoparticles.

As embodied herein, the materials, sizes, and mass ratio of the components of the top layer, i.e., the polymer(s) and nanoparticles, can be chosen to obtain the desired radiation characteristics. For example, nanoparticles can be selected and their ratio can be modulated to achieve high emissivity across the thermal spectrum based on the same considerations applied with respect to the polymer combinations described above. For example, several inorganic materials, including, but not limited to calcium carbonate ($CaCO_3$), silicon oxide ($SiO_2$), silicon nitride ($Si_3N_4$) and aluminum oxide ($Al_2O_3$), have significantly higher electromagnetic extinction coefficients than polymers, and at different wavelengths in the thermal spectrum, as a result of their characteristic phonon resonances. This is illustrated by FIG. 9, which shows the refractive index, n, and the extinction coefficient, κ, for several organic polymers as compared to several inorganic nanoparticles. Thus, the mass ratio of one or more types of nanoparticles and one or more polymers can be chosen to achieve a uniformly high emissivity across the thermal spectrum, while minimizing the amount of nanoparticles in the top layer.

As embodied herein, the nanoparticles can be selected to preserve the high solar reflectivity of the underlying reflective layer, if present. The selection of nanoparticles can be based on, for example, the complex refractive indices of the materials in the solar spectrum and the sizes of the nanoparticles. For example, the extinction coefficients of the nanoparticles in the solar spectrum can be approximately zero. For further example, the refractive indices of the materials in the solar spectrum can be similar to minimize scattering, e.g., with 10% of each other within at least a portion of the solar spectrum. Moreover, for those refractive indices, the nanoparticles can be sufficiently small, e.g., less than about 100 nm in diameter, to minimize optical scattering which can trap sunlight within the top layer and cause increased absorption by the reflective layer 20 in the solar spectrum. As will be appreciated by a person of ordinary skill in the art, small nanoparticles cannot be 'distinguished' from the polymer matrix by the thermal radiation because the wavelengths of thermal radiation are larger than the particles by at least a factor of 25. Thus, for such wavelengths, the top layer and nanoparticles behave like a single, highly emissive phase and creates an effective medium.

In certain embodiments, smaller nanoparticles (e.g., having diameters of less than 100 nm) are used. In particular embodiments, the nanoparticles have a diameter of about 20 nm, 25 nm, or 30 nm. By using smaller nanoparticles, the effective cross-sectional area for absorption by the nanoparticles can be increased compared to larger nanoparticles having the same total absorption volume.

Moreover, the concentration of nanoparticles 60 in the top layer 40 can be varied depending on the emissivity properties of the nanoparticles and the top layer. For example, for nanoparticles having a low electromagnetic extinction coefficient in the thermal spectrum, where there is also a large difference between the refractive index of the nanoparticles and that of the polymer(s) in the top layer, the concentration of the nanoparticles can be increased to increase absorptivity. For example, the nanoparticle:polymer volume concentration can be approximately 1:1.

Figure 10:
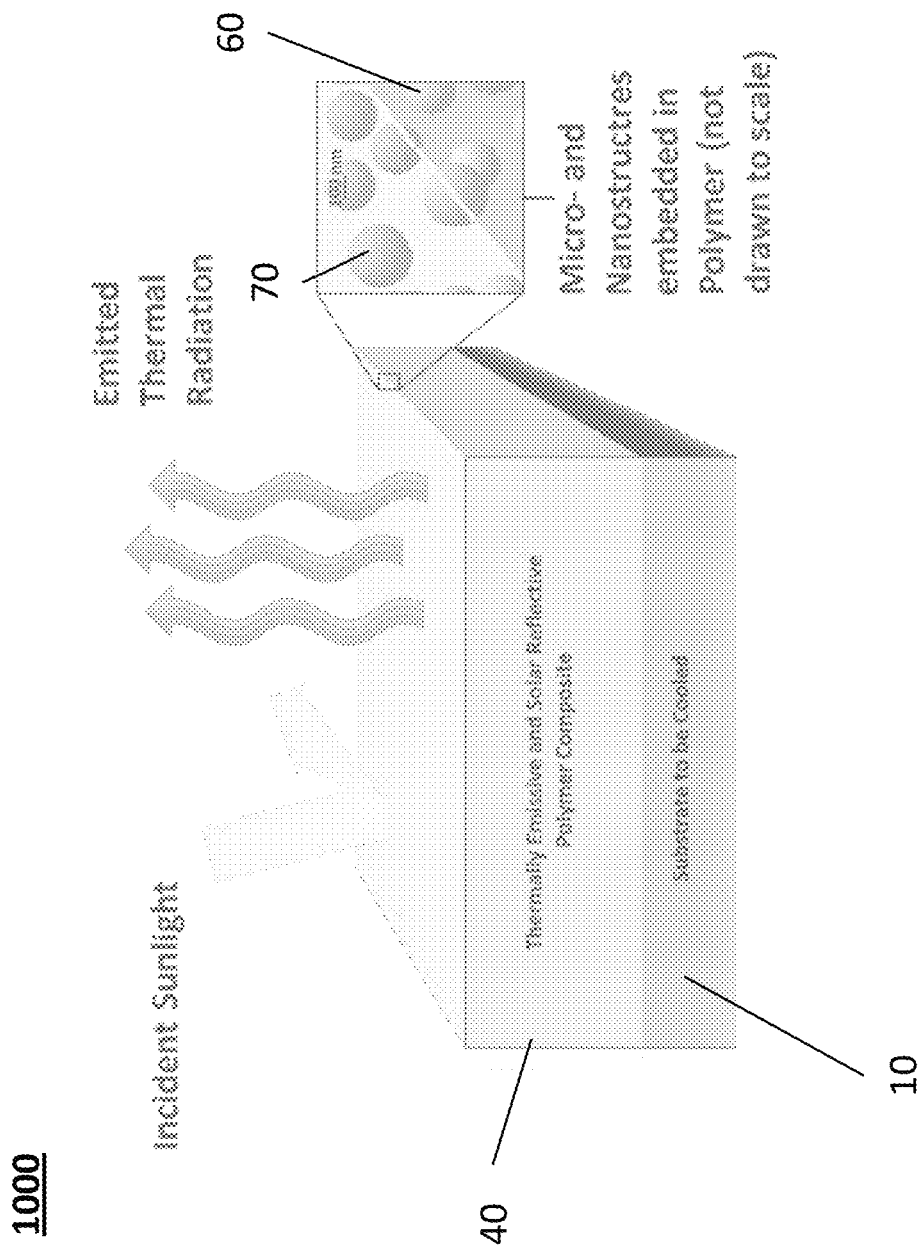
FIG. 10 provides a schematic illustration of a system for radiative cooling according to another exemplary embodiment of the disclosed subject matter including nano- and micro-structures.

Alternatively or additionally, and as embodied herein, the system can further include one or more additional additives, e.g., nano- and/or micro-structures, to enhance reflectivity in the solar spectrum. In certain embodiments, the one or more additives can have reflectivity of greater than about 0.3 in at least a portion of the solar spectrum. For example, microstructures 70 can be provided in addition to nano-structures 60, for example, as depicted in FIG. 10. Nano- and micro-structures that exhibit high back-scattering in the solar spectrum can be used to provide increased reflectivity (e.g., greater than about 0.95) in the solar spectrum while retaining increased emissivity (e.g., greater than about 0.95) in the thermal spectrum. Thus, such systems can be used for passive radiative cooling. Moreover, such systems can have a top layer with a thickness of less than 20 μm.

Figure 11:
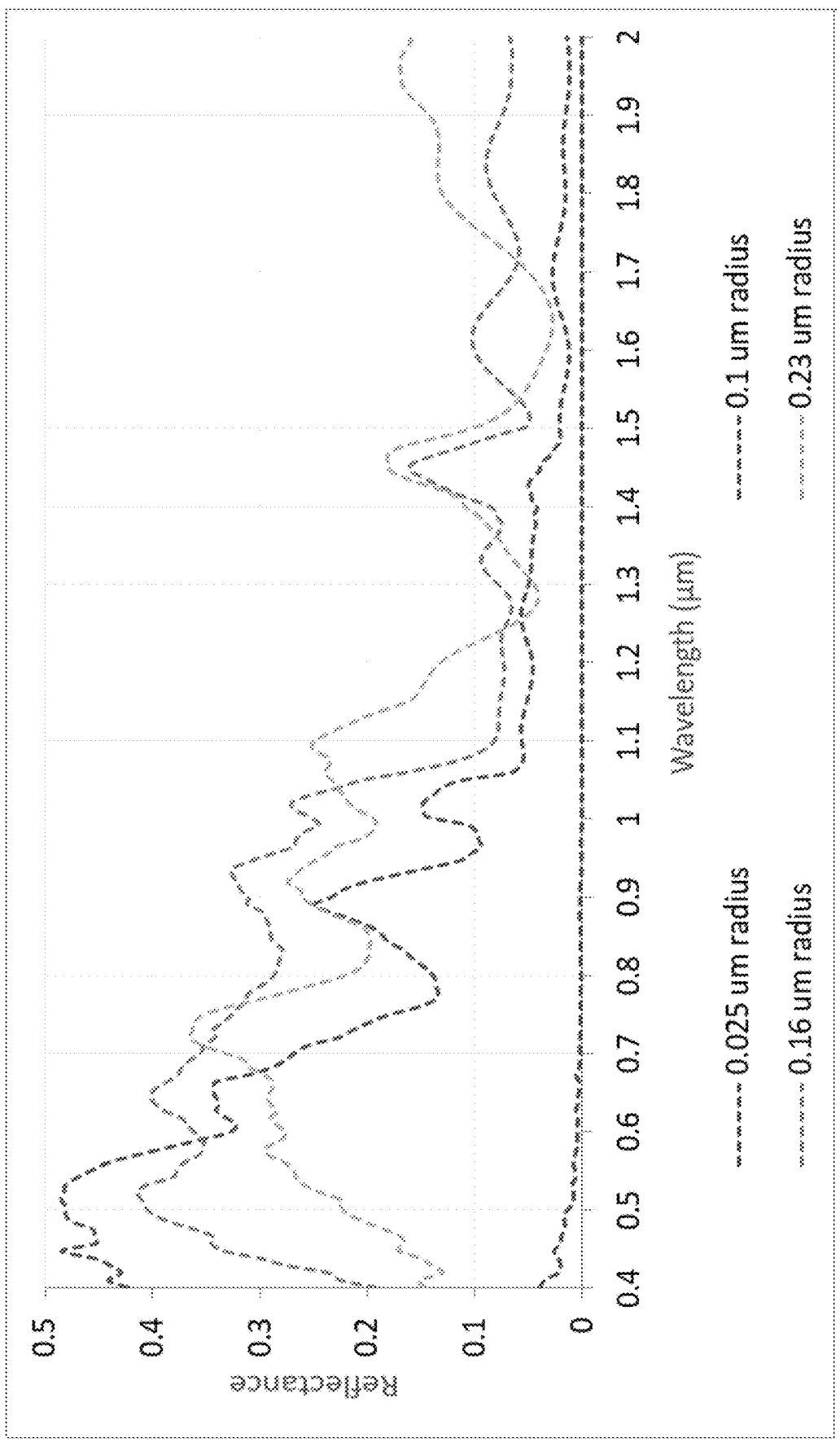
FIG. 11 depicts simulated reflection spectra for titanium dioxide particles having various diameters.

The materials, sizes, and mass ratio of the nano- and micro-structures can be chosen to obatin high reflectivity in the solar range. For example, the electromagnetic extinction coefficients, κ, of the nano- and/or micro-structures can be approximately zero for wavelengths in the solar spectrum. Additionally, the refractive indices, n, of the nano- and/or micro-structures and the polymers can be different from each other in one or more portions of the solar spectrum to enhance scattering. For the given refractive indices, the nano- and/or micro-structure's sizes can be chosen such that incident solar radiation is scattered backwards as a consequence of Mie resonances into the external environment. As such, the nano- and/or micro-structures can include materials with high refractive indices in the solar spectrum, such as, but not limited to, titanium dioxide, silicon nitride, zinc oxide, silicon dioxide, and aluminum oxide. In certain embodiments, multiple nano- and/or micro-structures can have different sizes to back-scatter light at different wavelengths. These materials can be used in conjunction with materials having lower refractive indices, such as silicon dioxide, poly(vinylidene fluoride), and silicone. Additionally or alternatively, the additive can include one or more artificially introduced air voids. Furthermore, to enhance back-scattering of a broad range of solar radiation, nano- and/or micro-structures of different sizes can be used, for example, as simulated in FIG. 11 for titanium dioxide particles.

In this manner, the nano- and/or micro-structures can be used to create a top layer having a high reflectivity in a broadband range of the solar spectrum. As described above, materials, such as silicon dioxide, aluminum oxide, and polymer matrix constituents, which are also emissive in the thermal spectrum can be used to create a top layer having a high emissivity in the thermal spectrum. Indeed, larger structures, such as micro-structures, can also scatter thermal radiation sideways into the top layer, thereby increasing the optical path length and emissivity. Moreover, as described previously, one or more polymers can be used, and can be chosen, e.g., for their mechanical and chemical binding strength and corrosion resistance. Furthermore, fibers and textiles embedded with nanostructures, including air voids, can be incorporated into the top layer. The cellulose fibers can mechanically strengthen the top layer and/or enhance back scattering of sunlight, at relatively little expense.

In addition, the nanostructured fibers can be used to make fabrics and textiles for the apparel industry. Such fabrics or textiles feature high solar reflection and thermal radiation with a faction of the weight compared to the state of the art. Specifically, only a few layers of fibers are needed to construct a fabric or textile to achieve solar reflectivity and thermal emissivity to be both larger than 0.9. In addition, being ultra-thin, such radiative cooling fibers can promote efficient convective, evaporative, and radiative cooling of the wears.

Figure 30:
FIG. 30 shows a scanning electron microscope image of a bundle of regenerated silk fibers having a high density of air voids.
Figure 31B:
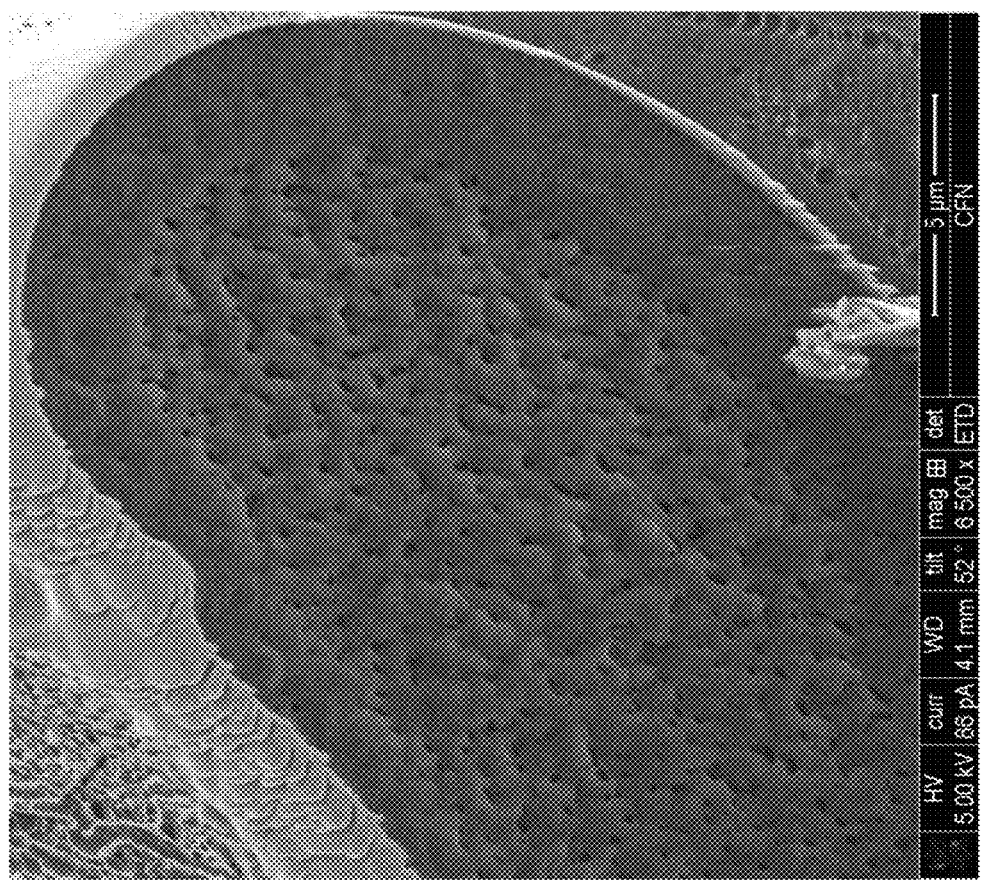
FIGS. 31A-31B are scanning electron microscope images of regenerated silk fibers with a high density of voids (FIG. 31A) compared to silk fibers with a low density of voids (FIG. 31B).
Figure 31A:
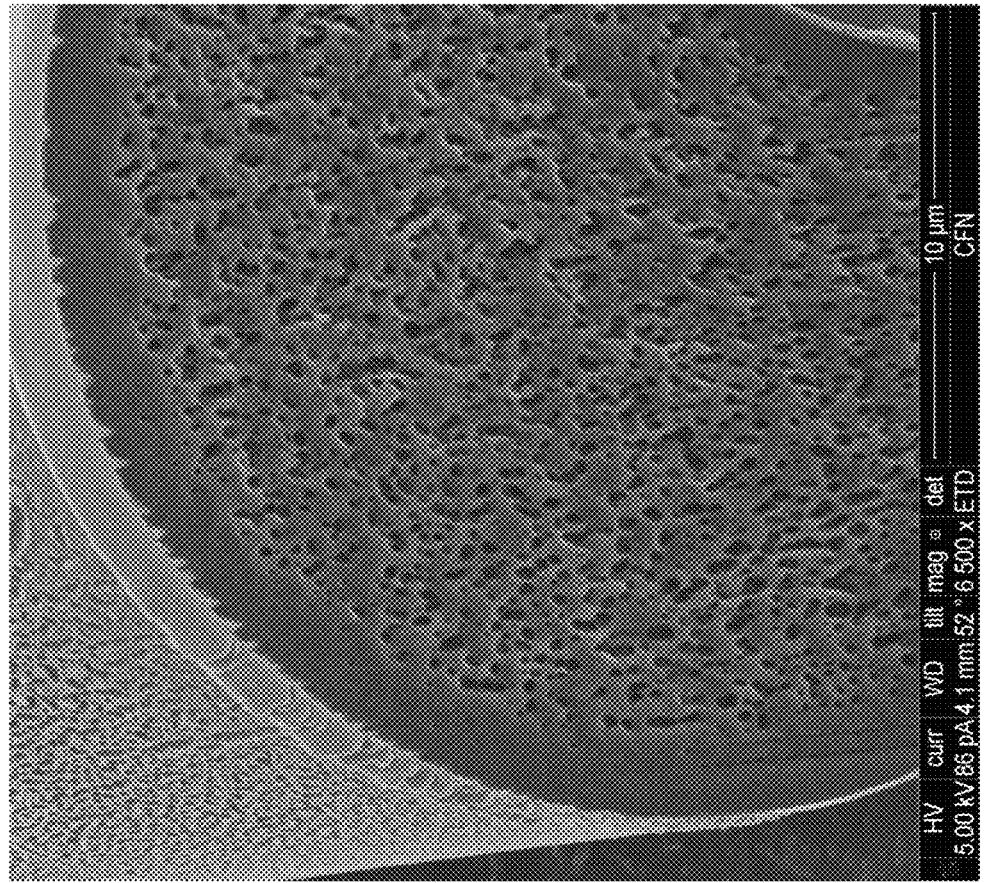

For example, as shown in FIG. 30, a bundle of regenerated silk fibers can be incorporated into the top layer. The bundle of regenerated silk fibers can include air voids, which can be introduced through a phase separation process during the fiber pulling procedure. The amount of internal air voids can be controllable. Exemplary regenerated silk fibers with a high density of voids are shown in FIG. 31A and fibers with a low density of voids are shown in FIG. 31B.

Figure 32:
FIG. 32 is a photo showing domestic silk moth fibers, regenerated silk fibers and wild silk moth fibers.

In certain embodiments, the voids can back-scatter sunlight, and the fibers can appear intensely white such that a fabric made of a few layers of the fibers can be totally opaque. FIG. 32 is a photo showing the regenerated silk fibers (5 fibers side-by-side forming a band) having a high density of air voids are more reflective than a bundle of domestic silk moth fibers and more reflective than a wild silk moth fiber, which contains a high density of air voids, but also light absorbing sericin.

In certain embodiments, polyvinylidene difluoride (PVDF) fiber can be incorporated into the top layer. FIGS. 33A-33B are photos of transverse and longitudinal cross-sectional cut through PVDF fibers containing main filamentary air voids. FIG. 34B illustrates a bundle of PVDF fibers containing a high density of air voids. The voids can be introduced through a phase separation process during the fiber pulling procedure. The void can scatter sunlight, which can result in a high solar reflectivity. The one-dimensional nature of the voids can impart a reflective sheen to the fiber. For example, as shown in FIG. 34A, a man-made PVDF fiber containing a high density of air voids can be more reflective than a wild silk moth fiber, which also contains a high density of air voids.

In some embodiments, the materials of the fibers/textiles include but not limited to regenerated silk, rayon, nylon, polyethylene, polyester, and PVDF. The thickness of the fibers can be between 1 micron and 500 microns.

Furthermore, taking the above-described considerations into account, the mass ratios of each component can be modulated to obtain the best optical, mechanical, and chemical performance while minimizing the use of each constituent.

Accordingly, the geometry, materials, and other features of the top layer 40 can be varied, to fine tune the reflectivity and emissivity, depending on the desired properties of the system 1000. Thus, the performance of a radiative cooling system can be improved given an operating temperature, radiation source, and blackbody temperature.

Figure 6:
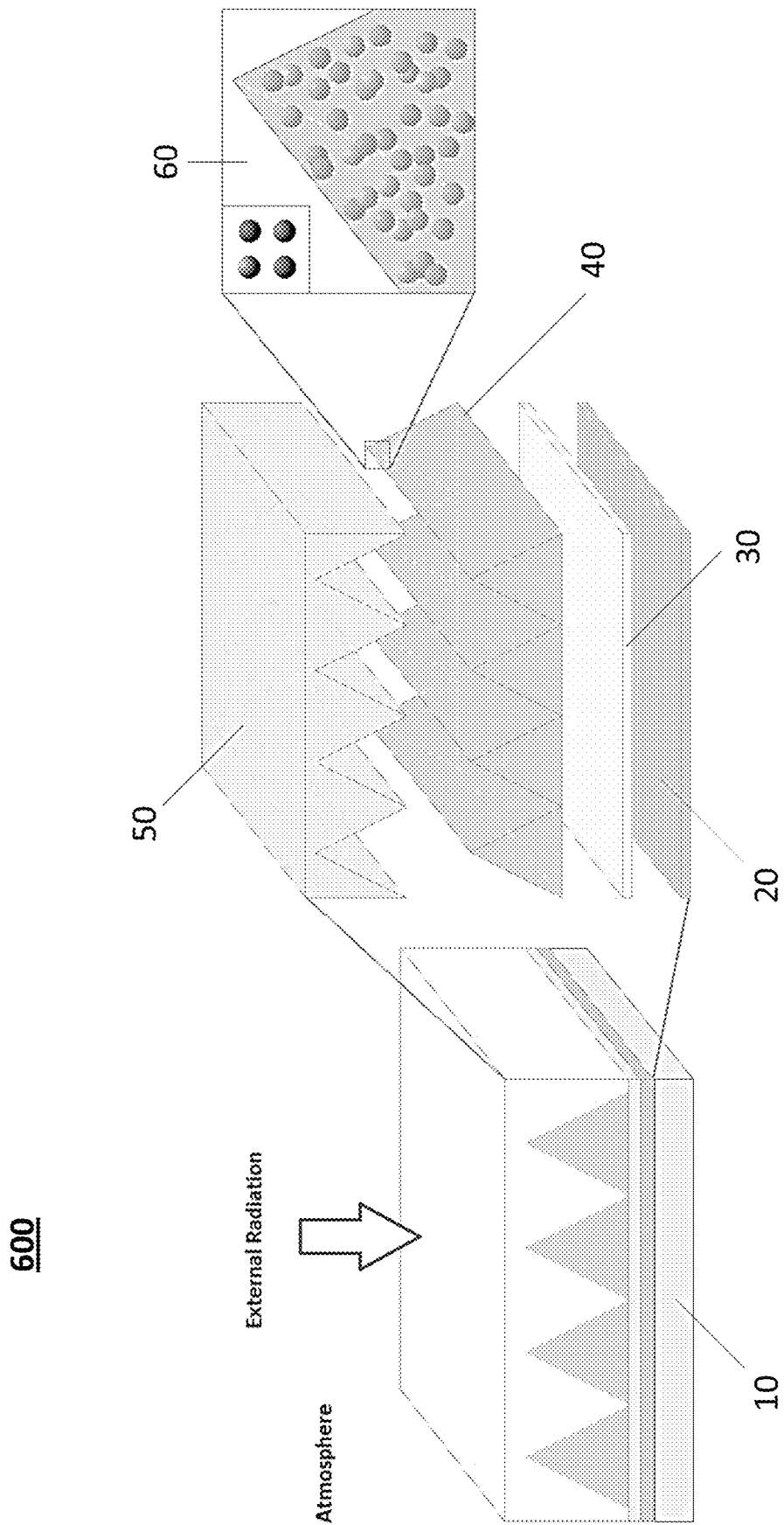
FIG. 6 provides a schematic illustration of a system for radiative cooling according to another exemplary embodiment of the disclosed subject matter.

As shown in FIG. 6, the system can further include a cover layer 50. The cover layer 50 can be fitted over the top layer 40. The cover layer 50 can thus protect the top layer 40, particularly where the top layer is patterned, as described above. Where nanoparticles and/or a coating are present, the cover layer 50 can provide stability and protection to the top layer 40 to ensure that the nanoparticles and/or coating remain in place. The cover layer 50 can be made of any suitable material, for example, and not limitation, poly (dimethyl siloxane) and/or poly(methyl methacrylate). In certain embodiments, the cover layer 50 can have similar radiation characteristics to the top layer 40. As embodied herein, the cover layer 50 can one or more different polymers than the top layer 40. As shown in FIG. 6, the geometry of the cover layer 50 can be compatible with the geometry of the top layer 40, such that it fits within any valleys and/or grooves created by the top layer. The cover layer 50 can have a thickness at its tallest point of from about 2 μm to about 15 μm, or from about 4 μm to about 8 μm.

In certain embodiments, the top layer 40 can be suspended. Suspending the top layer 40 can provide increased reflectivity by creating Mie resonance within the top layer. For example, a portion of the protective layer 30 and/or reflective layer 20 and/or substrate 10 can be removed to create a gap in the system 300.

Figure 12B:
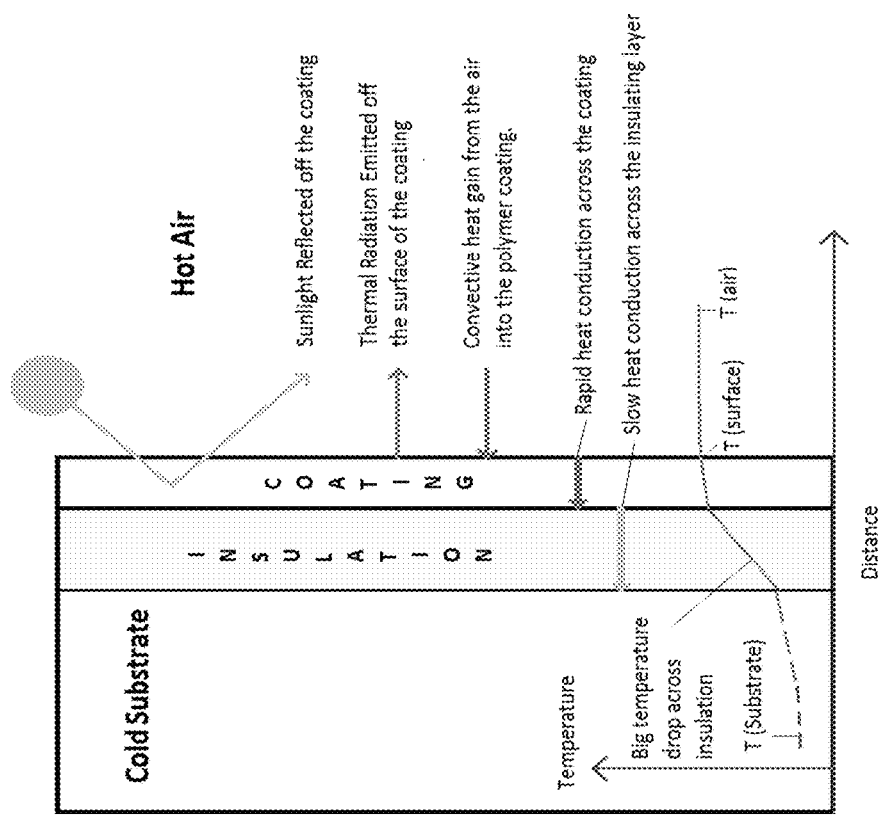
FIGS. 12A-12B provide schematic illustrations of heat transfer in a system for radiative cooling in accordance with the disclosed subject matter.
Figure 12A:
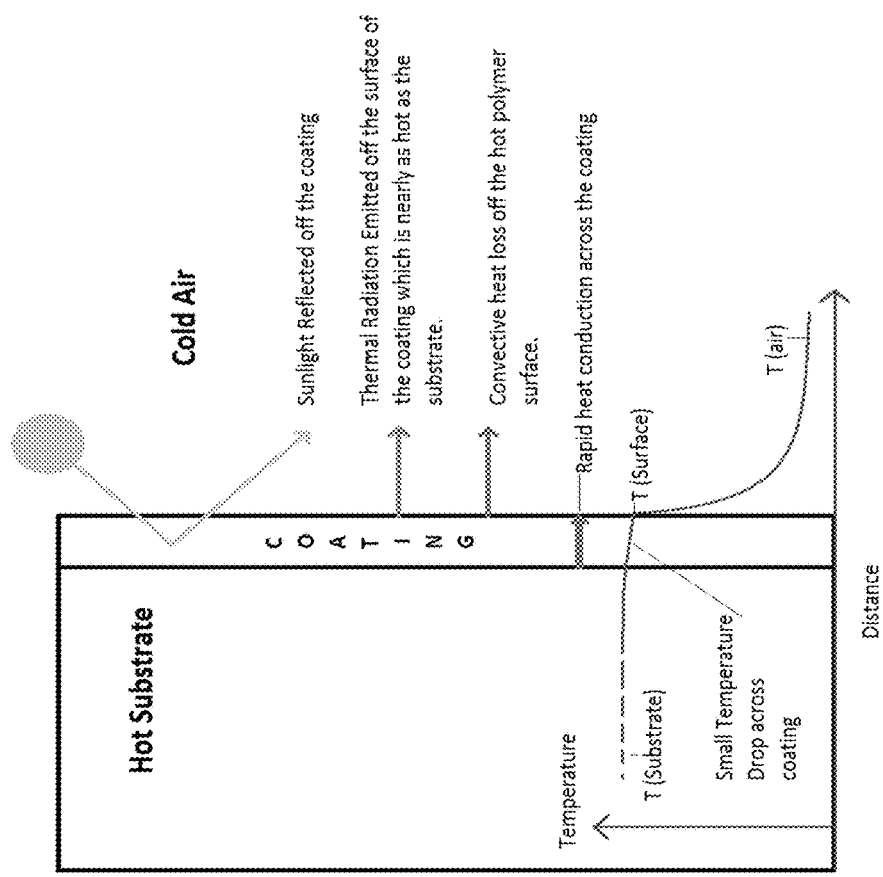

As embodied herein, the system can be used for passive radiative cooling, including daytime passive radiative cooling. For example, the system can be applied as a coating to a heat-generating object or structure (e.g., a vehicle or heated machine, instrument, or device). For such applications, a thin system having enhanced heat conduction can be beneficial. FIG. 12A provides a schematic illustration of the heat transfer in such applications. As shown in FIG. 12A, the heat can be quickly conducted through the system and emitted therefrom to the cooler external environment. Additionally, the system can reflect incidental sunlight. Alternatively, the system can be applied as a coating to a cool object or structure, as shown schematically in FIG. 12B. In such applications, an insulating layer can be placed adjacent to the system to insulate the object or structure from any heat conducted by the system. Additionally, the system can reflect incidental sunlight.

The presently disclosed subject matter also provides methods of manufacturing systems for radiative cooling. For example, the system can be layered directly onto a substrate, e.g., using an applicator or by spraying, brushing, dip-coating and spin coating, as known in the art. Alternatively, the system can be fabricated directly, e.g., by patterning a layer of mask. Alternatively, the system can be imprinted, e.g., using a mold.

Figure 13:
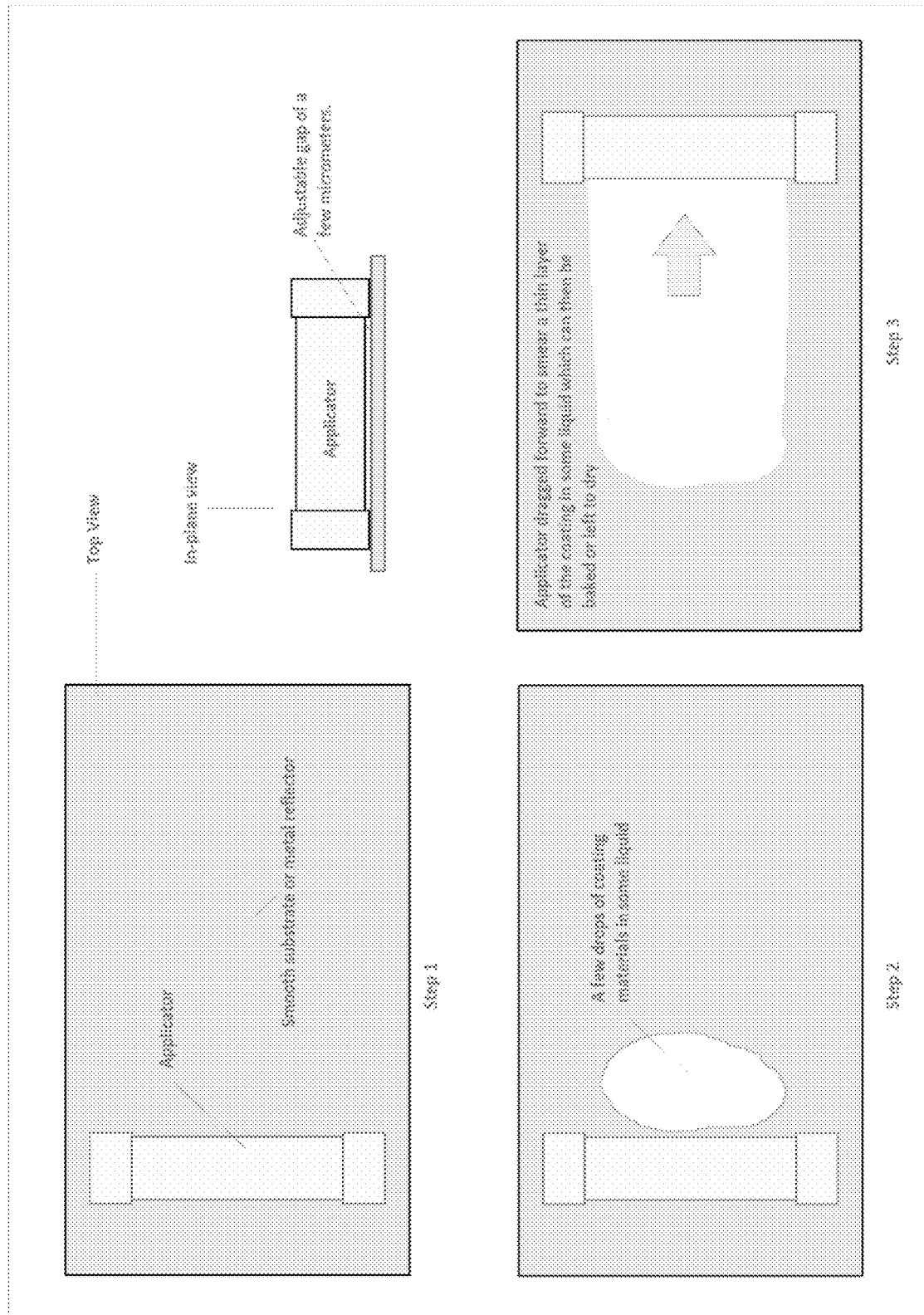
FIG. 13 depicts a method for fabricating a system for radiative cooling using an applicator in accordance with the disclosed subject matter.

For the purpose of illustration, and not limitation, an exemplary method of manufacturing a system for radiative cooling is depicted in FIG. 13. As shown in FIG. 13, an applicator can be used to layer the top layer onto a substrate. The materials of the top layer can be dispersed or dissolved in some liquid. Techniques such as stirring and sonication can be useful to uniformly disperse the particles and the polymers in the liquid. As shown in FIG. 13, there can be an adjustable gap between the applicator and the substrate, which can be used to control the thickness of the top layer. Additionally, the thickness of the top layer will depend on the viscosity of the liquid mixture of the polymer materials and the speed of the applicator. This process can be used to make pre-coated structures, such as metal roofs and surfaces of electronic devices.

Figure 14:
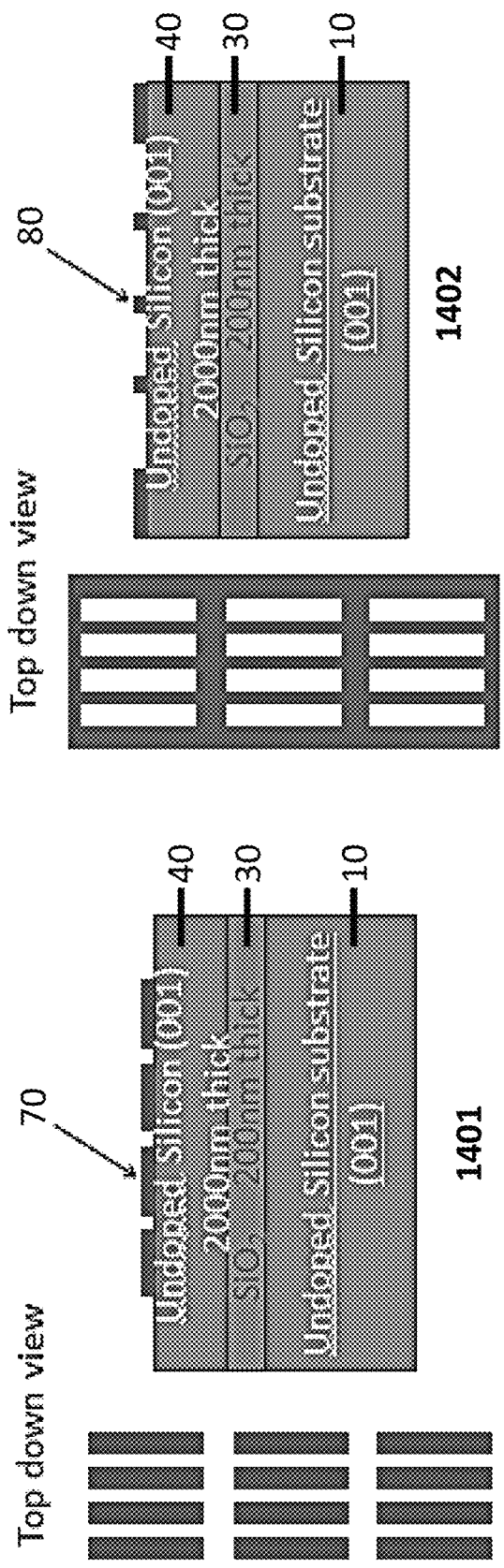
FIG. 14 depicts another method for fabricating a system for radiative cooling in accordance with the disclosed subject matter.

For the purpose of illustration, and not limitation, an exemplary method of manufacturing a system for radiative heating and cooling is depicted in FIG. 14. As shown in FIG. 14, the substrate 10, optionally, the reflective layer (not shown), the protective layer 30 (if present), and the top layer 40 can be in a layered configuration. This layering can be achieved by any suitable method known in the art. Further, a poly(methyl methacrylate) layer 70 can be applied on the surface of the top layer 40. The poly(methyl methacrylate) layer 70 can be formed of another suitable material, as known in the art.

The method 1400 can include patterning 1401. For example, the poly(methyl methacrylate) layer 70 can be pattered using electron beam lithography to expose a portion of the top layer 40. The method 1400 can further include sputtering 1402. As such, a thin film of $TiO_2$ can be sputtered onto the poly(methyl methacrylate) layer 70 and the exposed surface of the top layer 40 to create a mask 80. The method 1400 can further include etching 1403. The top layer 40 can be etched, e.g., by anisotropic wet etching. For example, the wet etching can be performed using KOH.

Optionally, the top layer 40 can be suspended over the substrate 10. Therefore, in certain embodiments, the method 1400 can further include a second etching 1404. As shown in FIG. 14, a portion of the protective layer 30 can be etched to create a gap between the substrate 10 and the top layer 40. For example, the second etching procedure can be performed using wet etching and critical point drying. In certain embodiments, the wet etching can be performed using hydrofluoric acid (HF).

In alternative embodiments, the system can be formed using an imprinting technique, e.g., with a solid mold. For purposes of illustration, and not limitation, another exemplary method of manufacturing a system for radiative heating and cooling is depicted in FIG. 15.

Figure 15:
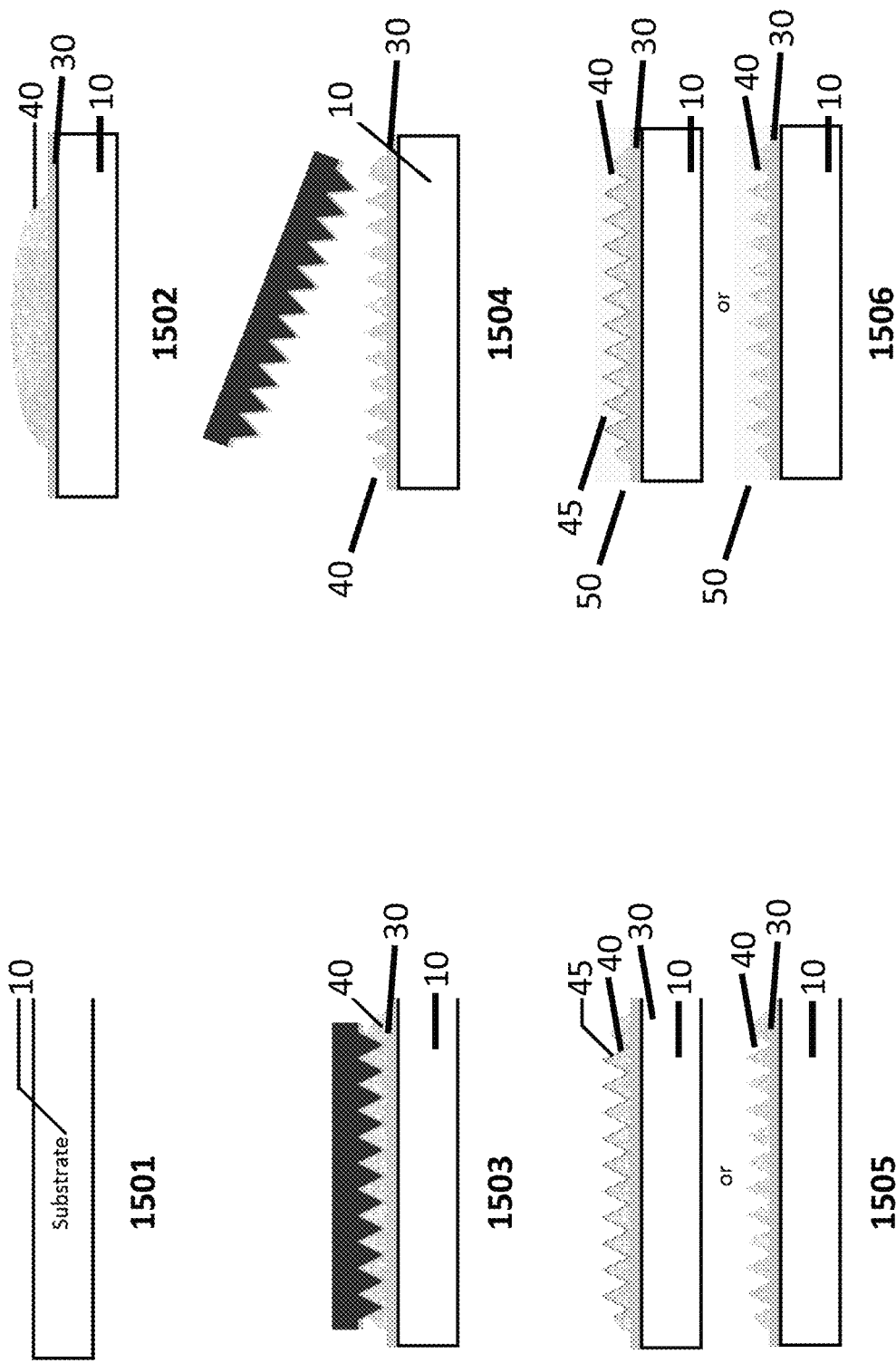
FIG. 15 depicts another method for fabricating a system for radiative cooling in accordance with the disclosed subject matter.

As illustrated in FIG. 15, the method 1500 can include providing a substrate 1501. In certain embodiments, a reflective layer (not pictured) as described above can be layered onto the substrate 10. For example, the reflective layer can be applied using thermal vapor deposition or electron beam deposition.

The method 1500 can further include applying a protective layer and/or a top layer 1502. The protective layer 30 can be scraped or spun onto the substrate 10 (or the reflective layer, if present). After applying the protective layer 30, the protective layer together with the substrate 10 can be baked to cure the material of the protective layer 30. Further, the top layer 40 can be applied on top of the protective layer 30. The top layer 40 can be scraped or spun onto the protective layer 30. In certain embodiments, the top layer 40 can be partially baked.

In those embodiments where the top layer 40 includes nanoparticles, the nanoparticles can be introduced into the material of the top layer prior to applying the top layer to the protective layer 30. For example, to ensure that the top layer 40 has a high concentration of nanoparticles, a dilute solution of the material of the top layer and the nanoparticles in a solvent can be concentrated to the desired level. The solvent can be evaporated, and the mixture can be used in the top layer 40.

The method 1500 can further include imprinting the top layer 40 using a mold 1503. The mold can be formed using wet etching, 3D nano-printing, focused ion beam milling, or another suitable method. In certain embodiments, the mold is formed using the techniques described above in connection with FIG. 14. The imprinting can form the top layer 40 into the desired geometry.

The method 1500 can further include removing the mold 1504. The top layer 40, together with the protective layer 30 and substrate 10 can be baked fully to cure the top layer. The mold can be removed prior to or after the baking. In certain embodiments, the mold can be removed after partially baking the top layer.

The method 1500 can optionally further include coating the top layer 1505. For example, the top layer 40 can be coated with a reflective and/or absorptive coating 45 that reflects and/or absorbs radiation within a desired range. The coating can be applied using physical vapor deposition. The method 1500 can further include applying a cover layer 1506. The cover layer 50 can be coated over the top layer 40 and coating 45, if present.

As embodied herein, air voids can be introduced into the top layer while manufacturing the presently disclosed systems. For example, air voids can be introduced by adding an immiscible liquid in the liquid mixture containing the polymer materials. After the top layer is applied, the immiscible liquid can be present as small droplets within the system. When the top layer has solidified, the immiscible liquid can be baked off, to leaving voids in the top layer.

Figure 16:
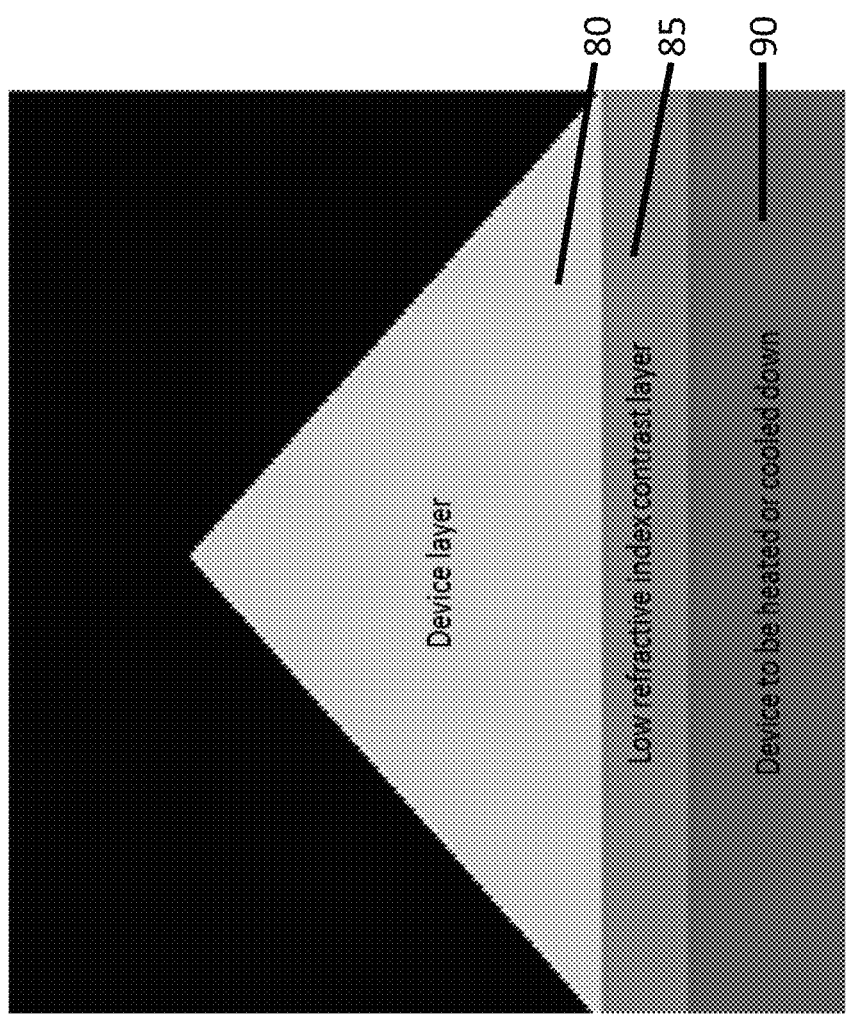
FIG. 16 provides a schematic illustration of a unit cell of an exemplary system for radiative cooling or heating according to an embodiment of the disclosed subject matter.

In addition to the systems for radiative cooling described above, a system for radiative cooling can include a top layer formed of a structured polymer. For the purpose of illustration and not limitation, FIG. 16 provides a cross-section of a unit cell of an example structured polymer 80 supported on a contrast layer 85 and a substrate 90 in accordance with the disclosed subject matter. The structured polymer can have high reflectivity in the solar spectrum and high emissivity in the thermal spectrum.

As embodied herein, the structured polymer can have lower absorptivity in the solar spectrum, and high absorptivity in the thermal spectrum. Accordingly, when structured into certain shapes, e.g., arrays including ridges and/or protrusions as described above, the top layer acts as a broadband reflector based on Mie resonances in the solar spectrum. Additionally, the top layer can act as an antireflective material in the thermal spectrum based on its geometry and the intrinsic absorption properties of the constituent polymer(s). As a result, the top layer can strongly absorb radiation in the thermal spectrum, and is therefore is a good emitter of thermal radiation. As a result of the combined high reflectivity in the solar spectrum and high emissivity in the thermal spectrum, such a structured polymer can efficiently maintain the substrate, object, or structure beneath the top layer at low temperatures. Where present, the contrast layer 85 can include one or more of calcium fluoride, magnesium fluoride, silicon dioxide, poly(dimethyl siloxane), and air void(s).

Figure 17:
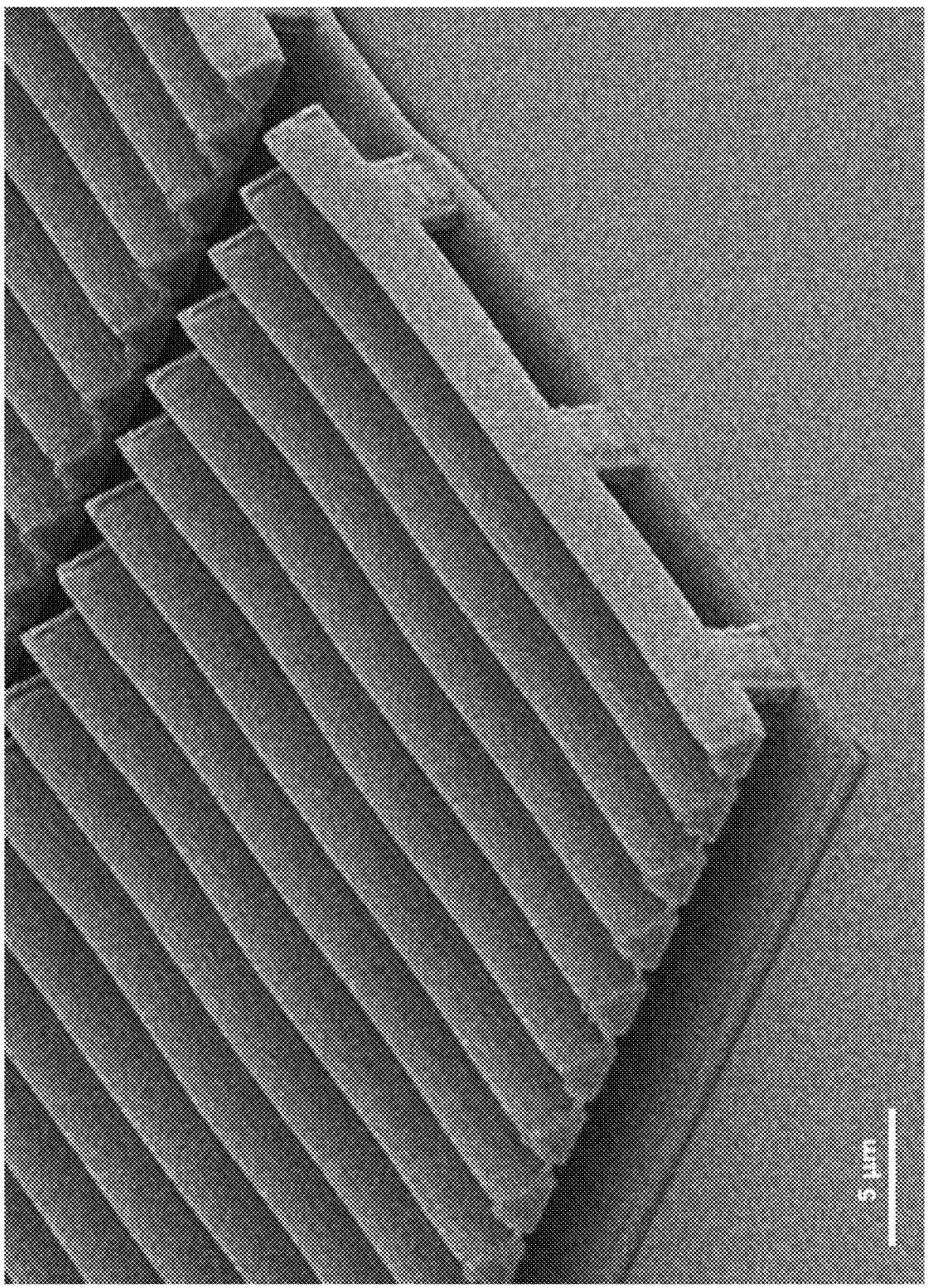
FIG. 17 provides a scanning electron microscopy image of an exemplary system for radiative cooling fabricated using 3D printing in accordance with the disclosed subject matter.

The structured polymer 80 can be fabricated using nanofabrication techniques and imprinting techniques, similar to those described above, or any other suitable technique, as known in the art. Alternatively, the structured polymer can be fabricated using a commercially available high-resolution 3D printing technique, e.g., based on two photon polymerization. A structured polymer, for example, consisting of many ridges having generally triangular cross-sections can be made of a photoresist polymer. One or more air gaps can be created underneath the structured polymer using supporting pillars at various locations. For the exemplary purposes, such a configuration is illustrated by FIG. 17, which provides an image of an exemplary system fabricated using 3D printing based on two photon polymerization of a photoresist polymer, and by FIG. 18, which provides an optical image of the exemplary system. Thus, the structured polymer can be supported on a substrate, which can be the object to be cooled.

Figure 19:
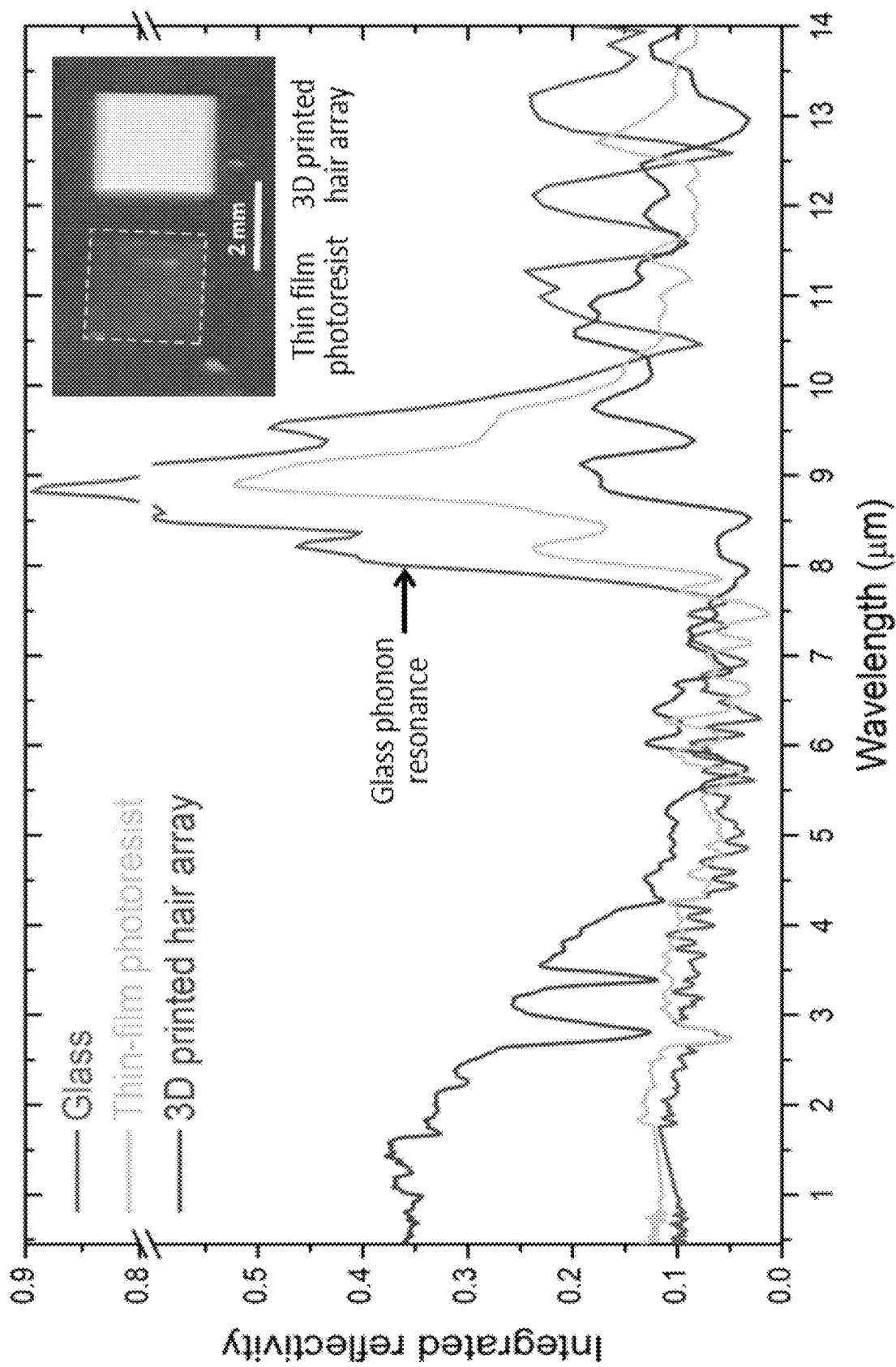
FIG. 19 depicts measured reflection spectrum of an exemplary system for radiative cooling in accordance with the disclosed subject matter, which consists of an array of ridges with triangular cross-section similar to the ones shown in FIGS. 17 and 18, in accordance with the disclosed subject matter as compared to two control samples: a glass substrate and a thin polymer on a glass substrate. The reflection spectra show that the reflectivity is substantially enhanced in the solar spectrum and that the emissivity (i.e., 1-reflectivity) is substantially enhanced in the thermal spectrum. The inset in FIG. 19 is an optical image in the visible spectrum showing that the exemplary system for radiative cooling is much brighter than the thin-polymer control.

The use of such a structured polymer can enhance reflectivity in the solar spectrum while also enhancing emissivity in the thermal spectrum. For example, FIG. 19 provides the reflectivity of a structured polymer fabricated using the 3D printing techniques described above, as compared to two control samples: a glass substrate and a thin polymer on a glass substrate. The inverse of reflectivity (i.e., 1-R) is absorptivity or emissivity. As shown in FIG. 19, the glass substrate by itself has low reflectivity in the solar spectrum, and poor emissivity at wavelengths above 7.5 µm. Emissivity is particularly low around a wavelength of 9 µm, at which glass has a strong phonon resonance that can increase reflectivity and decrease emissivity. Moreover, the polymer on glass likewise has low reflectivity in the solar spectrum, and only slightly better emissivity in the thermal spectrum, e.g., around a wavelength of 9 µm. In contrast, the structured polymer is significantly more reflective in the solar spectrum than either control and has greater emissivity in the thermal spectrum. Therefore, such a structured polymer can be used for radiative cooling.

In other aspects, the presently disclosed subject matter further provides systems having high absorptivity in the solar spectrum, with lower absorptivity in longer wavelengths (e.g., the thermal spectrum). In this manner, the system can absorb electromagnetic radiation in the solar spectrum, such as incident sunlight. Further, the system will be a poor blackbody radiator, and will not dissipate heat efficiently. Such systems can be used, e.g., for passive radiative heating or thermal harvesting.

As embodied herein, a system for radiative heating can have similar structures and configurations as the systems for radiative cooling described above. However, the materials and/or geometry of the system can be varied to enhance absorptivity in the solar spectrum and reduce emissivity in the thermal spectrum. The system can be formed from one or more units of three layers having an overall configuration to that shown in FIG. 16 with respect to structured polymers. Thus, the system can include at least one layer formed of units having a generally triangular cross-section, e.g., ridges and/or protrusions, and arranged in arrays. The three layers can include a top layer of structured materials, an underlying contrast layer, and a substrate, which can be the object or structure to be heated and/or that will store any captured heat.

For radiative heating applications, the top layer 80 in FIG. 16 can have high absorptivity in the solar spectrum, and lower emissivity in the thermal spectrum. The top layer 80 can be disposed above and adjacent to an underlying contrast layer 85 including one or more materials having a lower refractive index than the top layer 80. For example and not limitation, such materials for use in the top layer 80 include germanium, gallium arsenide, and silicon, and materials for use in the underlying contrast layer 85 include calcium fluoride, magnesium fluoride, silicon dioxide, silicone, poly (dimethyl siloxane), and air void(s). Additionally or alternatively, the underlying contrast layer 85 can include air voids. This contrast layer creates a refractive index contrast with the top layer, and can thereby create one or more Mie resonances throughout the solar and/or thermal spectra. In the solar spectrum, the Mie resonances coupled with the absorptive properties of the materials used in the top layer enhance absorptivity in the solar spectrum. In the thermal spectrum, where top layer 80 does not absorb radiation, the Mie resonances can act as a broadband reflector, where different resonance modes combine to create enhanced reflectivity across the thermal spectrum, including the atmospheric transmission window. High reflectivity in the thermal spectrum can result in low absorptivity in that range, and therefore low emissivity, which indicates inefficient heat dissipation through the top layer 80 via thermal blackbody radiation. As a result of the combined high solar absorptivity and low thermal emissivity, such systems can be used to passively heat an object to a higher temperature than its surrounding environment using solar radiation, thereby converting solar radiation into thermal energy.

Figure 20:
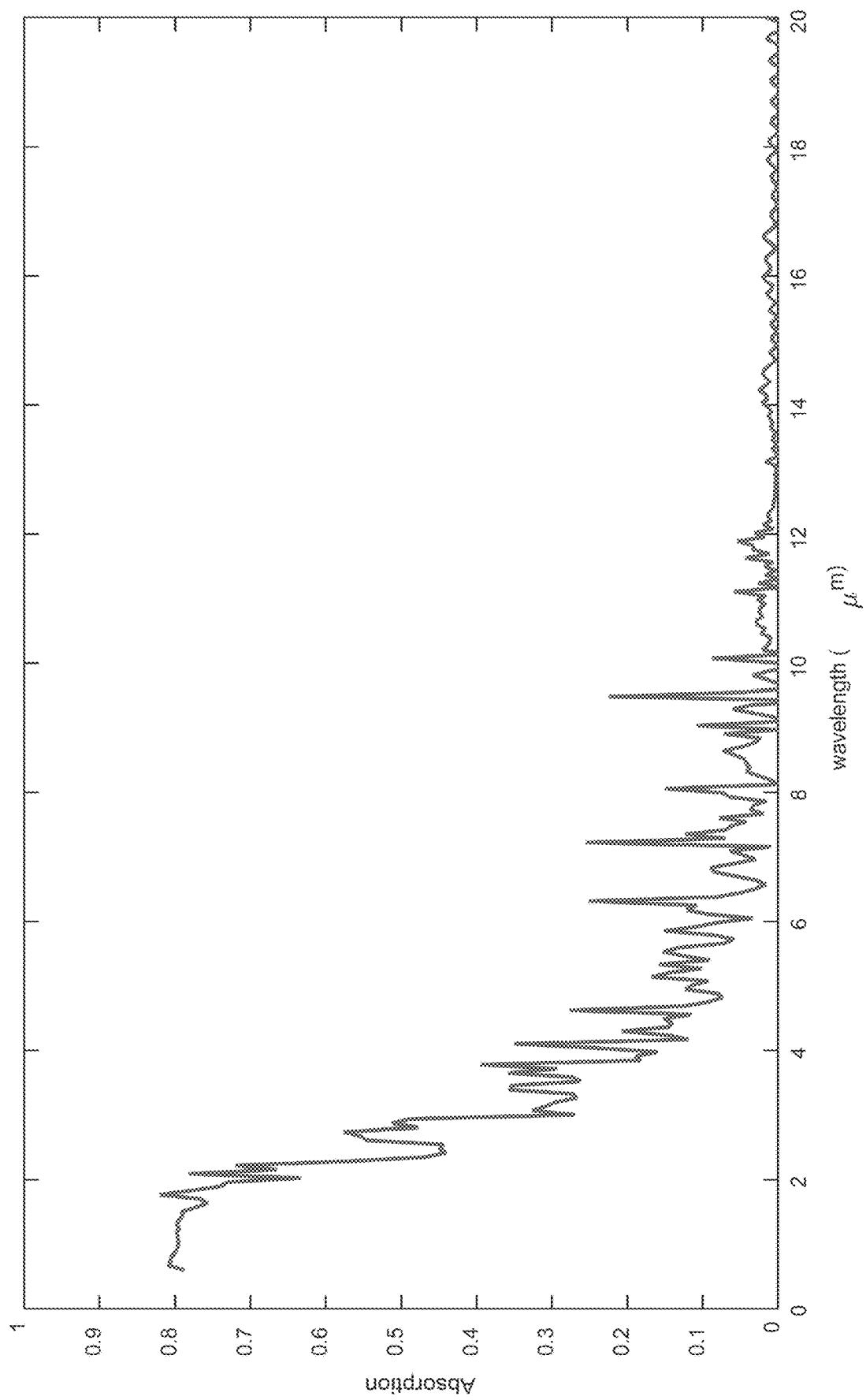
FIG. 20 depicts the simulated absorption spectrum of a system for radiative heating in accordance with the disclosed subject matter.

For the purpose of example, and not limitation, in a particular embodiment of a system for radiative heating, the top layer 80 can have a thickness of about 10 µm. The underlying contrast layer 85 can have a thickness of about 2 µm. The top layer 80 and underlying contrast layer 85 can be supported on a substrate, e.g., a silicon substrate. The substrate can have a thickness of about 500 µm. FIG. 20 shows the simulated absorption spectrum of such an embodiment. The spectrum shows relatively high absorptivity in the solar spectrum, with a low absorptivity (or emissivity) in the thermal spectrum.

Figure 27:
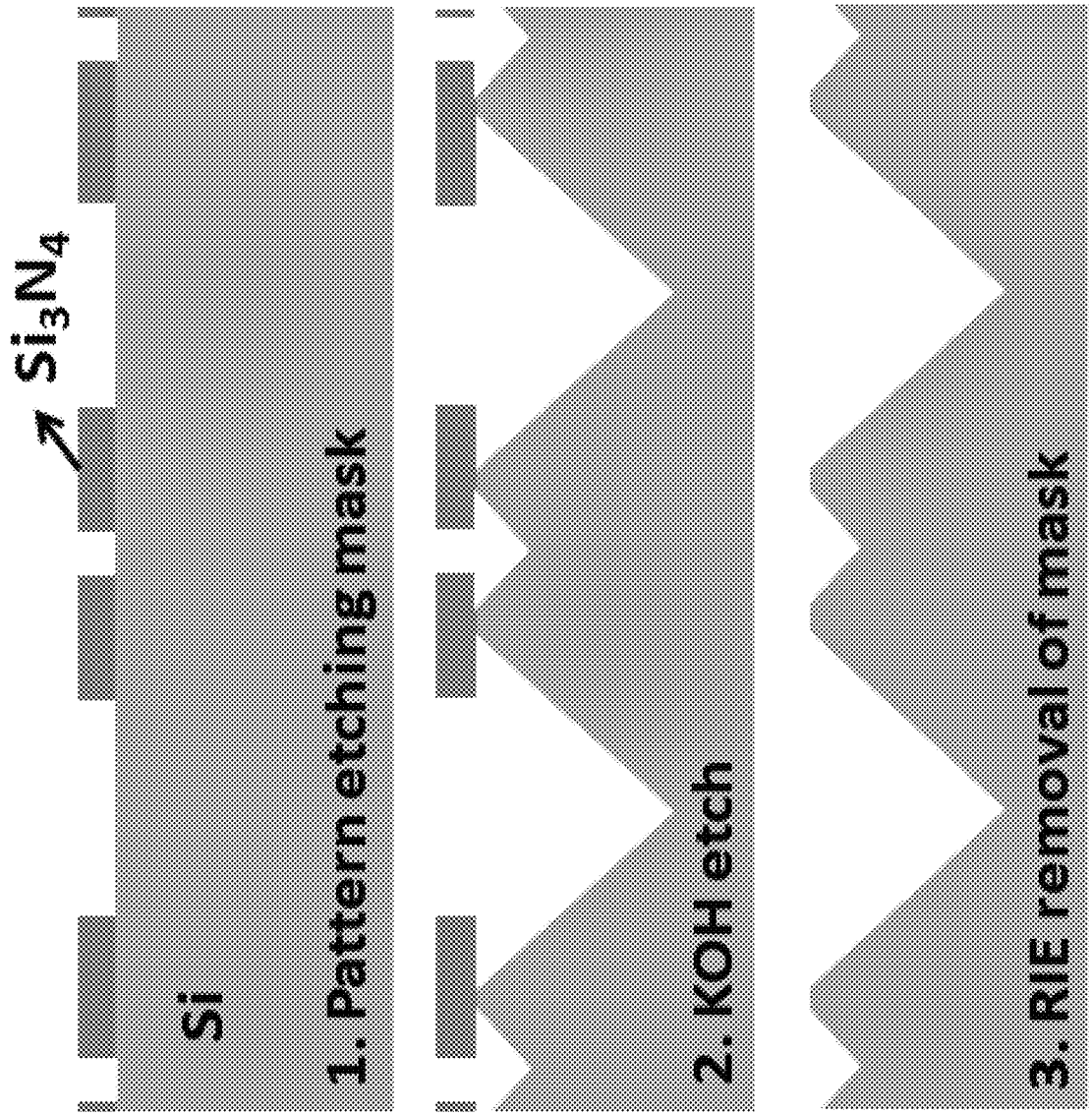
FIG. 27 depicts a method for fabricating a system for radiative heating in accordance with the disclosed subject matter.

Systems for radiative heating can be fabricated using any suitable technique described above or known in the art. The top layer 80 can be fabricated to have a generally triangular-cross-section using a series of lithography techniques and/or a wet etching technique. For example, FIG. 27 illustrates an exemplary fabrication technique. As shown in FIG. 27, a mask, e.g., $Si_3N_4$, can be patterned using photolithography or electron-beam lithography on top of the unpatterned top layer. The top layer can be etched, e.g., using KOH, and the mask can be removed to reveal the patterned top layer. Alternatively or additionally, the systems can be fabricated using imprinting techniques to create a desired surface geometry. Either of these processes can be scaled through a roll to roll process for large scale fabrication of such systems.

It should be noted that the systems described herein are merely illustrative of systems that can achieve desired optical properties (e.g., absorbance, emittance, and reflectance across the solar and thermal spectrum as appropriate) for very thin polymer layers. It is possible for the top layer to be made thicker, for instance 500 µm or higher, while retaining a similar optical performance.

The methods and systems of the presently disclosed subject matter provide advantages over certain existing technologies. Exemplary advantages include improved techniques for radiative heating and cooling that can be fine-tuned based on the operating conditions and radiation source. Furthermore, the materials used in the presently disclosed systems and methods can be relatively inexpensive and environment friendly, and the fabrication techniques to form the systems can be relatively simple and scalable, compared to certain other techniques. In certain embodiments, the presently disclosed systems can be based on a flexible coating and can be fabricated using a roll-to-roll technique.

The following examples are offered to more fully illustrate the disclosed subject matter, but are not to be construed as limiting the scope thereof.

EXAMPLES

Figure 21:
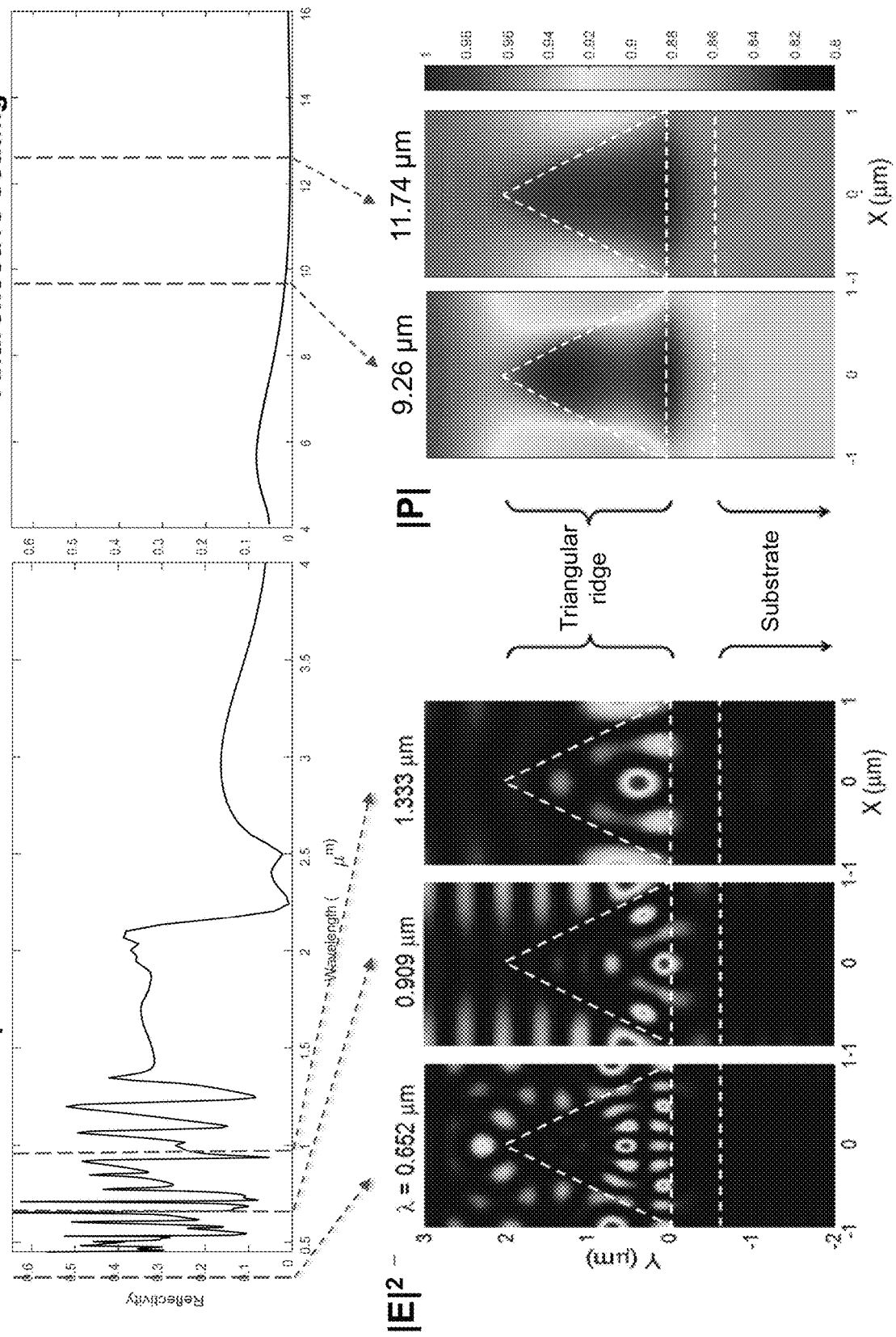
FIG. 21 shows simulation results to illustrate the dual functionality of a radiative cooling system in enhancing solar reflectivity and thermal emissivity. The example radiative cooling system consists of an array of ridges with triangular cross-sections similar to the ones shown in FIGS. 17 and 18.

Example 1: Enhanced Optical Reflection and Heat Dissipation in a Radiative Cooling System Consisting of an Array Of Ridges with Triangular Cross-Sections Finite-difference time-domain (FDTD) simulations were performed, to demonstrate the functional significance of the triangular cross-section of the ridge array in enhancing reflectivity in the solar spectrum (FIGS. 21-24). In FIG. 21 top panels show the reflection spectra of a radiative cooling system consisting of an array of ridges with triangular cross-sections similar to the ones shown in FIGS. 17 and 18.

The spectra show enhanced reflectivity in the solar spectrum due to Mie resonances in individual ridges and enhanced emissivity (i.e., reduced reflectivity) in the thermal spectrum as the ridge array functions as anti-reflection coating in the thermal spectrum. Lower left panel shows simulated light intensity distribution (i.e., square of the electric field component of light) around a single triangular ridge showing strong back scattering of sunlight and correspondingly substantially reduced solar transmission at three exemplary Mie resonances. Lower right panel shows simulated light intensity distribution (i.e., light power) around a single triangular ridge showing that thermal radiation transmits through the ridge array without much reflection, which corresponds to enhanced thermal emissivity.

Figure 18:
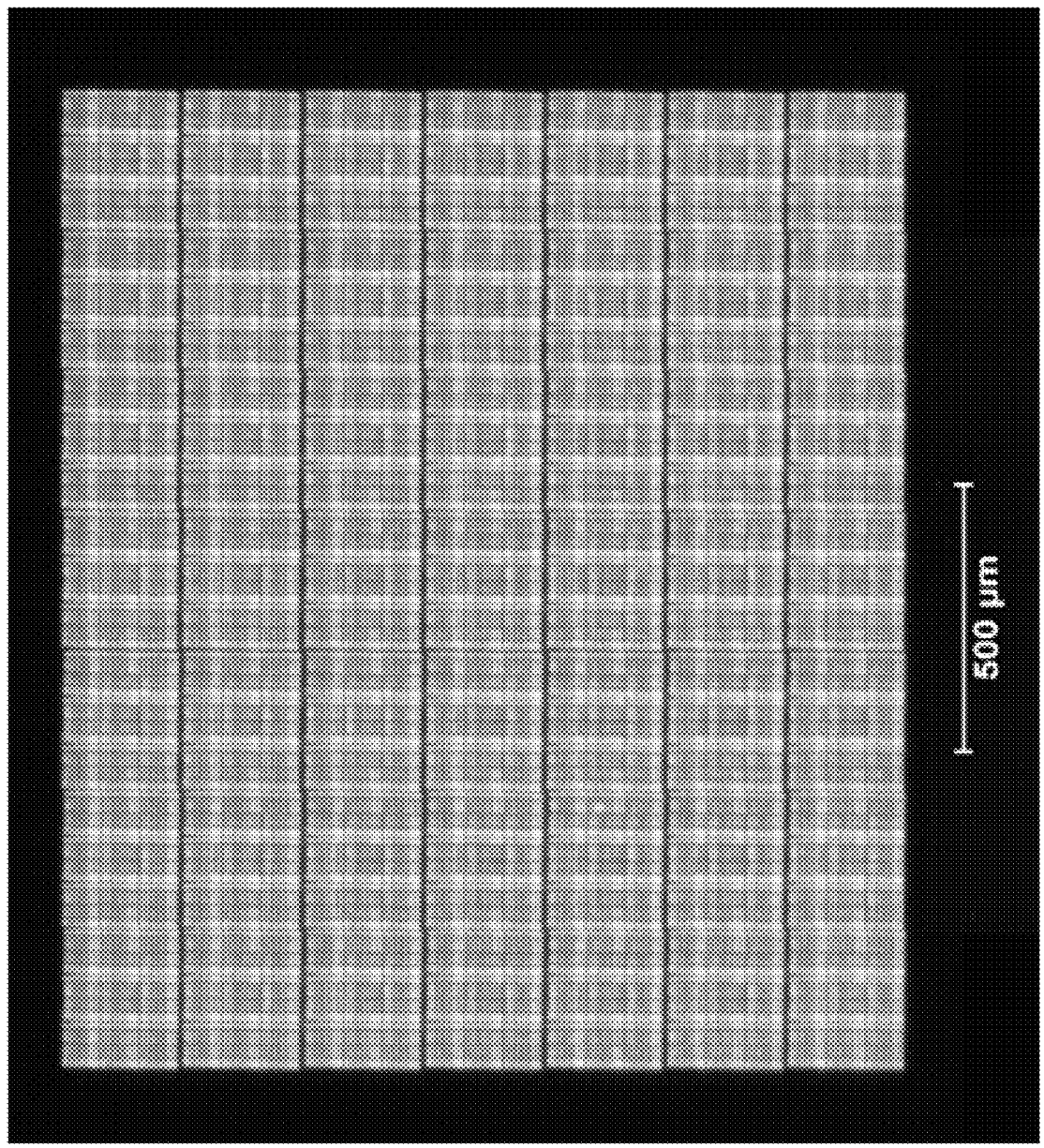
FIG. 18 provides an optical image of the exemplary system of FIG. 17.
Figure 22:
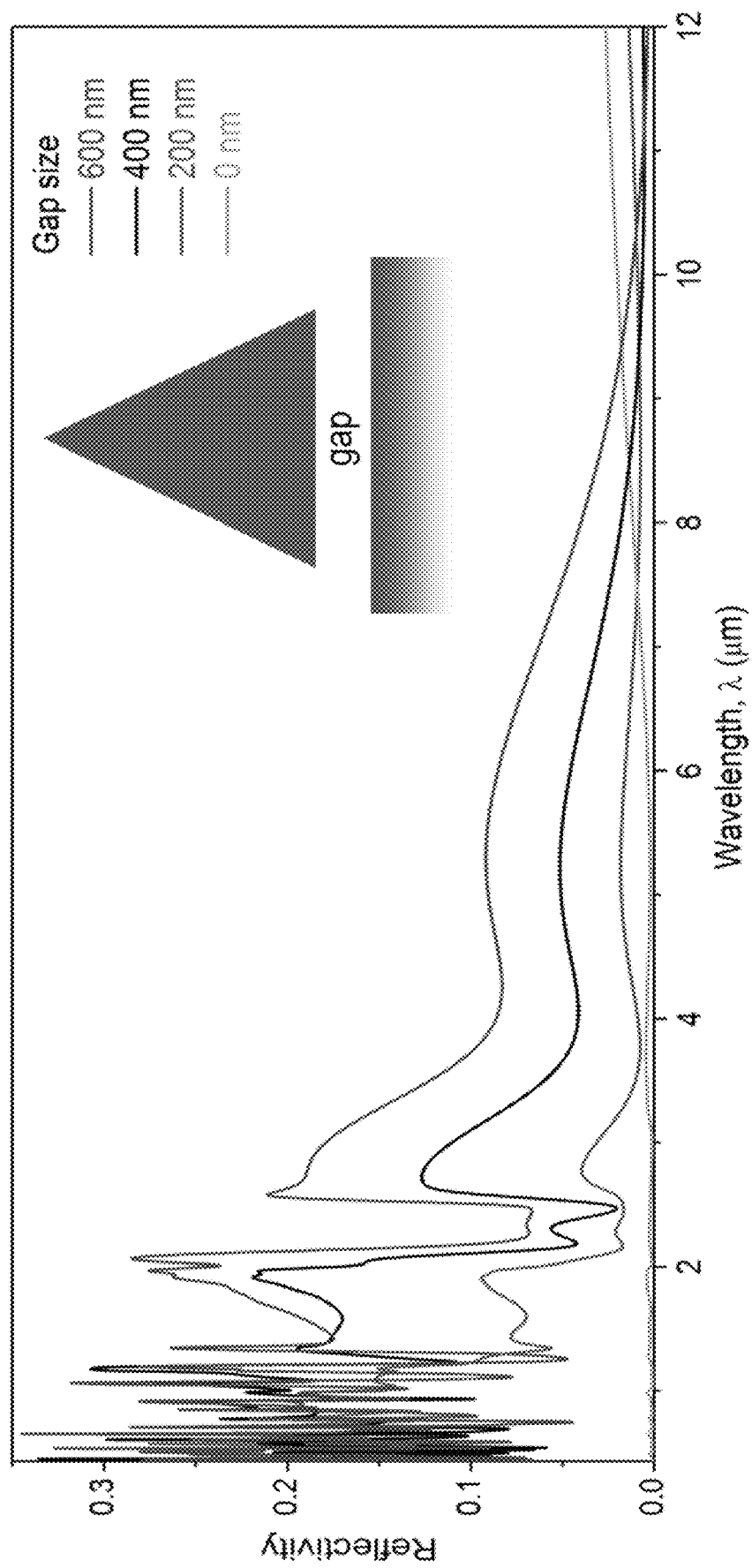
FIG. 22 provides simulated spectra of reflectivity as a function of the size of the gap between the substrate and a periodic array of triangular ridges similar to the ones shown in FIGS. 17 and 18.

FIG. 22 provides simulated spectra of reflectivity as a function of the size of the gap between the substrate and a periodic array of triangular ridges similar to the ones shown in FIGS. 17 and 18. It shows that solar reflectivity increases as the gap size increases. Physically, the near-field coupling between triangular ridge and the substrate reduces the strength of Mie resonances. This near-field coupling effect becomes weaker as the gap size increases. Reflectivity is very small when the ridges are in contact with the substrate (i.e., gap size=0).

FIGS. 23A-23C provide simulations based on randomized array structures. The spectra show a significant enhancement of reflectivity in the solar spectrum and a decrease of reflectivity (or increase of emissivity) in the thermal spectrum. The randomization, the layered structure and the coupling between neighboring ridges lead to a broadband enhancement of solar reflectivity.

FIGS. 24A-24C shows simulations comparing the reflective properties of triangular and circular ridges of the same cross-sectional area. Even though the enhancement of reflectivity at normal incidence is comparable in both cases, triangular ridges produce an extra enhancement at higher angles of incidence (FIG. 24B). Although Mie scattering of similar strength occurs in both circular and triangular ridges, in the latter the total internal reflection at the bottom facets of the ridges (FIG. 24C) enhances reflectivity substantially further.

Figure 25:
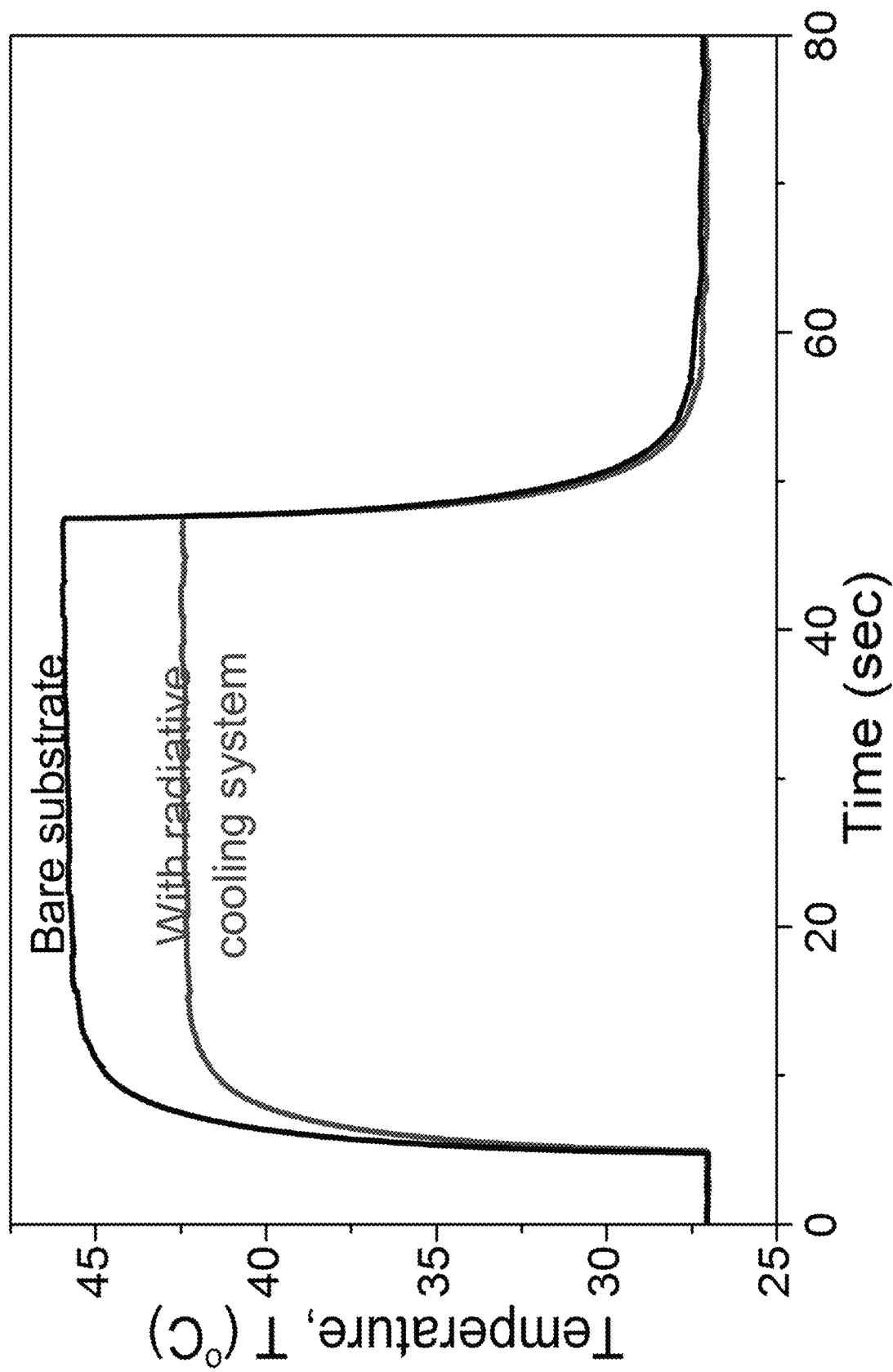
FIG. 25 depicts measured temperature of a substrate with and without an example radiative cooling system consisting of arrays of triangular ridges similar to the ones shown in FIGS. 17 and 18.

Thermodynamic tests were performed to demonstrate the radiative cooling system. A high-power xenon lamp was used to simulate the solar spectral distribution at the sea level, and a thermoelectrically cooled high-emissivity metal plate to simulate the clear sky with its low level of blackbody radiation. The radiative cooling system was suspended on thin threads to reduce thermal conduction. Samples with and without the radiative cooling system were compared. The samples provided with the radiative cooling system were able to maintain significantly lower steady-state temperatures than the same samples with the radiative cooling system removed (FIG. 25).

Example 2: Fabrication of a System for Radiative Heating

Figure 26B:
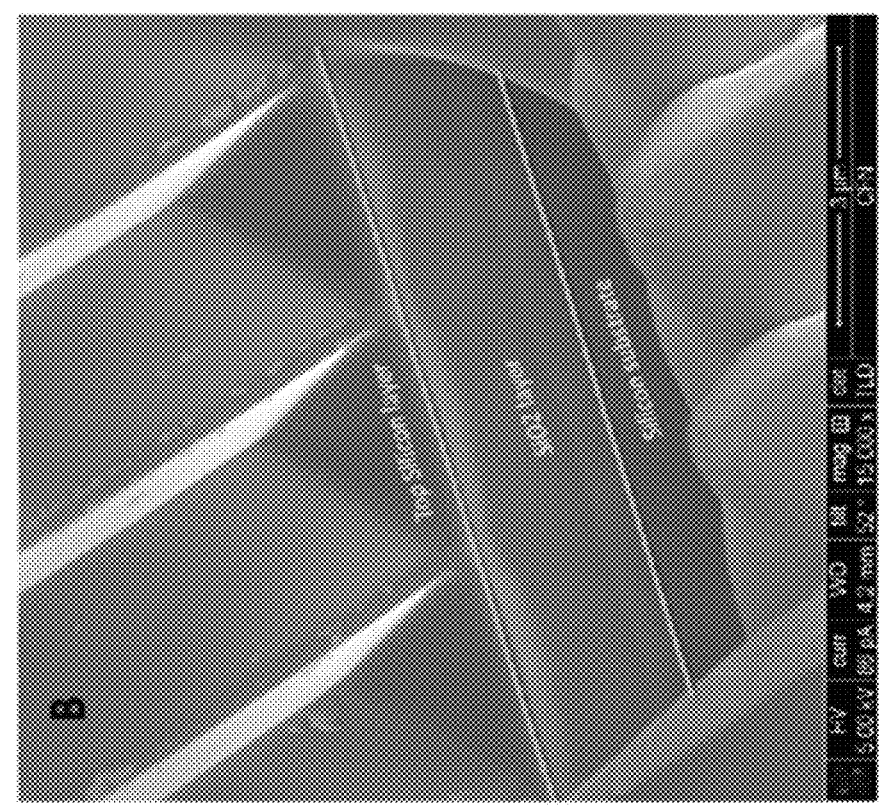
FIGS. 26A-26B depict the system of Example 2.
Figure 26A:
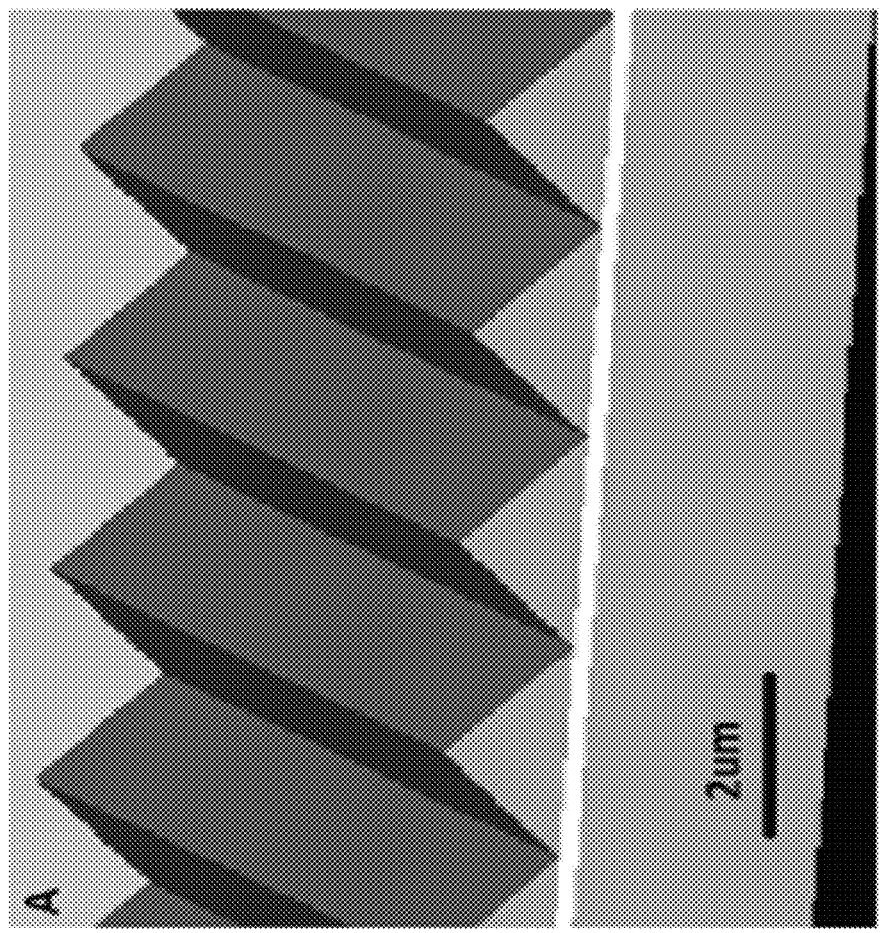

In this Example, a system was fabricated from commercially available silicon on insulator (SOI) wafers (FIGS. 26A-26B). FIG. 26A shows a schematic structure of the system and FIG. 26B is an scanning electron microscope image of the fabricated structure. $SiO_2$ was layered on top of the silicon substrate, and covered by an array of silicon ridges with triangular cross-sections. FIG. 27 illustrates the fabrication procedure, which is based on photolithography and wet etching, to create the structures shown in FIG. 26.

Example 3: 2D Simulations of Systems for Radiative Cooling

In this Example, shown in FIG. 28, 2D simulations were performed for various configurations and materials. For each of the following simulations, the reflective layer was silver with a thickness of 300 nm and a protective layer of poly(methyl methacrylate) with a thickness of 50 nm.

In a first simulation, the ridge array (only one ridge is shown in FIG. 28) was formed of silica, which was coated with poly(methyl methacrylate) containing dispersed $CaCO_3$ nanoparticles. FIG. 28A shows the simulated absorption spectrum. In a comparative simulation, the ridge array was formed of silica, and coated with poly(methyl methacrylate) containing dispersed $Al_2O_3$ nanoparticles. FIG. 28B shows the simulated absorption spectrum of the comparative simulation. As shown in FIG. 28B, the comparative simulation had different absorptivity in different portions of the thermal spectrum relative to FIG. 28A. These simulations demonstrate the feasibility of using various nanoparticles in the top layer to tune the spectral emissivity. A person of ordinary skill in the art will appreciate that by varying the mass ratio of the polymer(s) and the nanoparticles, it is possible to tune the emissivity of the coating to suit different applications.

FIG. 9 shows the complex optical refractive indicies n and κ values for various types of nanoparticles. As shown in FIG. 9, each type of nanoparticles had different electromagnetic extinction coefficients across the thermal spectrum, making them suitable for enhancing absorptivity at various wavelengths in the thermal spectrum and at longer wavelengths. Table 1 summarizes these wavelengths with respect to each type of nanoparticle. The poly(methyl methacrylate) (the top layer itself) showed enhanced absorptivity at about 6 μm and about 8 μm. Accordingly, various types of nanoparticles can be combined to enhance absorptivity across a broader range of wavelengths.

TABLE 1

| Nanoparticle Type | Wavelength |
| --- | --- |
| $CaCO_3$ | 7 μm |
| $SiO_2$ | 9 μm |
| $Si_3N_4$ | 11-13 μm |
| $Al_2O_3$ | 13-16 μm |

Figure 29:
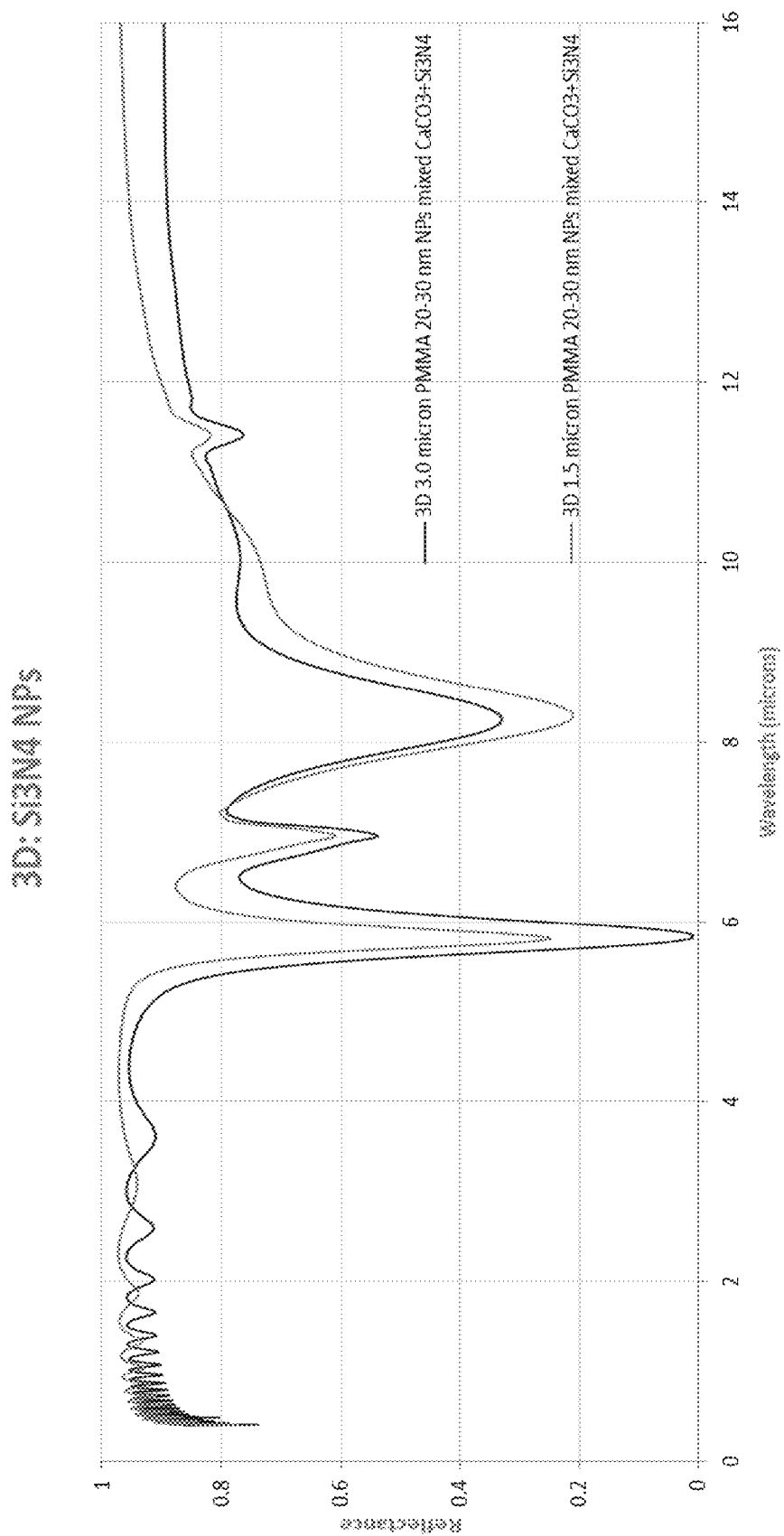
FIG. 29 provides the simulated reflectance spectra of systems having two different top layer thicknesses.

FIG. 29 compares the reflectance spectra of systems having mixed $Si_3N_4$ and $CaCO_3$ nanoparticles and top layer thicknesses of 1.5 μm and 3.0 μm. Equal numbers of each type of nanoparticle were used in the mixture. These spectra illustrate that layer thickness can affect absorption non-linearly. For example, at about 5.8 μm, the thicker system showed more absorptivity, while at 8.4 μm, the thinner system showed more absorptivity. This can be because the system with the 1.5 μm top layer had an overall thickness very close to the λ/4 value required for destructive interference of light reflecting off the interfaces between layers.

Example 4: Solar Reflection Spectra and Thermal Emissivity of Fiber in a Radiative Cooling System In this Example, shown in FIGS. 33 and 34, solar reflection spectra and thermal emissivity were measured for various configurations and materials.

Figure 33:
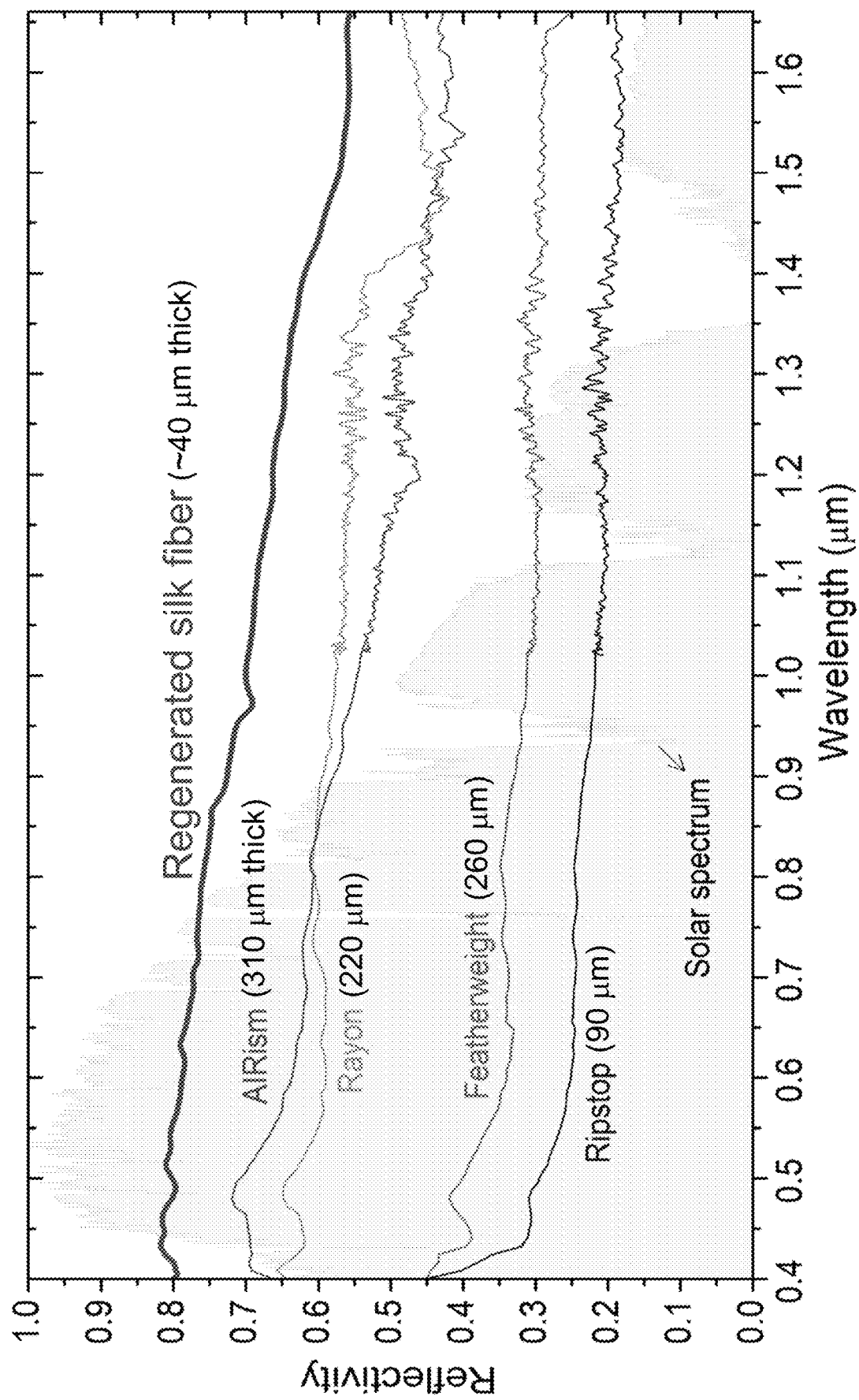
FIG. 33 depicts measured solar reflection spectra of regenerated silk fibers and commercially available white fabrics.
Figure 37:
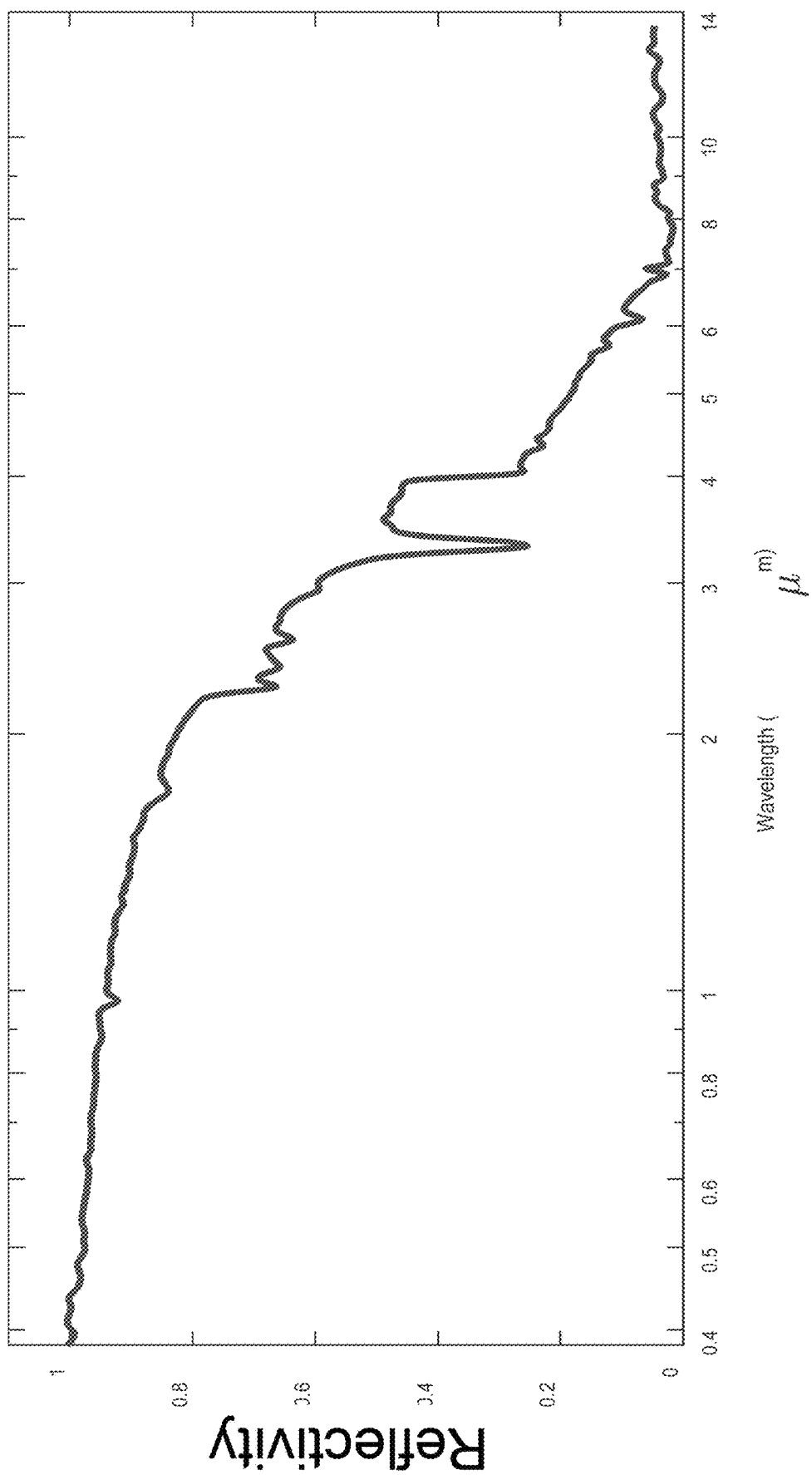
FIG. 37 depicts a measured solar refection spectrum of a single PVDF fiber containing air voids.

FIG. 33 provides measured solar reflection spectra comparing regenerated silk fibers with commercially available white fabrics. Reflectivity weighted by the solar spectrum was 0.746 for a single ~40-um thick regenerated silk fiber having a high density of air voids, 0.602 for a white AIRism fabric (81% nylon-19% spandex) with a thickness of ~310 um, 0.613 for a white Rayon fabric with a thickness of ~220 um, 0.344 for a white fusible Featherweight fabric (90% polyester-10% rayon) with a thickness of ~260 um, and 0.250 for a white Ripstop fabric (100% nylon) with a thickness of ~90 um. FIG. 37 illustrates a measured solar reflection spectrum of a single PVDF fiber containing a high density of air voids and with a thickness of ~100 um. As shown, the fiber is highly reflective in the solar spectrum ($\lambda$=0.4-2 um) and highly emissive in the thermal radiation spectrum ($\lambda$>6 um). Emissivity can be calculated as 1-Reflectivity. The combination of high solar reflectivity and high thermal emissivity can allow such fibers to have improved radiative cooling. The commercial white fabrics were much less reflective (though being much thicker) at least in part because the individual fibers in these fabrics are solid without air voids to strongly scatter sunlight.

Figure 34:
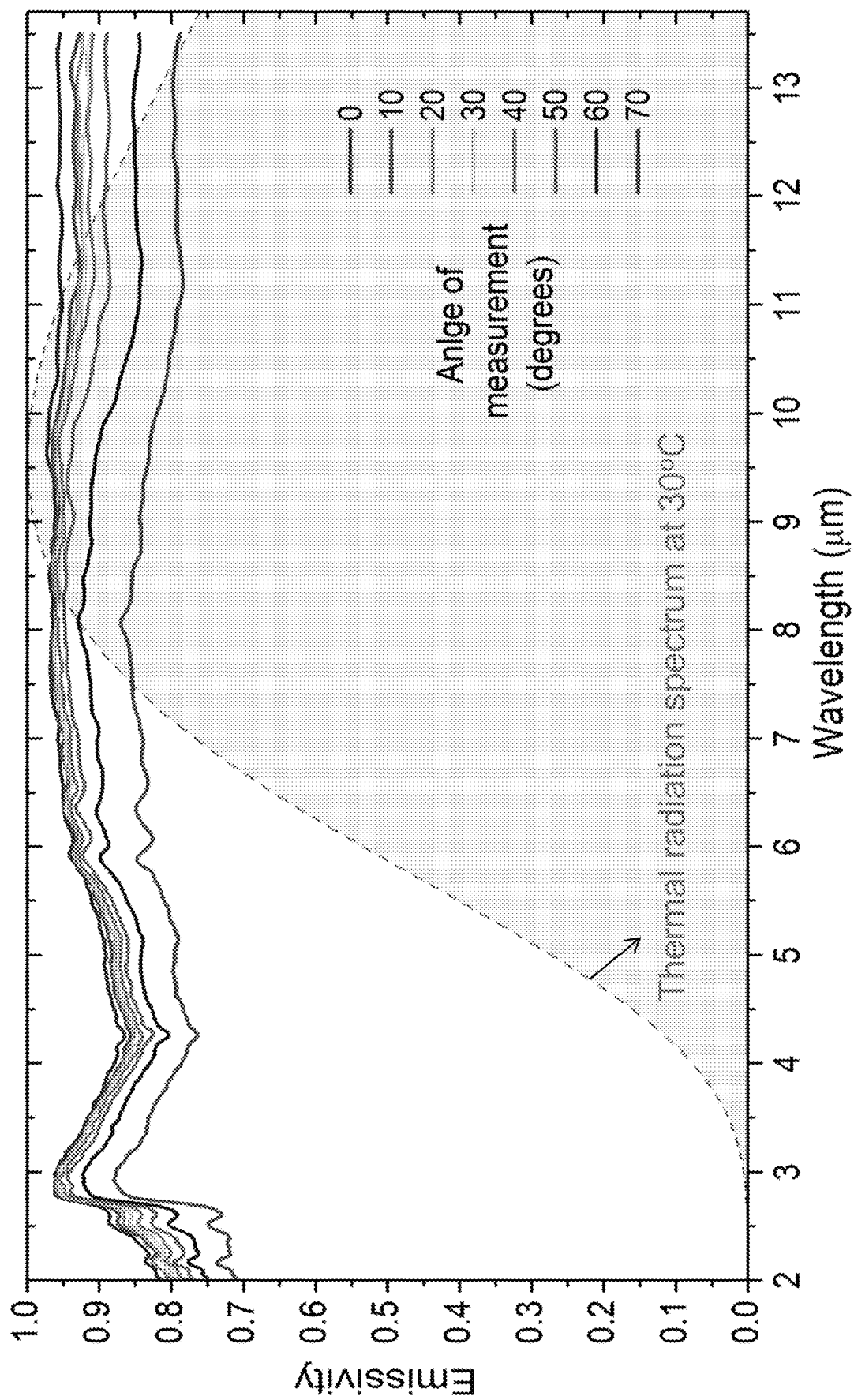
FIG. 34 depicts measured thermal emissivity of regenerated fibers containing a high density of air voids.
Figure 35B:
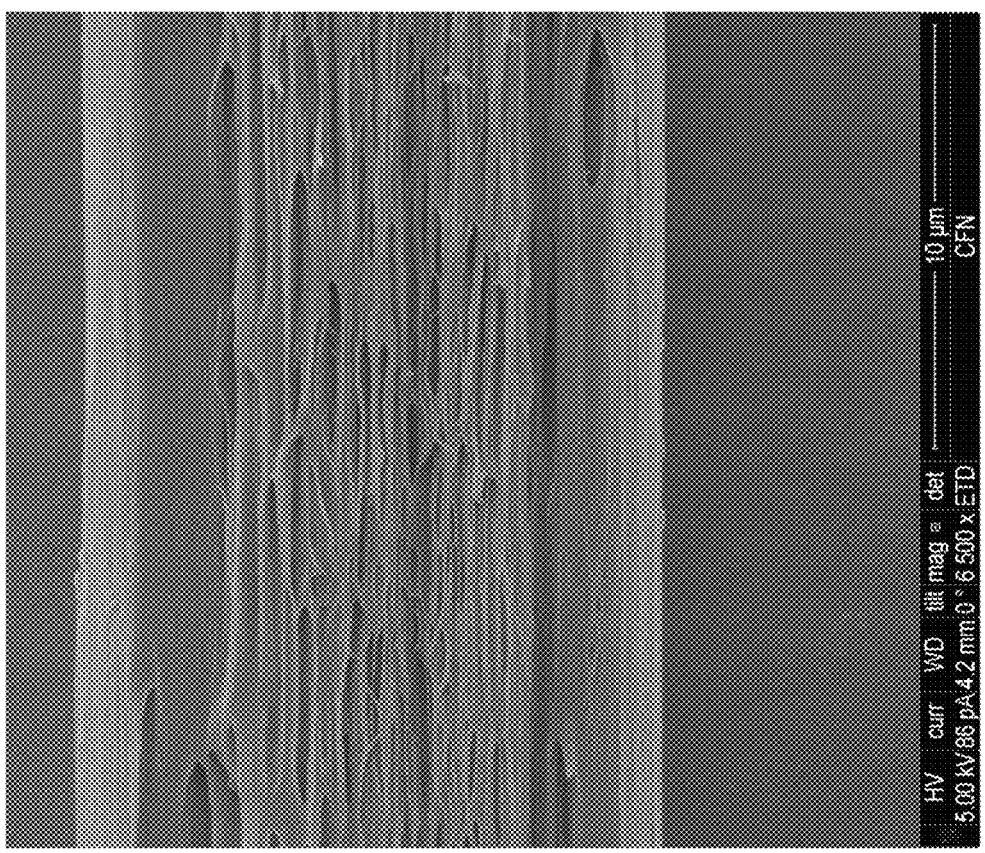
FIGS. 35A-35B are scanning electron microscope images of transverse (FIG. 35A) and longitudinal (FIG. 35B) cross-sectional cut through polyvinylidene difluoride (PVDF) fibers.
Figure 35A:
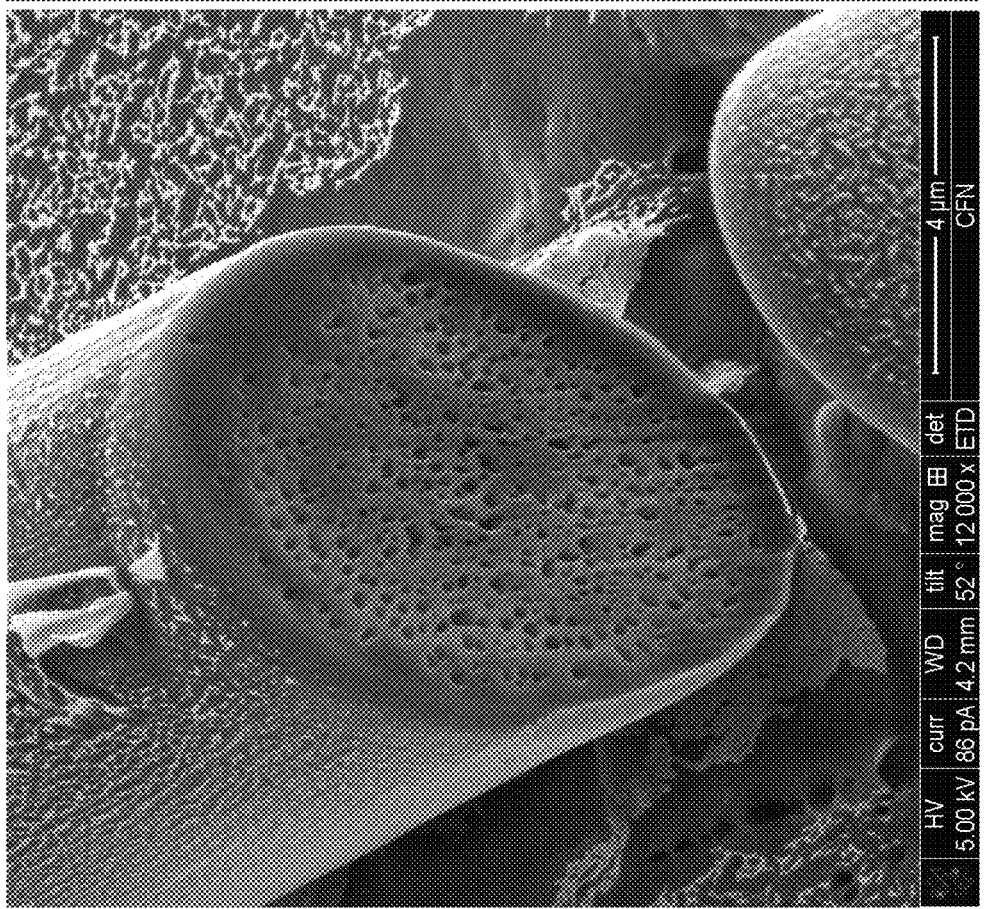
Figure 36B:
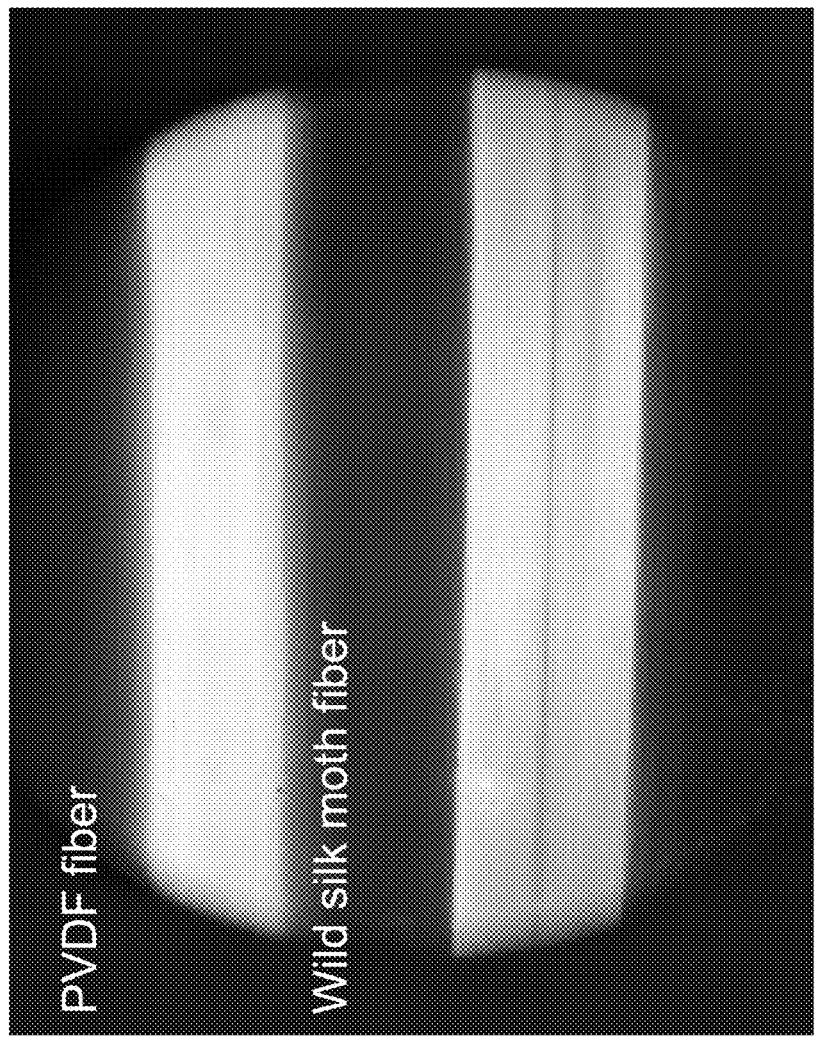
FIGS. 36A-36B are photos of man-made PVDF fiber containing a high density of air voids (FIG. 36A) and a bundle of PVDF fibers (FIG. 36B).
Figure 36A:

FIG. 34 provides measured thermal emissivity of regenerated fibers having a high density of air voids. As shown, the emissivity was ~0.93, weighted by the thermal radiation spectrum of a black body at 30° C., which is close to the emissivity of 1 for a blackbody. Such high emissivity can allow the fiber (and thus fabrics made of the fiber) to efficiently dissipate heat via thermal radiation.

Example 5: Applications of Systems for Radiative Cooling Coating

Figure 38:
FIG. 38 is a photo of 4000 square feet roof covered by an exemplary radiative cooling system in accordance with the disclosed subject matter.
Figure 39:
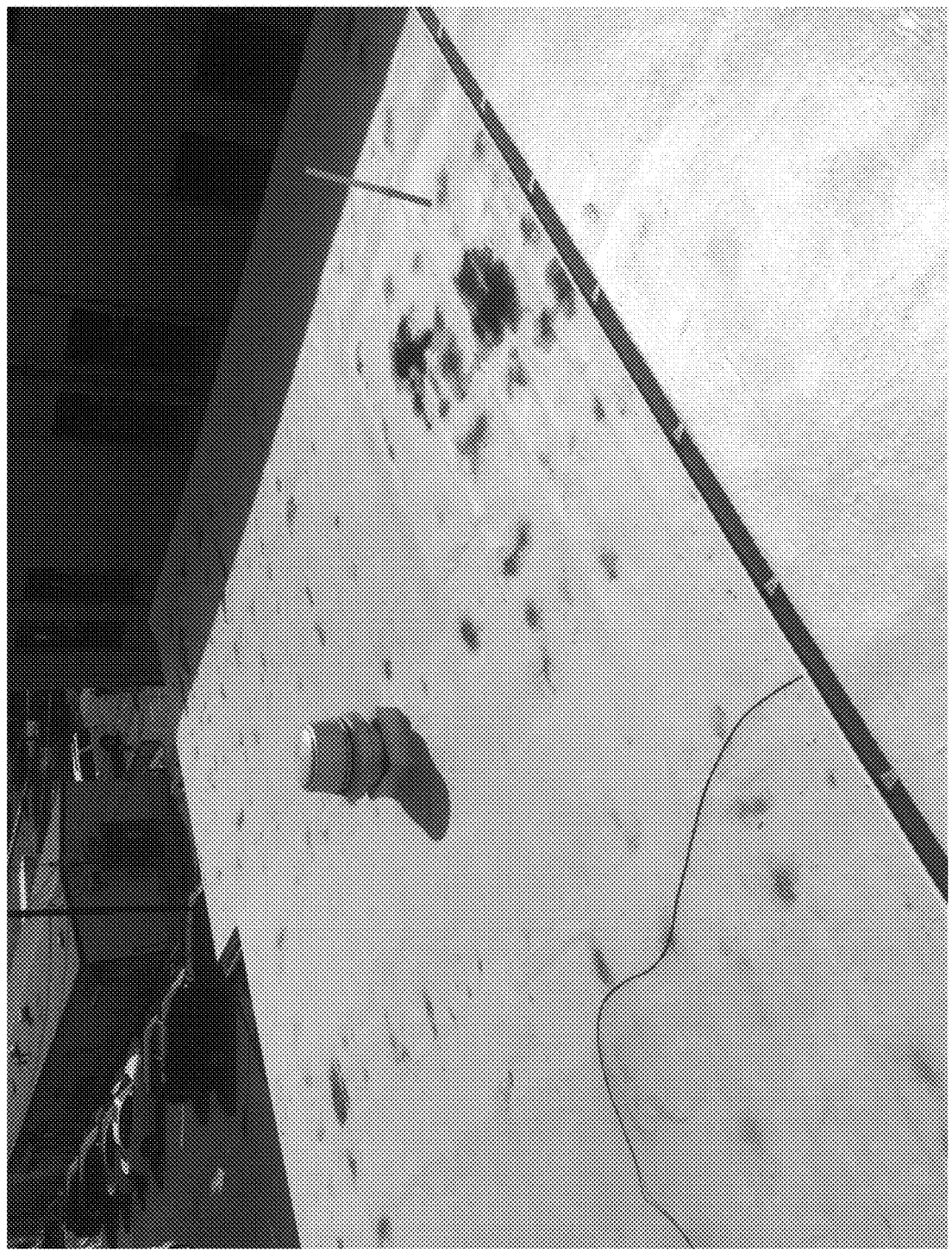
FIG. 39 is a photo of 4000 square feet roof covered by an exemplary radiative cooling system in accordance with the disclosed subject matter, after 9 months from installation.
Figures 41A, 41B:
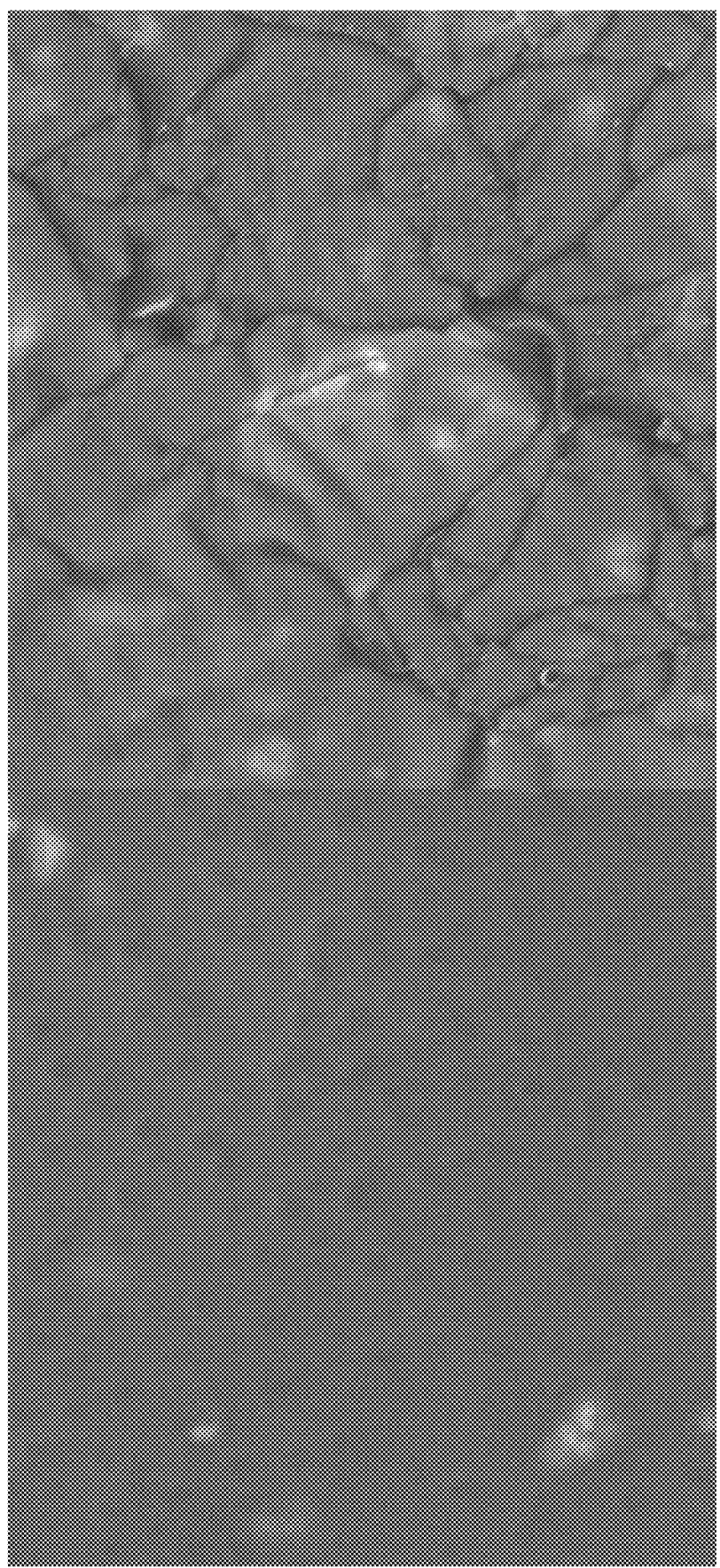
FIGS. 41A-41B are scanning electron microscope images of surfaces of an exemplary system for radiative cooling (FIG. 41A) compared to surfaces of a commercially available coating system (FIG. 41B).

In this Example, the disclosed system was installed to an approximately 4000 square feet flat roof and exposed to natural stimulations. FIG. 38. shows a roof covered by the radiative cooling coating in accordance with the disclosed subject matter. The coating includes, from bottom to top, a clear silicone layer, a fabric layer for structural enhancement, and a top white layer. As embodied herein, silicone is embedded with a mixture of nanoparticles to improve solar reflectivity and thermal emissivity. FIG. 39 shows the roof after about 9 months from installation. Smooth coating surfaces allowed rain water to wash away accumulated dusts, thus preserving the optical and thermodynamic properties of the radiative cooling coating. As shown in FIGS. 40A and 40B accumulated dusts can be easily wiped away by wet tissue papers. Furthermore, the radiative cooling coating was less likely to accumulate dusts at least in part because the radiative cooling coating (FIG. 41A) has smoother surfaces than other coatings available in the market (FIG. 41B).

Figure 42:
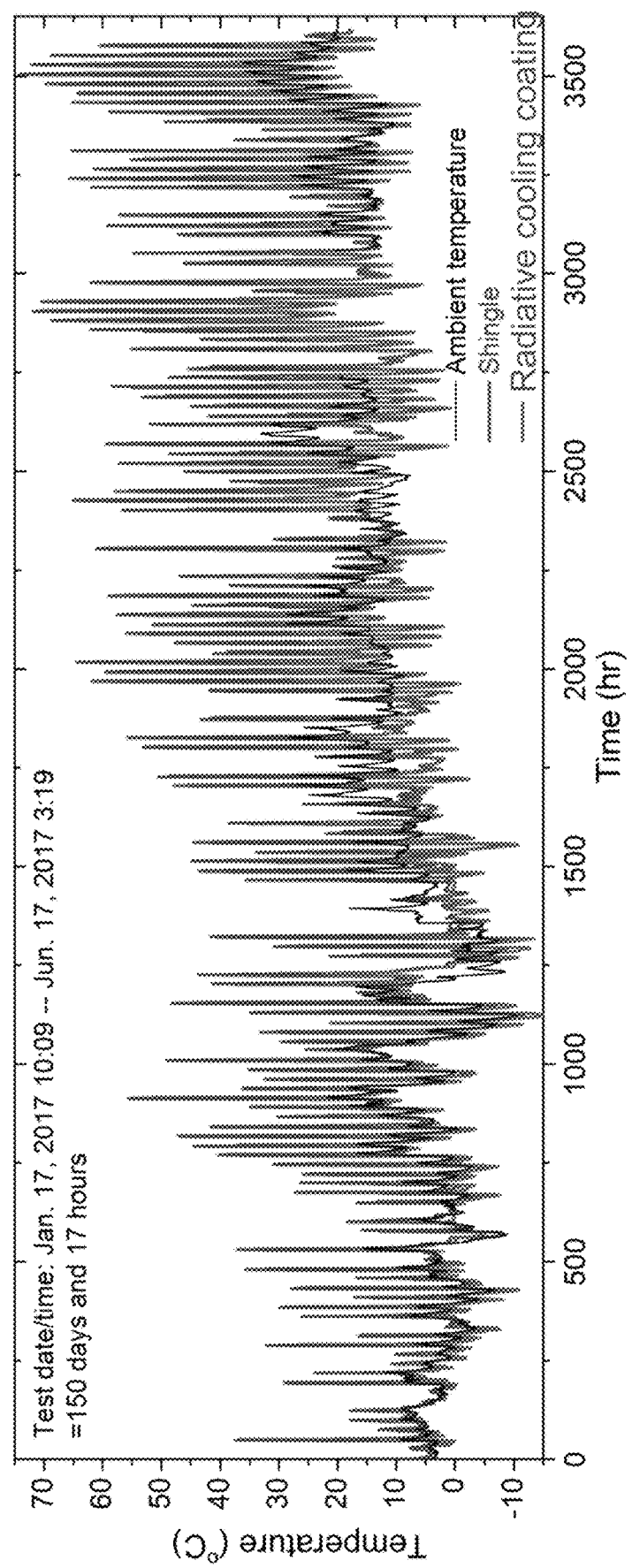
FIG. 42 depicts monitored roof temperature over about half of a year after installation. Depicted are the temperatures of the flat region of the roof covered by the radiative cooling coating, the sloped portion of the roof covered by gray shingles, and the ambient temperature.
Figure 43:
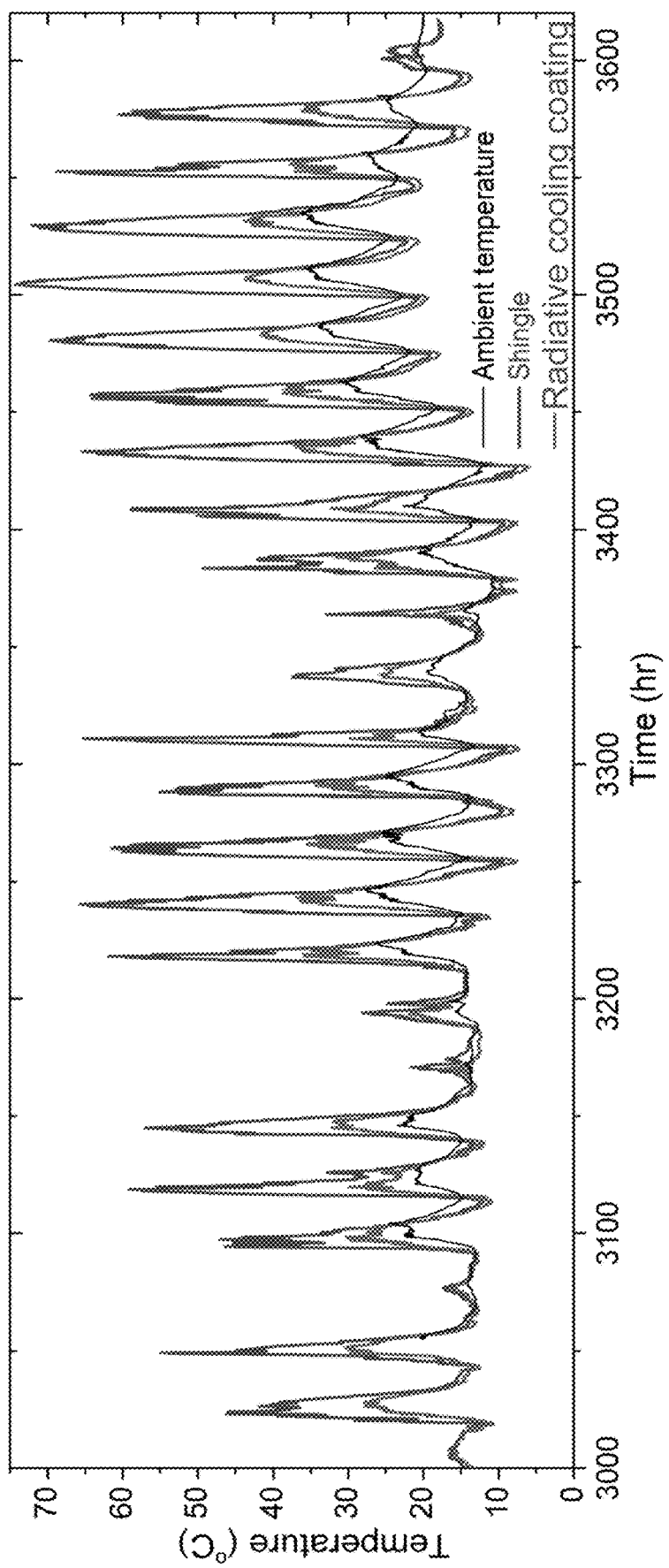
FIG. 43 are magnified regions of FIG. 42 to show temperature evolution over the time range of hours 3000-3600.

FIG. 42 provides roof temperatures monitored over about half a year. Depicted are the temperatures of the flat region of the roof covered by the radiative cooling coating, the sloped portion of the roof covered by gray shingles, and the ambient temperature. FIG. 43 depicts an enlarged region of FIG. 42 to show temperature evolution during the time range of hours 3000-3600. As shown, in the early summer (June of 2017), the shingle covered control roof reached peak temperatures of ~70° C. during daytime, whereas the radiative cooling coating covered roof was ~30° C. cooler, and less than 10° C. warmer than the ambient temperature.

Figures 44A, 44B:
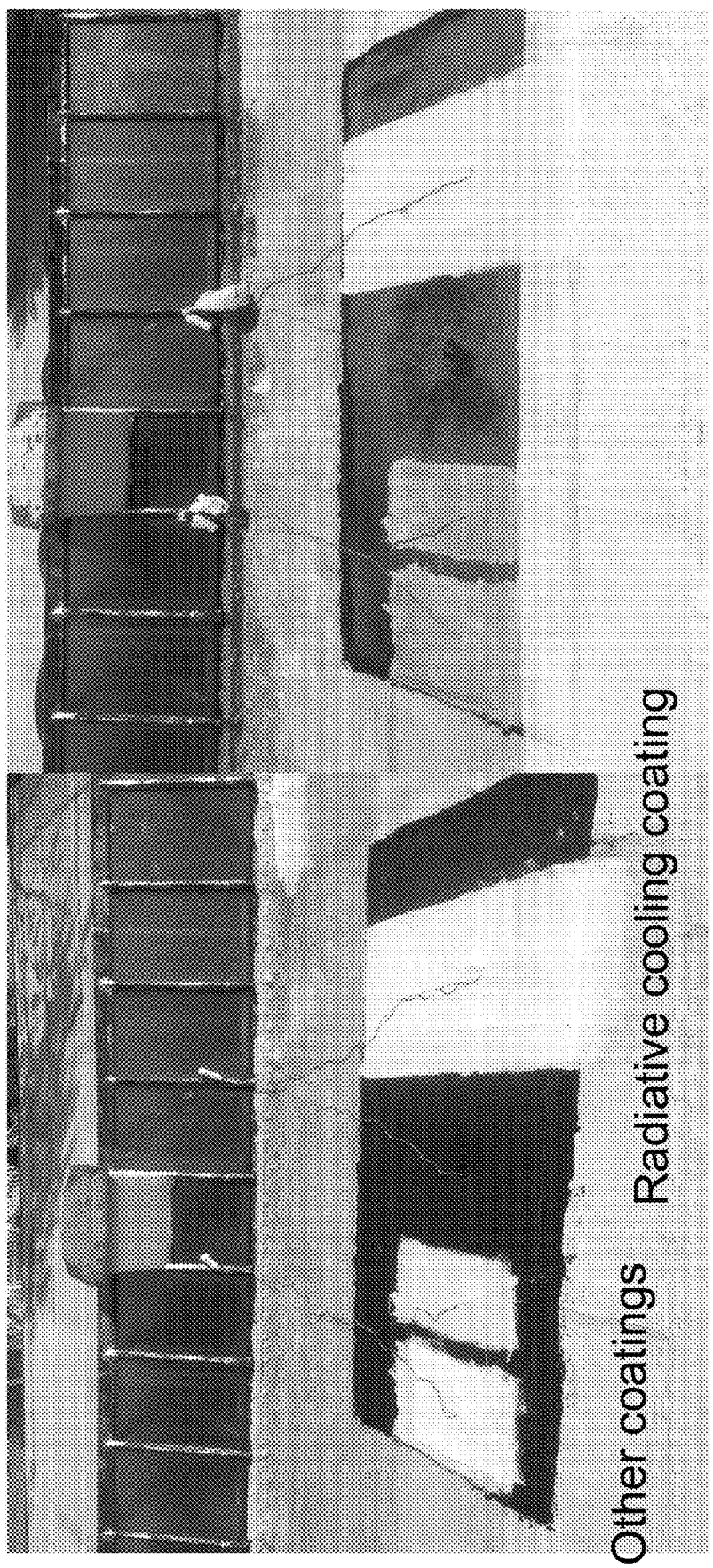
FIGS. 44A-44B are photos of an exemplary system for radiative cooling and other coating systems installed on an asphalt substrate.

FIGS. 44A and 44B are photos of the disclosed radiative cooling coating shown side-by-side with other coatings on an asphalt substrate. The photo in FIG. 44A was taken one month after the installation and FIG. 44B was taken 8 months later. Other coatings showed substantial yellowing while the disclosed radiative cooling coating was still clean and white. The yellowing was caused at least in part by migration of oily chemicals from the underlying asphalt to the coatings. The disclosed radiative cooling coating showed improvements in suppressing such migration of oily chemicals, at least in part because of its firm structure.

Figure 45:
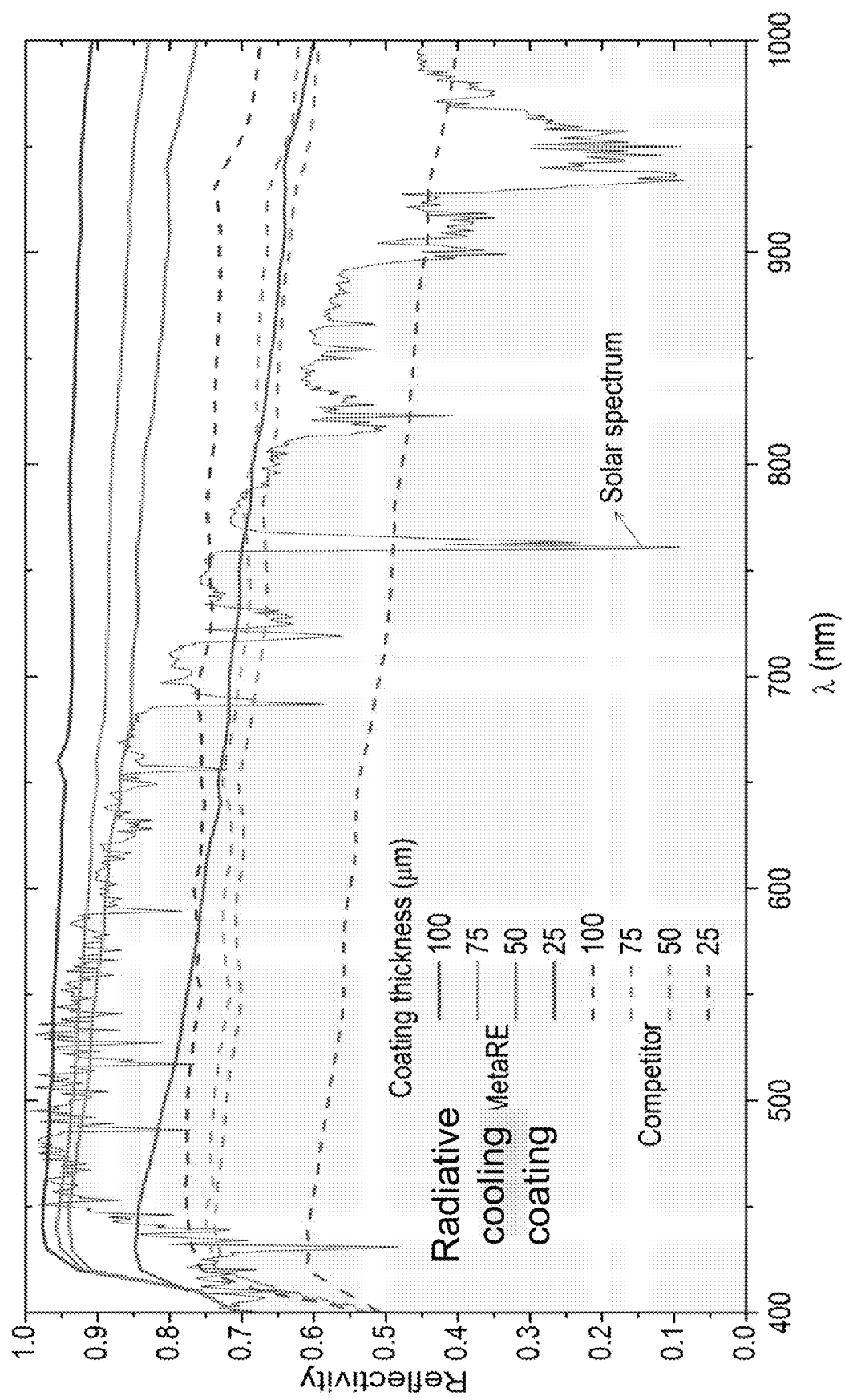
FIG. 45 shows reflectivity spectra of systems for radiative cooling in accordance with the disclosed subject matter compared to other coatings with similar thickness.
Figure 46:
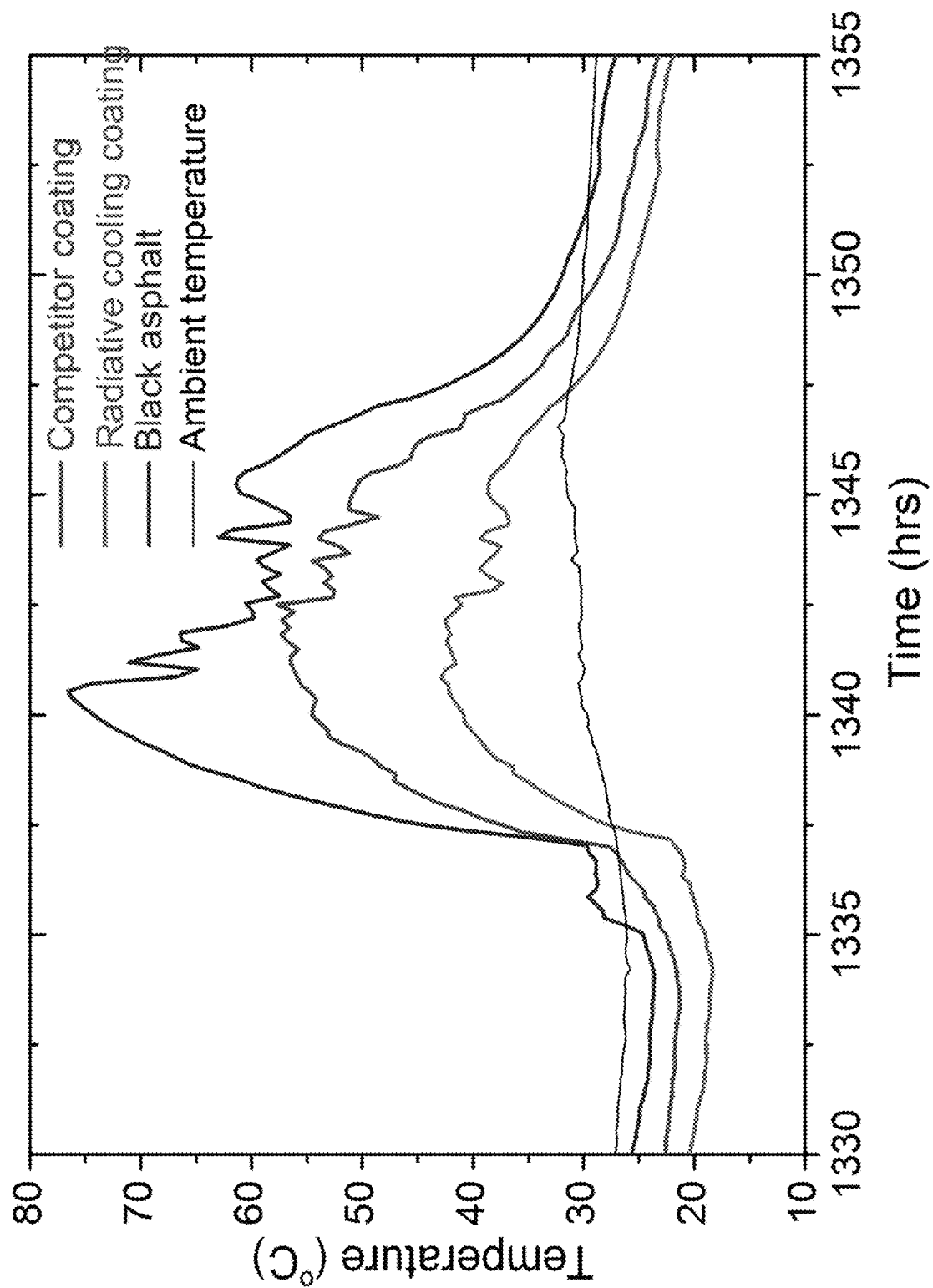
FIG. 46 provides temperature plots showing the exemplary system for radiative cooling in accordance with the disclosed subject matter compared to other coatings.

Furthermore, the disclosed radiative cooling coatings were substantially more reflective and had a cooler temperature compared to other coatings of similar thickness. FIG. 45 shows reflectivity spectra measured by an integration sphere. Both specular reflection and diffuse reflection were captured using the integration sphere. Coatings were applied on glass slides by an applicator with selected thickness. FIG. 46 illustrates temperature data showing that the disclosed radiative cooling coating was able to achieve cooler roof temperatures compared to other coatings, including a coating of black asphalt.

In addition to the various embodiments depicted and claimed, the disclosed subject matter is also directed to other embodiments having other combinations of the features disclosed and claimed herein. As such, the particular features presented herein can be combined with each other in other manners within the scope of the disclosed subject matter such that the disclosed subject matter includes any suitable combination of the features disclosed herein. The foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the systems and methods of the disclosed subject matter without departing from the spirit or scope of the disclosed subject matter. Thus, it is intended that the disclosed subject matter include modifications and variations that are within the scope of the appended claims and their equivalents.

What is claimed is:

1. A system for radiative cooling, comprising:
a top layer comprising one or more structured polymers, wherein the top layer has high emissivity in at least a portion of the thermal spectrum, an electromagnetic extinction coefficient of approximately zero in at least a portion of the solar spectrum, and a reflectivity of greater than about 0.5 in at least a portion of the solar spectrum; and
a contrast layer, disposed below the top layer, having a lower refractive index than a refractive index of the top layer in at least a portion of the solar spectrum.

2. The system of claim 1, wherein the contrast layer comprises one or more of calcium fluoride, magnesium fluoride, silicon dioxide, poly(dimethyl siloxane), and air void(s).

3. The system of claim 1, wherein the top layer comprises one or more regions comprising one or more arrays including one or more ridges and/or protrusions.

4. A method for radiative cooling, comprising:
a top layer comprising one or more structured polymers, wherein the top layer has high emissivity in at least a portion of the thermal spectrum, an electromagnetic extinction coefficient of approximately zero in at least a portion of the solar spectrum, and reflectivity of greater than about 0.5 in at least a portion of the solar spectrum; and providing a contrast layer, disposed below the top layer, having a lower refractive index than a refractive index of the top layer in at least a portion of the solar spectrum.

* * * * *

UNITED STATES PATENT AND TRADEMARK OFFICE
CERTIFICATE OF CORRECTION

PATENT NO.      : 11,668,497 B2
APPLICATION NO. : 17/699789
DATED           : June 6, 2023
INVENTOR(S)     : Nanfang Yu et al.

It is certified that error appears in the above-identified patent and that said Letters Patent is hereby corrected as shown below:

In the Specification

In Column 1, Lines 21-27, under the heading, STATEMENT REGARDING FEDERALLY-SPONSORED RESEARCH:
"This invention was made with government support from the National Science Foundation under Grant Nos. PHY-1411445 and ECCS-1307948, from the Department of Energy under Grant No. DE-AC02-98CH10886, and from the Air Force Office of Scientific Research under Grant No. MURI/FA9550-13-1-0389. The Government has certain rights in the invention."

Should read:
-- This invention was made with government support under DE-AC02-98CH10886, and DE-SC0012704 awarded by the U.S. Department of Energy, FA9550-14-1-0389 awarded by the Air Force Office of Scientific Research, and 1307948, and 1411445 awarded by the National Science Foundation. The government has certain rights in the invention. --

Signed and Sealed this
Twenty-sixth Day of September, 2023

Katherine Kelly Vidal
*Director of the United States Patent and Trademark Office*